(12) United States Patent
Armleder

(10) Patent No.: US 11,791,996 B2
(45) Date of Patent: Oct. 17, 2023

(54) STORING AND DETERMINING A DATA ELEMENT

(71) Applicant: Sebastien Armleder, Carouge (CH)

(72) Inventor: Sebastien Armleder, Carouge (CH)

(*) Notice: Subject to any disclaimer, the term of this patent is extended or adjusted under 35 U.S.C. 154(b) by 215 days.

(21) Appl. No.: 17/162,265

(22) Filed: Jan. 29, 2021

(65) Prior Publication Data

US 2021/0234678 A1    Jul. 29, 2021

(30) Foreign Application Priority Data

Jan. 29, 2020  (EP) ..................................... 20154430

(51) Int. Cl.
*H04L 9/08* (2006.01)
*H04L 9/32* (2006.01)

(52) U.S. Cl.
CPC ............ *H04L 9/0866* (2013.01); *H04L 9/085* (2013.01); *H04L 9/0825* (2013.01); *H04L 9/3228* (2013.01)

(58) Field of Classification Search
CPC ..... H04L 9/0866; H04L 9/0825; H04L 9/085; H04L 9/3228; H04L 9/08; H04L 9/32
See application file for complete search history.

(56) References Cited

U.S. PATENT DOCUMENTS

| | | | |
|---|---|---|---|
| 6,662,299 B1 | 12/2003 | Price, III | 713/171 |
| 6,810,122 B1 | 10/2004 | Miyazaki et al. | 380/30 |
| 7,421,080 B2 | 9/2008 | Matsumura et al. | 380/277 |
| 9,331,984 B2 | 5/2016 | Matsuo | 380/28 |
| 11,032,259 B1* | 6/2021 | Bernat | H04L 63/061 |
| 2008/0095375 A1 | 4/2008 | Tateoka et al. | 380/282 |
| 2008/0263363 A1 | 10/2008 | Jueneman et al. | 713/184 |
| 2009/0077379 A1* | 3/2009 | Geyzel | H04L 9/085 713/170 |
| 2013/0046973 A1 | 2/2013 | Resch et al. | 713/156 |
| 2014/0089683 A1* | 3/2014 | Miller | H04L 9/085 713/193 |
| 2019/0109711 A1* | 4/2019 | Gladwin | H04L 9/0869 |
| 2019/0319792 A1 | 10/2019 | Irwan et al. | |
| 2019/0342080 A1* | 11/2019 | Vakili | H04L 9/0897 |
| 2020/0259651 A1* | 8/2020 | Mohassel | H04L 9/0618 |

FOREIGN PATENT DOCUMENTS

EP     2 375 626 A1    10/2010

OTHER PUBLICATIONS

NXP® in view of Secure microcontroller SmartMX®3P71D321 (Year: 2018).*
European Search Report dated Jun. 10, 2021, issued to counterpart European Application No. 21153562.0.

* cited by examiner

*Primary Examiner* — Techane Gergiso
(74) *Attorney, Agent, or Firm* — Stein IP, LLC

(57) ABSTRACT

The present invention relates a method, the method comprising: based on a data element (50), generating M data element shares (52), wherein M is an integer greater than 1; providing each of M encryption keys (42) to a first data processing unit (10); the first data processing unit (10) encrypting each of the M data element shares (52) with an encryption key (42), respectively, and thus generating M encrypted data element shares (55), wherein each of the encryption keys (42) corresponds to a decryption key (45), respectively. The present invention also relates to a determining method to determine the data element. The present invention also relates to corresponding computer programs, data processing units and systems.

8 Claims, 28 Drawing Sheets

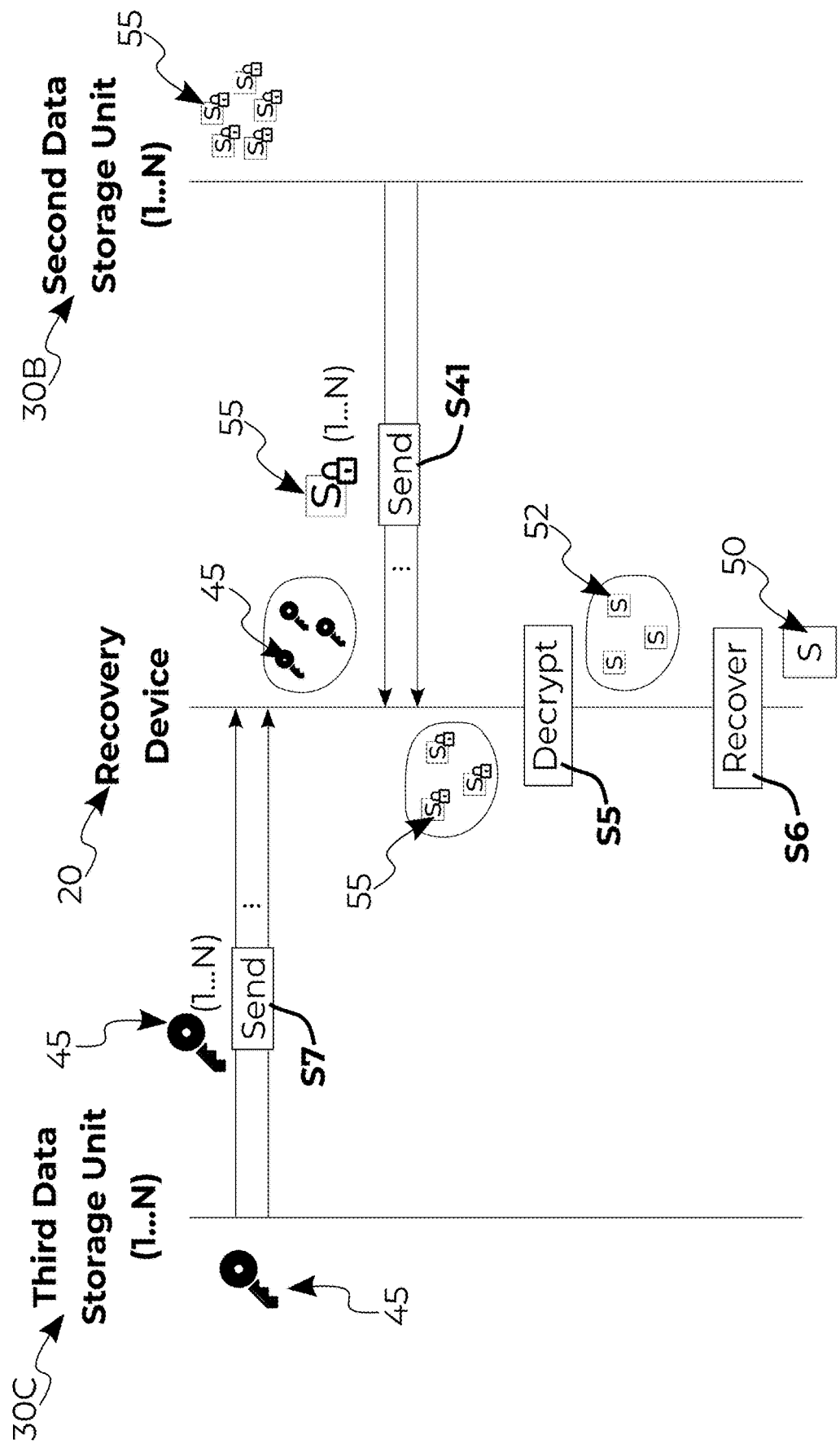

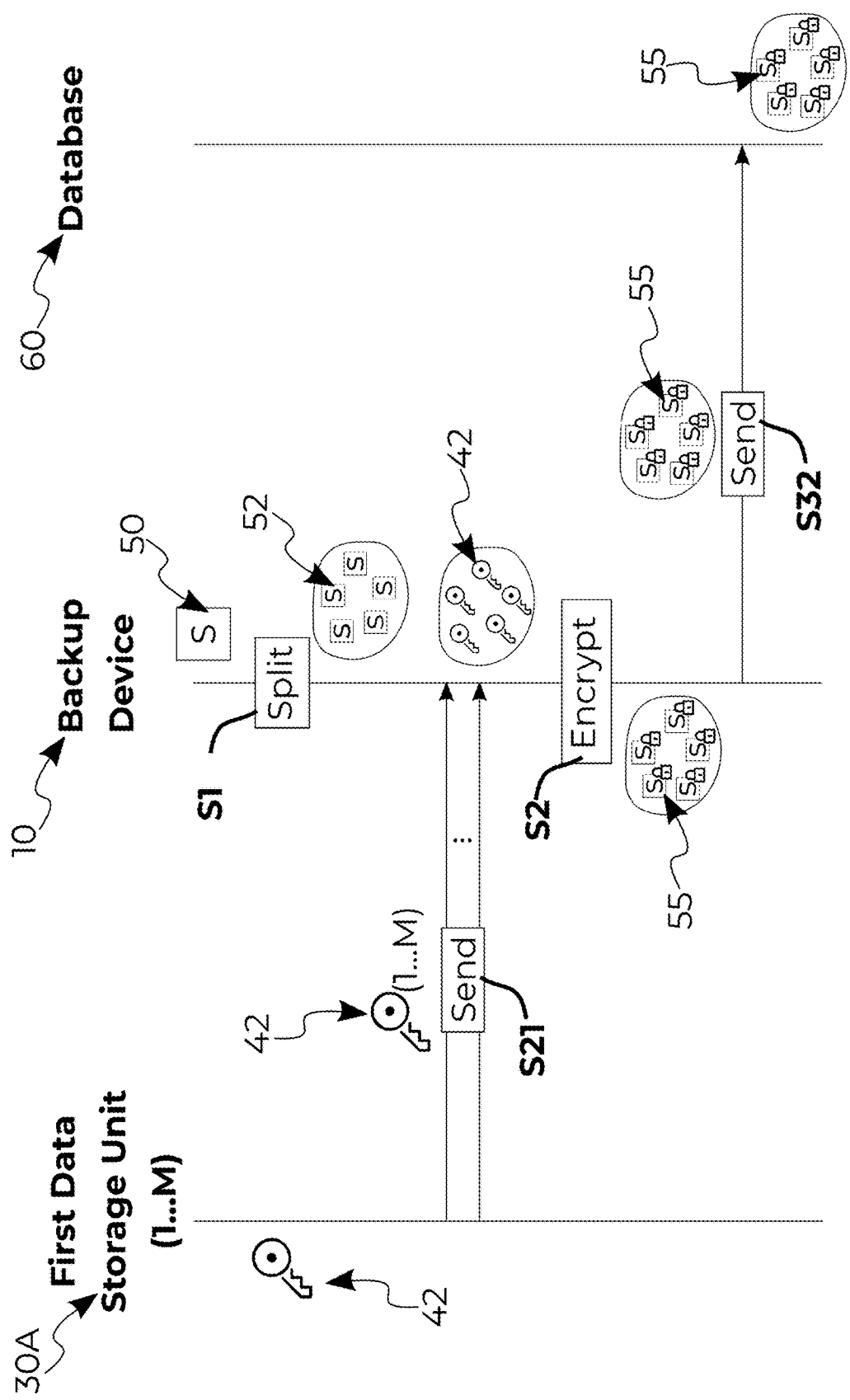

STORING AND DETERMINING A DATA ELEMENT

CROSS-REFERENCE TO RELATED APPLICATIONS

This application claims the benefit of European Application No. 20154430.1, filed Jan. 29, 2020, in the European Patent Office. All disclosures of the document named above are incorporated herein by reference.

The present invention relates to storing and determining data.

As information is becoming more and more electronically accessible, an important task is storing sensible data in a secure manner. Typically, this is achieved through encryption techniques. Through encryption, information can be encoded in such a way that the intelligibility of the data is removed. Thus, even if the encrypted data are accessed by a third party, the original information cannot be recovered unless the data is decrypted.

Data is typically encrypted using an encryption algorithm, referred to as a cipher. The cipher uses an encryption key for encrypting the data. The encryption key is typically pseudo-random. The cipher and the encryption key are implemented such that, in principle, it is not possible to decrypt the message without possessing the decryption key. That is, a well-designed encryption algorithm and a properly generated encryption scheme makes it computationally infeasible to recover the data without access to the decryption key. However, an authorized user (i.e. the user comprising the decryption key) can easily in a computationally feasible manner decrypt the data to recover the original information.

Although there are many algorithm schemes developed, they generally belong to either of the two categories: symmetric encryption and asymmetric encryption.

In a symmetric encryption scheme, the encryption and decryption key are the same. That is, the same key is used both for decryption and decryption. They are also referred to as symmetric-key encryption schemes. Some examples of symmetric encryption schemes are: Blowfish designed by Bruce Schneier, Advanced Encryption Standard (AES) designed by Vincent Rijmen and Joan Daemen, Rivest Cipher 4/5/6 (RC4/5/6) designed by Ron Rivest, Data Encryption Standard (DES) designed by IBM. The most commonly used symmetric algorithm is AES with key lengths 128, 192 or 256 bits.

On the other hand, in an asymmetric encryption scheme, the encryption and decryption keys are not the same. More particularly, the asymmetric encryption scheme involves the generation of a key pair such that if data is encrypted with one of the keys, the other key from the pair can be used to decrypt it and vice versa. Typically, the key pairs are referred to as public key and private key, and the encryption scheme is also referred to as public-encryption scheme. As the name suggests, the public key can be made public (i.e. anyone can have access to it) without impinging the security of the encryption scheme. However, the private key must be kept secret (i.e. stored securely). Typically, data can be encrypted with the public key and can be decrypted only by the private key. As such, anyone can encrypt data using the public key of a user such that only that user (possessing the corresponding private key) can decrypt the data. Furthermore, the public and private key pair are generated such that knowledge on the one does not provide any knowledge on the other key. That is, having one of the keys (e.g. the public key), it is not computationally feasible to determine what the other key is (e.g. the private key). This further ensures that the private key is kept secret even though the public key can be me published. Popular asymmetric encryption schemes are Rivest-Shamir-Adleman (RSA) scheme designed by Ron Rivest, Adi Shamir and Leonard Adleman and Elliptic Curve Cryptography (ECC) designed by Neal Koblitz and Victor S. Miller independently. Asymmetric encryption schemes are mostly used by typical communications carried over unsecured channels (e.g. over the Internet).

Encryption schemes not only provide a secure way of storing and communicating data, but they also form the basis of many other algorithms that allow further tasks to be carried out electronically. One of such functionalities is the ability to electronically sign data. This is performed through digital signatures which can be attached to data. The digital signature allows a recipient of the data to verify the identity of the sender of the data as well as whether the data was altered in transit from sender to recipient. Digital signature algorithms are typically based on asymmetric encryption schemes. A variant of digital signature algorithms based on elliptic curve cryptography is the Elliptic Curve Digital Signature Algorithm (ECDSA).

A further functionality offered through the use of encryption schemes is the electronical proof of identity. This is generally performed through the use of digital certificates issued by a certificate authority. A certificate authority is a trusted entity that issues digital certificates. The holder of a digital certificate can use it to prove its identity. An example of digital certificates is a public key certificate (PKC). PKC proves the ownership of a public key by including information about the public key, information about the identity of the owner and the digital signature of an entity that has verified the certificate's contents (i.e. the certificate authority). The most common format for public key certificates is defined by X.509 standard.

Although encryption schemes are a powerful tool for securely storing and communication information, they require to securely store of at least one key. That is, in case of symmetric encryption, the encryption/decryption key must be kept private and in the case of asymmetric encryption schemes the private key must be securely stored. However, securing such a key can be a challenge as it needs to be ensured that the key can only be accessed by authorized users and that the key is not lost.

Securing keys is a particular problem in blockchain-based technologies. With the appearance of blockchain technologies, asymmetric cryptography has been applied to securing the possession of valuable assets. As an example, the detention of a private key on the Bitcoin blockchain (Elliptic Curve Cryptography based-curve P256k1) provides control (and therefore ownership) to all the bitcoins associated with this private key. The valuable assets can sometimes represent a huge economic value. The rights on these assets is exercised by performing a digital signature, typically Elliptic Curve Cryptographic Digital Signature Algorithm (ECDSA) with the corresponding private key on an intended transaction. The transaction and its digital signature are then broadcast on the corresponding network for validation and inclusion in an immutable block.

Holding such assets represents two problems. On the one hand, in case of loss or destruction of the private key, there is no possibility for recovery and as such the assets become unusable. On the other hand, in case of just a simple visualization of the private key, a thief can transfer and sell for their benefit all the crypto assets. Entities, especially big financial institutions, need to have a solution for these two problems.

The present invention addresses these needs. That is, it is an object of the present invention to provide a technology allowing data to be stored in such manner that allows its recovery, while making it difficult for third parties to obtain knowledge of the data. These objects are met by the present technology.

A first aspect of the present invention relates to a method which can be used for storing a data element. More particularly, in a first aspect, the present invention relates to a method which can be used to securely backup a data element. The method can also be referred to as a backup method, backup process or initialization phase.

The method, according to the first aspect of the preset invention, comprises generating M data element shares based on a data element. M is an integer greater than 1. That is, based on the data element, a plurality of data element shares can be generated.

Further, the method comprises a first data processing unit encrypting each of the M data element shares with an encryption key, respectively. That is, M encryption keys can be provided and each of the M encryption keys can be used to encrypt a respective data element share. Thus, M encrypted data element shares can be generated. Again, each of the M encrypted data element shares can be generated by encrypting a data element share with a respective encryption key.

Each encryption key corresponds to a decryption key, respectively. That is, a one-to-one mapping may exist between the M encryption keys and M decryption keys. An encryption key and the corresponding decryption key can form a key pair. Data encrypted by the encryption key can be decrypted by the decryption key corresponding to the encryption key. That is, if data encrypted by an encryption key can be decrypted using a decryption key then the encryption key and the decryption key correspond to each other.

Further, the method can comprise the first data processing unit outputting the M encrypted data element shares. As discussed, the M encrypted data element shares correspond to data element shares in an encrypted state. As such, the M encrypted data element shares can be output without compromising the security of the data element.

Thus, instead of simply encrypting and storing secret data, as is typical for prior art techniques, the present invention generates a plurality of shares of the secrets, encrypts each share with a respective encryption key and outputs the encrypted data element share. This can allow for the responsibility of maintaining the secrecy of a data element to be shared.

For example, M users can be selected for holding a data element share. The M users can, for example, be co-owners of the data element. For example, the data element may relate to valuable assets (e.g. cryptocurrency assets, or private key(s) corresponding to cryptocurrencies). Each user may comprise (or generate) a cryptographic identity, that is, an encryption key and a corresponding decryption key. In other words, each of the M encryption keys with the corresponding decryption key can correspond to (i.e. can be owned by) a user. Further, each user can be provided with the encrypted data element share that was generated using the user's encryption key. As such, each user can store its corresponding encrypted data element share or at least the respective decryption keys for decrypting each encrypted data element share provided that the encrypted data element share is stored on a memory component, e.g., in a database. Put simply, each user can be responsible for maintaining the secrecy of only one respective data element share of the data element. Thus, the method of the present invention can be particularly advantageous for storing data related to assets co-owned by multiple users. A person skilled in the art will understand that the user of the above example can comprise one or more user devices that can be configured to comprise or generate a cryptographic identity, storing an encrypted data element share, storing an encrypting key and storing a corresponding decryption key. Each user device can for example be a smartphone, tablet, laptop, pocket computer, cellphone, smart card, contact card and/or contactless cars (e.g. NFC card).

Furthermore, the method can be advantageous for increasing robustness against losing the data element, e.g., by generating redundant shares. Typically, prior art techniques increase robustness by storing multiple copies of the data to be kept secret. However, this sacrifices security. The more copies of secret data are stored, the higher the likelihood of one of the copies being stolen. The present technology increases robustness against losing the data element without sacrificing security. For example, as will be discussed in the following, the redundant data element shares can be generated, such that, even if losing one or more data element shares, the data element can still be recovered.

In addition, the method can provide high security as the data element may never be output outside the first data processing unit. As discussed, the method comprises outputting encrypted data element shares. However, without the decryption keys, obtaining the data element shares from the encrypted data element shares is computationally unfeasible.

To further increase security, only the encryption keys can be provided to the first data processing unit. In fact, the decryption keys may not be present at all during the execution of the described method. That is, the first data processing unit and the respective memory components storing the decryption keys may be physically separated, i.e., in remote locations relative to each other. Alternatively or additionally, the respective memory components storing the decryption keys may be offline, i.e., any communication with a device external to said memory components may be blocked by hardware (e.g. a switch) and/or software. Alternatively or additionally, the respective memory components may store the respective decryption keys in a secure manner (e.g. encrypted) and may be configured to decrypt/output the decryption keys during the method. As such, during the above method the data element may not be recovered, preferably, even by the holders of the M encryption keys (i.e. users).

Further still, the first data processing unit may comprise a tamperproof secure microcontroller, such as, a NXP SmartMX secure microcontroller family, e.g. the NXP SmartMX3 P71D321. The use of secure microcontrollers can be particularly advantageous for increasing the security of transactions (i.e. data communications) between the first data processing unit and an external device. That is, a secure microcontroller can facilitate hiding the data element even in case of malware presence. The secure microcontroller can be configured to mitigate side channel attack to discover the data element, can be sandboxed from the rest of the first data processing unit, and can be brute force resistant (e.g. self-destroys after a limited number of failed authentications).

Preferably, the first data processing unit may comprise a secure portion (which can also be referred to as secure enclave). The secure portion can provide hardware and software protection for maintaining the secrecy of the data element. The secure portion can comprise one or more secure microcontroller and one or more secure memory components. The data element and the data element shares (i.e. unencrypted data) can be processed and stored only inside the secure portion. The secure portion can further be configured to output the data element shares only in an encrypted state, i.e., the encrypted data element shares.

Further, the first data processing unit may comprise further components external to the secure portion. These can for example be, a general processor, general microcontroller, general memory devices and I/O interfaces. Said components can facilitate receiving and sending data to/from an external device. Again, outside the secure portion only encrypted data can be present.

Thus, by separating security tasks (e.g. encrypting and decrypting) from general tasks (e.g. communication protocols), the security of the data element can be increased. This, as discussed, can be performed by providing a secure portion of the first data processing unit which can comprise a secure microcontroller (e.g. NXP P71 microcontroller).

It will be noted that the data element can also be referred to as a secret and may comprise a master private key. Similarly, the data element share can also be referred to as a secret share or share and may refer to a share of the data element that is in an unencrypted state. On the other hand, the encrypted data element share can also be referred to as an encrypted secret share or encrypted share and refers to a share of the data element in an encrypted state. A first data processing unit can also be referred to as a backup device. Furthermore, the term key refers to a cryptographic key.

The data element can be determined with N unencrypted data element shares, where N is an integer greater than or equal to 1, and smaller than or equal to M. That is, the data element shares can be generated based on the data element such that at least N data element shares in an unencrypted state are required to determine the data element. In other words, the data element shares can be generated such that some of the data element shares can be redundant. This can be advantageous because it can increase robustness against the loss of decryption keys and/or data element shares. More particularly, at most M-N decryption keys can be lost and the data element can still be determined. Similarly, at most M-N encrypted data element shares can be lost and the data element can still be determined. In general, it would require M-N+1 data element shares to be lost in order to not be able to determine the data element share in a computationally feasible way. A data element share is considered lost if the corresponding unencrypted data element share is lost and/or if the corresponding decryption key is lost.

Each of the M encryption keys can be stored on a separate encryption key storage unit respectively. That is, M separate encryption key storage units can be provided, each storing a respective encryption key of the M encryption keys. Each of the M encryption key storage units can correspond to (i.e. be owned by) a respective user. For example, each of the M encryption key storage units can be a user device corresponding to a user or can be part of (i.e. integrated in or internal to) a user device corresponding to a user. Each user device can for example be a smartphone, tablet, laptop, pocket computer, cellphone, smart card, contact card and/or contactless cars (e.g. NFC card). That is, M users can comprise a respective encryption key which can be stored on the user's respective encryption key storage unit or on the user's respective user device comprising an encryption key storage unit. Each of the encryption key storage units can be a stand-alone memory component that can store an encryption key. Alternatively, each of the encryption key storage units can be part of a respective memory component that can store, among other data, an encryption key of the M encryption keys. In some embodiments, each encryption key storage unit can be integrated in or comprised by a smart card (e.g. a contact or contactless card, such as, a near field communication (NFC) card). Furthermore, each smart card can be owned by (i.e. correspond to) a respective user.

As discussed, the encrypted data element shares can be output by the first data processing unit. After that, the encrypted data element shares can be stored either in a distributed manner or in a centralized manner or both.

That is, the method can comprise storing each of the encrypted data element shares on separate data share storage units, respectively. That is, M separate data share storage units can be provided, each for storing a respective encrypted data element share of the M encrypted data element shares. Each of the M data share storage units can correspond to (i.e. be owned by) a respective user. For example, each of the M data share storage units can be a user device corresponding to a user or can be part of (i.e. integrated in or internal to) a user device corresponding to a user. Each user device can for example be a smartphone, tablet, laptop, pocket computer, cellphone, smart card, contact card and/or contactless cars (e.g. NFC card). That is, M users can be provided with a respective encrypted data element share which can be stored on the user's respective data share storage unit or on the user's respective user device comprising a data share storage unit. Each of the data share storage units can be a stand-alone memory component that can store an encrypted data element share. Alternatively, each of the data share storage units can be part of a respective memory component that can store, among other data, an encrypted data element share of the M encrypted data element shares. In some embodiments, each data share storage unit can be integrated in or comprised by a smart card (e.g. a contact or contactless card, such as, a near field communication (NFC) card). Furthermore, each smart card can be owned by (i.e. correspond to) a respective user.

Storing the encrypted data element shares in respective data share storage units can be advantageous as it can allow sharing the encrypted data element shares. For example, M users, each owning a respective data share storage unit, can be provided with a corresponding encrypted data element share. It will be noted that an encrypted data element share can correspond to a user if the encryption key used to generate the encrypted data element share also corresponds to the user. Similarly, an encrypted data element share can correspond to a user if the decryption key that can be used to decrypt the encrypted data element share also corresponds to the user.

Alternatively or additionally, the method can comprise storing each of the M encrypted data element shares on a database. Thus, all the data element shares can be stored on a database. As the encrypted data element shares are in an encrypted state, the database need not be a secure database. That is, the database can be a public database.

Furthermore, it can be advantageous to store each of the M encrypted data element shares on a separate data share storage unit and on a database. That is, the encrypted data element shares can in addition be backed up on a database. Hence, if one of the data share storage units gets damaged or lost, then the respective encrypted data element share stored therein can be obtained from the database.

Again, each of the M encryption keys used to encrypt a data element share and generate an encrypted data element share can be stored on a respective encryption key storage unit. On the other hand, each encrypted data element share can be stored on a respective data share storage unit. As each encryption key is used to generate a respective encrypted data element share, each encryption key storage unit can correspond to a data share storage unit. In other words, a one-to-one mapping can exist between the M encryption key storage units and M data share storage units, which mapping indicates which encryption key is used for generating which encrypted share.

In some embodiments, pairs of corresponding encryption key storage units and data share storage units can be internal to respective data storage units. More particularly, M separate data storage units can be provided. Each of the M data storage unit can respectively comprise one encryption key storage unit and on data share storage unit wherein the encryption key stored on the encryption key storage unit of the respective data storage unit is used to generate the encrypted data element share stored on the respective data share storage unit of the respective data storage unit. In other words, each of the data storage units can store a respective encryption key and a respective encrypted data element share, wherein the encrypted data element share is generated using the encryption key. Put simply, each of the data storage units can store an encryption key and the corresponding encrypted data element share.

Each of the M data storage units can correspond to (i.e. be owned by) a respective user. For example, each of the M data storage units can be a user device corresponding to a user or can be part of (i.e. integrated in or internal to) a user device corresponding to a user. Each user device can for example be a smartphone, tablet, laptop, pocket computer, cellphone, smart card, contact card and/or contactless cars (e.g. NFC card). That is, each of the M users can comprise a respective encryption key which can be stored on the user's data storage unit or on the user's respective user device comprising a data storage unit. Furthermore, M users can be provided with a respective encrypted data element share which can be stored on the user's respective data storage unit or on the user's respective user device comprising a data storage unit. Each of the data storage units can be a stand-alone memory component that can store an encryption key and the corresponding encrypted data element share. Alternatively, each of the data storage units can be part of a respective memory component that can store, among other data, an encryption key and the corresponding encrypted data element share of the M encrypted data element shares. In some embodiments, each data storage unit can be integrated in or comprised by a smart card (e.g. a contact or contactless card, such as, a near field communication (NFC) card). Furthermore, each smart card can be owned by (i.e. correspond to) a respective user.

Put simply, an encryption key and the corresponding encrypted data element share can be stored on separate storage units, i.e., in an encryption key storage unit and data share storage unit, respectively. Alternatively, an encryption key and the corresponding encrypted data element share can be stored on a single storage unit, i.e., in a data storage unit.

Storing an encryption key and the corresponding encrypted data element share in a respective data storage unit can be advantageous because the correspondence between encryption keys and encrypted data element shares is indicated by the physical storage location. That is, if an encryption key and an encrypted data element share are stored on the same data storage unit, then they the encryption key and the encrypted data element share correspond to each other, i.e., the encrypted data element share is generated using that encryption key.

Furthermore, storing an encryption key and the corresponding encrypted data element share in a respective data storage unit may require only one interface with the first data processing unit. Said interface (i.e. communication channel) can be established between each data storage unit and the first data processing unit. Thus, respective interfaces can be used to provide the encryption key from each data storage unit to the first data processing unit. Additionally, respective interfaces can be used to provide the corresponding encrypted data element share from the first data processing unit to the data storage unit.

For example, each user may provide its respective data storage unit (or user device comprising the data storage unit). A respective communication channel can be established between each data storage unit and the first data processing unit, i.e., each data storage unit can be connected for data transmission with the first data processing unit. In some embodiments, all of the M data storage units can be connected simultaneously with the first data processing unit. Thus, the first data processing unit may be configured for simultaneously being connected to M external devices, such as, M data storage units or M user devices. For example, the first data processing unit may comprise M separate interfaces (e.g. M ports, such as, M smart card readers) and/or less then M separate interfaces configured for multiplexing multiple connections. Alternatively, the M data storage units can be connected less then M at a time (e.g. one at a time, two a time, three at a time).

Each data storage unit can provide the encryption key which it stores to the first data processing unit. The first data processing unit, using the received encryption key from a data storage unit, can encrypt a data element share, thus generating an encrypted data element share. The first data processing unit outputs the encrypted data element share to the data storage unit, wherein the encrypted data element share can be stored.

In embodiments, wherein the M encrypted data element shares can be stored on a database, the database can be an external database. More particularly, the database can be external to all the encryption key storage units. Furthermore, the database can be external to all the data share storage units. That is, the database can be a stand-alone component. For example, the database may be a remote database.

Thus, the step of the first data processing unit outputting the M encrypted data element shares can comprise the first data processing unit providing each of the M encrypted data element shares to a separate data share storage unit, respectively. This can be advantageous, as each of the M encrypted data element shares can be directly provided to the respective data share storage unit from the first data processing unit.

As discussed, in some embodiments, each data storage unit may be comprised by (i.e. internal to) a data storage unit. In such embodiments, the step of the first data processing unit providing each of the M encrypted data element shares to a separate data share storage unit, respectively, can comprise the first data processing unit providing to each data storage unit of the M data storage units a corresponding encrypted data element share. Again, an encrypted data element share of the M encrypted data element shares corresponding to a data storage unit of the M data storage units means that the encryption key with which the encrypted data element share is generated is stored on the respective data storage unit, such as, in the respective encryption key storage unit of the respective data storage unit. This can be advantageous, as each of the M encrypted data element shares can be directly provided to the respective data storage unit from the first data processing unit.

Alternatively or additionally, outputting the M encrypted data element shares can comprise the first data processing unit providing each of the M encrypted data element shares to the database. This can be advantageous, as the M encrypted data element shares can be directly provided to the database from the first data processing unit.

In some embodiments, the step of based on a data element, generating M data element shares, can be based on a secret sharing scheme, preferably a threshold secret sharing scheme with a total number of shares equal to M and threshold equal to N, such as, the Shamir's secret sharing scheme and/or the Berkley's secret sharing scheme. It will be noted that a secret sharing scheme can also be referred to as secret sharing, secret splitting or secret splitting scheme.

Using a secret sharing scheme, such as, the Shamir's secret sharing scheme or the Berkley's secret sharing scheme, can be advantageous as it can provide an efficient way for generating the data element shares based on a data element. Furthermore, they can allow the generation of any number of data element shares (i.e. M can be any number) and they can also allow the threshold (i.e. number of data element shares for determining the data element) to be any number between 1 and M. Moreover, the data element shares can be generated, such that, they do not comprise actual parts of the contents of the data element. That is, even if a data element share can be obtained (e.g. by decrypting an encrypted data element share), contents of the data element are not revealed. In other words, a secret sharing scheme can be configured such that anyone with fewer than N data element shares can comprise no more information about the data element than someone with 0 shares, in that, the data element share can be obtained in a computationally feasible way. This can guarantee that the data element is secured as long as M−N+1 data element shares are not obtained.

For example, the data element shares can be generated by mapping the data element to a point of a graph represented by a polynomial, wherein the polynomial has a degree of N−1 and generating the M data element shares based on M different points of the graph represented by the polynomial. Preferably, the point wherein the data element can be mapped is different from the M different points based on which the M data element shares can be generated. Thus, the data element cannot be distributed as one of the data element shares. The polynomial can be generated by randomly generating N−1 coefficients of the polynomial and calculating the $N^{th}$ coefficient such that the point wherein the data element is mapped lies on the graph represented by the polynomial.

In some embodiments, the step of based on a data element, generating M data element shares is carried out by the first data processing unit. Thus, the data element shares can be generated and encrypted on the first data processing unit. This can increase security as the data element shares can live in an unencrypted state only inside the first data processing unit.

The method can further comprise providing each of M encryption keys to the first data processing unit.

For example, each of the M encryption keys stored on a respective separate encryption key storage unit can be provided to the first data processing unit. That is, the M different encryption keys can be stored on or correspond to other devices external to the first data processing unit and can be provided to the first data processing unit for encrypting the data element shares. For example, each of the M encryption keys can be provided from the respective encryption key storage unit to the first data processing unit.

Each of the M encryption keys can be stored on a respective user device. That is, M separate user devices can be provided, each storing a respective encryption key of the M encryption keys. Each user device can for example be a smartphone, tablet, laptop, pocket computer, cellphone, smart card, contact card and/or contactless cars (e.g. NFC card).

Each of the M user devices can comprise a respective encryption key storage unit that can store an encryption key. Thus, each of the M user devices can comprise a corresponding encryption key. The encryption key corresponding to a user device can be used to increase the security of communication with the user device. This can be achieved by encrypting data to be provided to the user device with the encryption key of the user device before providing the data to the user device. Hence, data can be provided in an encrypted state to the user device. For example, the data element shares can be encrypted with the encryption key of a user device, before providing it to the user device. Instead of providing the data element share to the user device, the encrypted data element share can be provided. Thus, even if the communication between the user device and the first data processing unit is intercepted by a non-authorized user or device, information on the content of the data element share cannot be obtained.

Alternatively or additionally, each of the M user device can comprise a respective data share storage unit. Thus, the encrypted data element shares can be stored on the user device.

In some embodiments, each of the M user devices may comprise a respective encryption key storage unit and a respective data share storage unit. In other words, each of the M user device may comprise a respective data storage unit that can store an encryption key (in an encryption key storage unit comprised therein) and a corresponding encrypted data element share (in a data share storage unit comprised therein).

For example, each user may provide its respective user device. A respective communication channel can be established between each user device and the first data processing unit, i.e., each user device can be connected for data transmission with the first data processing unit. In some embodiments, all of the M user devices can be connected simultaneously with the first data processing unit. Thus, the first data processing unit may be configured for simultaneously being connected to M external devices, such as, M user devices. For example, the first data processing unit may comprise M separate interfaces (e.g. M ports, such as, M smart card readers, M receiver antennas) and/or less than M separate interfaces configured for multiplexing multiple connections. Alternatively, the M user devices can be connected less than M at a time (e.g. one at a time, two a time, three at a time).

Each user device can provide its corresponding encryption key, which it stores, to the first data processing unit. The first data processing unit, using the received encryption key from a user device, can encrypt a data element share, thus generating an encrypted data element share. The first data processing unit can output the encrypted data element share to the user device, wherein the encrypted data element share can be stored. Thus, each user device can store an encryption key, be provided with an encrypted data element share obtained using the encryption key of the user device and store the provided encrypted data element share.

In some embodiments, the step of providing to the first data processing unit M different encryption keys comprises providing each encryption key with a corresponding digital certificate, such as, a X.509 certificate. Digital certificates are particularly advantageous for proving the ownership of an encryption key and/or the authenticity of the sender of the encryption key. Typically, digital certificates are issued by a third-party entity, also referred to as a certificate authority (CA) that is known and trusted by the communicating parties.

The step of the first data processing unit encrypting each of the M data element shares with an encryption key can be based on an asymmetric encryption scheme, such as, RSA, ECC P256k1, ECC P256r1, or X25519. In an asymmetric encryption scheme two cryptographic keys are used: a private key and a public key. For secure communication, the public key of a receiver is used by a sender to encrypt data and the private key of the received is used by the receiver to decrypt data. Thus, if an asymmetric encryption scheme is used for encrypting the data element shares, each of the encryption keys is a public key and each of the decryption keys is a private key. However, it will be understood that the above are only some exemplary encryption schemes that can be used.

In some embodiments, the method can further comprise storing each of the M decryption keys corresponding to each of the M encryption keys, respectively, on a separate decryption key storage unit, respectively. Storing the decryption keys on separate decryption key storage units can be a particularly secure way of storing the decryption keys. It will be noted that maintaining the secrecy of the data element depends on maintain the secrecy of the decryption keys. As such, the separate decryption key storage units can be a secure memory or part of a secure memory, such as, a self-encrypted memory. That is, the separate decryption key storage units can be configured to securely store the respective decryption key, e.g., by storing the respective decryption key in an encrypted state.

Furthermore, storing the decryption keys on separate decryption key storage units can facilitate prohibiting the provision or use of the decryption keys during the method of the first aspect of the present invention. That is, during the backup of the data element, the decryption key storage units may not be present or may not be provided or may be configured not to output the decryption key in an unencrypted state. As such, during the backup method the data element cannot be determined because, as discussed, the decryption key storage units can be configured to make it difficult or computationally unfeasible to obtain the decryption keys stored therein.

In some embodiments, M separate computing units can be provided each configured to access a respective encryption key storage unit. The computing unit may be a single processor or a plurality of processors, and may be, a CPU (central processing unit), GPU (graphical processing unit), DSP (digital signal processor), APU (accelerator processing unit), ASIC (application-specific integrated circuit), ASIP (application-specific instruction-set processor) or FPGA (field programmable gate array). Thus, each computing unit can be provided with the encryption key stored on the respective encryption key storage unit that the computing unit can access. In addition, the computing unit can access a respective data share storage unit that stores the encrypted data element share which encryption key is stored on the encryption key storage unit. That is, the computing unit can be provided with an encrypted data element share corresponding to the encryption key that the computing unit can receive from the encryption key storage unit it can access. Alternatively or additionally, the computing unit can be configured to access the database. Thus, the computing unit can be provided from the database with an encrypted data element share corresponding to the encryption key that the computing unit can receive from the encryption key storage unit it can access.

Furthermore, each of the M computing units can be configured to access a respective decryption key storage unit wherein the decryption key stored therein corresponds to the encryption key stored on the encryption key storage unit that the computing unit is configured to access.

Thus, the computing unit can receive an encryption key, the encrypted data element share encrypted with said encryption key and the decryption key corresponding to the said encryption key and that can be used to decrypt the said encrypted data element share.

For each computing unit, the respective computing unit and the respective encryption key storage unit, that the computing unit is configured to access, can be integrated into a single device. For example, a user device may comprise one computing unit and one encryption key storage unit, wherein the computing unit is configured to access the encryption key storage unit.

For each computing unit, the respective computing unit and the respective data share storage unit, that the computing unit is configured to access, can be integrated into a single device. For example, a user device may comprise one computing unit and one data share storage unit, wherein the computing unit is configured to access the data share storage unit.

For each computing unit, the respective computing unit, the respective encryption key storage unit and the respective data share storage unit, that the computing unit is configured to access, can be integrated into a single device. For example, a user device may comprise one computing unit and one encryption key storage unit and one data share storage unit, wherein the computing unit is configured to access the encryption key storage unit and the data share storage unit.

For each computing unit, the respective computing unit and the respective decryption key storage unit, that the computing unit is configured to access, are integrated into a single device. For example, a user device may comprise one computing unit and one decryption key storage unit, wherein the computing unit is configured to access the decryption key storage unit.

In some embodiments, the first data processing unit may execute an authentication protocol prior to transferring data with an external device. That is, before sending data to an external device the first data processing unit can execute an authentication protocol to verify the identity of the external device. Similarly, before receiving data from an external device the first data processing can execute an authentication protocol to verify the identity of the external device. The external device can be each of the encryption key storage units, each of the data share storage units, the database, each of the data storage units, each of the user devices, each of the computing units, as discussed in the respective embodiments above.

Thus, the first data processing unit can communicate only with authenticated devices. As such, an un-authorized device may not send and/or receive data to/from the first data processing unit. This can decrease the risk of an un-authorized device breaching the security of the first data processing unit.

Different authentication protocols can be executed by the first data processing unit for authenticating an external device, such as, each of the data share storage units, the database, each of the data storage units, each of the user devices, each of the computing units, as discussed in the respective embodiments above. That is, the present invention is not limited to a particular authentication protocol. For example, the authentication protocol that can be executed by the first data processing unit can be based on a password authentication protocol (PAP), challenge-handshake authentication protocol (CHAP), extensible authentication protocol (EAP), authentication-authorization-accounting (AAA) architecture protocols, such as, terminal access controller access-control system (TACACS), Extended TACACS, TACACS+, remote authentication dial-in user service (RADIUS), diameter protocol, Kerberos protocol, RFID authentication protocols, physical unclonable function (PUF) based authentication or any combination thereof.

Typically, authentication of the external device by the first data processing unit can be based on a challenge-response authentication, wherein the first data processing unit can provide a challenge to the external device and the external device is required to provide a valid response to the challenge to be authenticated.

Similarly, the external device can execute an authentication protocol (e.g. any of the above-mentioned authentication protocols) for authenticating the first data processing unit before sending and/or receiving data to/from the first data processing unit. In such embodiments, the external device can send a challenge to the first data processing unit and the first data processing unit is required to provide a valid response to the challenge to be authenticated.

In some embodiments, only upon successful authentication of the external device by the first data processing unit and/or the first data processing unit by the external device, communication between the external device and the first data processing unit may initiate. Again, for the sake of brevity, the term external device is used in the above to refer to any of each of the encryption key storage units, each of the data share storage units, the database, each of the data storage units, each of the user devices, each of the computing units, as discussed in the respective embodiments above.

In some embodiments, the method can comprise storing each of the M encrypted data elements shares on the first data processing unit. This can be performed for backup purposes.

In some embodiments, wherein the data element can be determined with N unencrypted data element shares, the data element can be equal to 2. That is, the data element can be determined with at least 2 of the M data element shares in an unencrypted state. As will be discussed further below, this can be particularly advantageous for providing a seamless end user experience for performing digital signatures with the data element, while at the same time maintaining the security of the data element.

In such embodiments, the method can comprise storing one of the M data element shares in the first data processing unit and storing each of the remaining M−1 data element shares in a respective password protected storage. This can further facilitate providing a seamless end user experience for performing digital signatures with the data element, while at the same time maintaining the security of the data element.

In some embodiments, the method can comprise generating a respective password for each of the M−1 password protected storages.

Each of the M−1 password protected storages can allow access to the data stored therein if the corresponding password is provided. This may increase security against an unauthorized party accessing the data stored in the password protected storage.

In some embodiments, storing each of the remaining M−1 data element shares in a respective password protected storage comprises storing each of the remaining M−1 data element shares encrypted with the password generated for the respective password protected storage. Thus, even when access to the password protected storage can be gained, without the respective password of the password protected storage the data element share cannot be obtained in an unencrypted state. This facilitates the password protected storage allowing access to the data stored therein only if the corresponding password is provided.

In some embodiments, generating a respective password for each of the M−1 password protected storages can comprise each of M−1 users defining a user defined password for a respective password protected storage.

Additionally or alternatively, generating a respective password for each of the M−1 password protected storages can comprise generating a respective computer program specific password and each computer program specific password can be used by a respective computer program to access the data element share stored in the respective password protected storage that the computer program specific password corresponds to. Generating a respective password for each of the M−1 password protected storages can facilitate the automation of receiving a data element share stored in a respective password protected storage. This can further facilitate providing a seamless end user experience for performing digital signatures with the data element, while at the same time maintaining the security of the data element.

Each of the M−1 computer programs can be executed on a respective user device.

At least one of the computer program specific passwords may be an app-specific password. In such embodiments, the computer program can be an application software (typically also referred to as app).

Each of the M−1 password protected storages can be part of a respective cloud-based storage. The cloud-based storage can, for example, be Google Drive developed by Google LLC.

Each cloud-based storage can correspond to a respective user. For example, each user can comprise an account with respect to a cloud-based storage service provider, hence being provided with a storage space on the cloud-based storage, which the user can access with a user device.

For each cloud-based storage, credential data can be generated and each cloud-based storage can be accessed only if the correct credential data are provided. For example, the credential data can be linked to the account with respect to the user on the cloud-based storage service provider Each of the credential data can comprise a unique ID and at least one of a password, a one-time PIN, biometric data of a user, a digital certificate and a private key.

In some embodiments, the method can be a computer implemented method. This can allow the automation of generating M data element share based on a data element, encrypting each of the M data element shares and thus generating M encrypted data element shares and outputting the M encrypted data element shares. That is, the method can be implemented as a set of computer-instructions which can be carried out by one or more processing devices, one of each being the first data processing unit.

In a further aspect, the present invention relates to a first computer program comprising instructions which, when the program is executed by a first data processing unit causes the first data processing unit to encrypt, according to any of the preceding method embodiments, each of M data element shares with an encryption key, respectively, and thus generating M encrypted data element shares, wherein each of the encryption keys corresponds to a decryption key, respectively.

Further, the first computer program can cause the first data processing unit to transmit, according to any of the preceding method embodiments, each of the encrypted data element shares to at least one of a respective encryption key storage unit and database.

The first computer program can be provided to first data processing unit, e.g., in a memory component of the first data processing unit, and can facilitate the first data processing unit to automatically carry out part of the steps of the method according to any of the above discussed embodiments.

In a further aspect, the present invention relates to a second computer program comprising instructions which, when the program is executed by a first data processing unit causes the first data processing unit to carry out or facilitate the steps of the method according to any of the preceding method embodiments.

In a further aspect, the present invention relates to a third computer program comprising instructions which, when the program is executed by an external device can cause the external device to provide an encryption key comprised by the external device to the first data processing unit. This is particularly advantageous when the M encryption key storage units or the M data storage units or the M user devices or the M computing units are provided. For example, the computer program can facilitate providing the M encryption keys from the M encryption key storage units, the M data storage units or the M user devices to the first data processing unit. For example, each of M user devices or the M computing units can execute the third computer program to provide their respective encryption key to the first data processing unit.

Alternatively or additionally, the third computer program, when the program is executed by an external device, can cause the external device to receive an encrypted data element share generated using the encryption key. This is particularly advantageous when the M encryption key storage units or the M data storage units or the M user devices or the M computing units are provided. For example, the computer program can facilitate the M encryption key storage units, the M data storage units or the M user devices receiving the M encrypted data element shares from the first data processing unit. For example, each of M user devices or the M computing units can execute the third computer program to receive a respective encrypted share from the first data processing unit.

Alternatively or additionally, the third computer program, when the program is executed by an external device, can cause the external device to receive M encrypted data element shares. This is particularly advantageous when the database is provided. The computer program can facilitate the database to receive M encrypted data element shares from the first data processing unit.

In a further aspect, the present invention relates to a system which can be configured for storing a data element.

The system comprises a first data processing unit configured to generate M data element shares based on a data element, wherein M is an integer greater than 1. Further, the first data processing unit is configured to encrypt each of the M data element shares with an encryption key, respectively, and to thus generate M encrypted data element shares, wherein each of the encryption keys corresponds to a decryption key, respectively.

Further, the first data processing unit can be configured to output the M encrypted data element shares.

The first data processing unit can comprise a processing unit, such as, a microcontroller, preferably a tamperproof (i.e. secure) microcontroller. For example, the first data processing unit can comprise a microcontroller from the NXP SmartMX secure microcontroller family, e.g. the NXP P71. The use of secure microcontrollers can be particularly advantageous for executing security sensitive tasks, such as, generating the data element (e.g. generating a random string), generating based on the data element data element shares and encrypting the data element shares. This way the data element and the data element shares can only be present (i.e. live) in a secure environment. The secure microcontroller can be configured to provide hardware and software solutions to mitigate malware presence.

For example, the secure microcontroller can be sandboxed from the rest of the first data processing unit (e.g. from I/O interfaces of the first data processing unit). More particularly, the secure microcontroller can be configured to send/receive data only upon successful authentication of the sender/receiver. Furthermore, it can be configured to only execute a limited amount of instructions, e.g., generating the data element (e.g. generating a random string), generating based on the data element data element shares and encrypting the data element shares. Furthermore, it can be configured to output the data element shares. Furthermore, it can be configured to receive only encryption keys and preferably encryption keys with certificates issued by a trusted certificate authority. Thus, even under malware presence the secrecy of the data element can be still preserved. The secure microcontroller can be configured to prevent malware from providing instructions to the secure microcontroller and/or from receiving the data element and/or the data element shares in an unencrypted state.

Furthermore, the secure microcontroller can be configured to mitigate side channel attacks, such as, through outside electricity consumption measures. Further still, the secure microcontroller can be configured to be resistant to brute-force attacks. For example, the secure microcontroller may auto destroy (e.g. reset, clear all of its memories) after a limited number of failed authentications.

It will be understood, that any available secure microcontroller can be used with the present invention, such as the NXP P71 secure microcontroller.

In addition, the first data processing unit may comprise a general processing unit configured to carry out general tasks not impacting the security of the data element, such as, sending and receiving encrypted data element shares and/or encryption keys to/from external devices that are external to the first data processing unit.

That is, the secure microcontroller can be configured to execute tasks related to data from which the data element can be determined, such as, the data element and the data element shares in an unencrypted state and the general processing unit can be configured to execute tasks related to data from which the data element cannot be determined, such as, the encryption keys (that can be provided to the first data processing unit) and the encrypted data element shares. Furthermore, the first data processing unit can be configured to execute all the tasks related to data from which the data element can be determined on the secure microcontroller.

The first data processing unit may further comprise a memory device, preferably a secure memory device, such as, a self-encrypted memory. The use of a secure memory device can be particularly advantageous for storing the data element and the data element shares in a secure manner. For example, the secure memory can be configured to only be accessed by the secured microcontroller discussed above.

In addition, the first data processing unit may comprise a general memory device, which can be configured to store data from which the data element cannot be determined, such as, encryption keys that can be provided to the first data processing unit and/or computer instructions.

Put simply, the first data processing unit may comprise a secure portion which can comprise hardware-based and software-based security features. The secure portion, which can comprise one or more secure microcontroller and/or one or more secure memory devices, can be advantageous particularly for processing and/or storing data from which the data element can be determined. Thus, the secure portion can facilitate hiding the data element.

The first data processing unit can comprise at least one hardware accelerator, and is preferably configured to increase the efficiency of executing at least one of asymmetric public/private key algorithm such as, and not limited to, RSA, ECC P256k1, ECC P256r1, X25519, Shamir's secret sharing algorithm, Elliptic Curve Cryptographic Digital Signature Algorithm (ECDSA), key derivation algorithm (e.g. adapted KDF-BIP 32) and SHA 1, SHA 256. That is, the first data processing unit can be customized to efficiently execute cryptographic algorithms.

The first data processing unit can comprise an external communication component configured to facilitate sending and/or receiving data to/from a device external to the first data processing unit. This can be particularly advantageous as it can facilitate providing the M encryption keys to the first data processing unit. It can further facilitate the first data processing unit outputting the M encrypted data element shares. The external communication component may comprise one or more I/O device or interface.

The first data processing unit can comprise an internal communication component which can be configured to allow the internal components of the first data processing unit to communicate with each other. That is, the first data processing unit can comprise one or more processors, one or more microcontrollers, one or more memory components, one or more I/O devices or interfaces and one or more accelerators which can transfer data between each other through the internal communication component. Typically, the internal communication component can comprise a bus connection that can interconnect and facilitate synchronizing the communication between two or more internal components of the first data processing unit.

The first data processing unit may comprise an input user interface which can facilitate a user of the first data processing unit to provide at least one input, e.g. an instruction, to the first data processing unit. The input user interface may comprise a button, a keypad, keyboard, number pad, mouse or any combination thereof.

The first data processing unit can comprise an output user interface configured to provide indications to the user of the first data processing unit.

The first data processing unit can be configured to execute a data encryption routine, such as, an asymmetric encryption routine. The data encryption routine can be a computer program comprising instructions which, when the program is executed by a computer can cause the computer to encrypt data. Thus, when the data encryption routine is executed by the first data processing unit, one or more data element shares can be encrypted and therefore generating encrypted data element shares.

As discussed, the first data processing unit may comprise a memory device. The memory device can be configured to store computer instructions of at least one data encryption routine. This can facilitate automating the encryption of the data element shares by the first data processing unit.

The first data processing unit can be configured to execute a data splitting routine, such as, a secret sharing scheme, e.g., a Shamir's secret sharing scheme. The data splitting routine can for example be a computer program comprising instructions which, when the program is executed by a computer, can cause the computer to split information about determining the data into multiple parts. Thus, when the data splitting routine is executed by the first data processing unit, one or more data element shares can be generated.

As discussed, the first data processing unit may comprise a memory device. The memory device can be configured to store computer instructions of at least one data splitting routine. This can facilitate automating the generation of the data element shares.

The system can further comprise M separate encryption key storage units, each configured to store a respective encryption key. That is, the M encryption keys can be stored externally to the first data processing unit.

The first data processing unit is configured to at least receive data from each of the encryption key storage units. This can facilitate the first data processing unit receive the M encryption keys.

The system further comprises a respective data communication channel between the first data processing unit and each of the encryption key storage units. This can facilitate transferring data between the first data processing unit and the encryption key storage units.

The first data processing unit can be configured to receive M encryption keys.

In one embodiments, the first data processing unit can be configured to receive a respective encryption key from each of the M encryption key storage units, respectively. Thus, the encryption keys can be stored externally to the first data processing unit and can be provided to the first data processing unit.

Further the system can comprise M separate data share storage units configured to store a respective encrypted data element share. Thus, the system can be configured to store the encrypted data element shares in a distributed manner.

The first data processing unit can be configured to at least provide data to each of the at least M data share storage units. This can facilitate providing each of the M encrypted data element shares to a respective data share storage unit.

The system can further comprise a respective data communication channel between the first data processing unit and each of the data share storage units. This can facilitate transferring data between the first data processing unit and each of the data share storage units.

The first data processing unit can be configured to provide a respective encrypted data element share to each of the M data share storage units, respectively. Thus, the M encrypted data element shares can be generated by the first data processing unit and can then be distributed among M data share storage units.

The system can further comprise a database configured to store a plurality of encrypted data element shares, preferably M encrypted data element shares. That is, the M encrypted data element share can be centrally stored on a database.

The first data processing unit can be configured to at least provide data to the database. Thus, the plurality of encrypted data element shares can be provided to the database directly from the first data processing unit.

The system can further comprise a data communication channel between the first data processing unit and the database. This can facilitate transferring data from the first data processing unit to the database.

The first data processing unit can be configured to provide the M encrypted data element shares to the database. That is, the M encrypted data element shares can be generated by the first data processing unit and can be provided to the database.

In embodiments wherein the M separate encryption key data storage units are provided, each of the encryption key storage units can be external to the first data processing unit. That is, the encryption keys can correspond to devices that are external to the first data processing unit.

In embodiments wherein the M separate data share storage units are provided, each of the data share storage units can be external to the first data processing unit. Thus, the encrypted data element share can be stored on a distributed manner and externally to the first data processing unit.

In embodiments wherein the database is provided, the database can be external to the first data processing unit.

Moreover, for each encryption key storage unit there can be one corresponding data share storage unit such that the encrypted data element share stored on the data share storage unit can be generated using the encryption key stored on the encryption key storage unit. That is, there can be a one-to-one mapping between the M data share storage units and the M encryption key storage units.

Moreover, for each encryption key storage unit, the respective encryption key storage unit and the corresponding data share storage unit can be embedded in a single device, such as, in a data storage unit. That is, the system may comprise M separate data storage units each configured to store an encryption key and the encrypted data element share generated using the encryption key.

In some embodiments, the data storage unit can be part of a user device. That is, each of the M data storage units can correspond to (i.e. be owned by) a respective user. For example, each of the M data storage units can be a user device corresponding to a user or can be part of (i.e. integrated in or internal to) a user device corresponding to a user. Each user device can for example be a smartphone, tablet, laptop, pocket computer, cellphone, smart card, contact card and/or contactless cars (e.g. NFC card). That is, each of the M users can comprise a respective encryption key which can be stored on the user's data storage unit or on the user's respective user device comprising a data storage unit. Furthermore, M users can be provided with a respective encrypted data element share which can be stored on the user's respective data storage unit or on the user's respective user device comprising a data storage unit. Each of the data storage units can be a stand-alone memory component that can store an encryption key and the corresponding encrypted data element share. Alternatively, each of the data storage units can be part of a respective memory component that can store, among other data, an encryption key and the corresponding encrypted data element share of the M encrypted data element shares. In some embodiments, each data storage unit can be integrated in or comprised by a smart card (e.g. a contact or contactless card, such as, a near field communication (NFC) card). Furthermore, each smart card can be owned by (i.e. correspond to) a respective user.

The data element can comprise digital data to be protected.

Alternatively, the data element can comprise an encryption key used to encrypt digital data to be protected. This can be advantageous particularly if the data to be protected comprise a large size. Instead of securing the entire data, instead they can be encrypted with an encryption key (which is different from the M encryption keys discussed above) and the encryption key can be secured instead.

The data element can comprise a cryptographic key, such as, a private key associated with a block within a blockchain. The data element can comprise a cryptographic key, such as, a private key associated with one or more cryptographic assets. The data element can comprise a cryptographic key, such as, a private key associated with one or more cryptocurrency units.

That is, the present system can be advantageous for securely storing valuable assets that are co-owned by multiple owners. Thus, responsibility of securing the valuable assets can be shared among the co-owners.

The data element can comprise a cryptographic key, such as, a master private key. The master private key can be used to derive cryptographic keys. Additionally or alternatively, the master private key is used for digital signature functionalities.

The first data processing unit can be configured to execute an authentication protocol prior to transferring data with an external device. That is, before sending data to an external device the first data processing unit can execute an authentication protocol to verify the identity of the external device. Similarly, before receiving data from an external device the first data processing can execute an authentication protocol to verify the identity of the external device. The external device can be each of the encryption key storage units, each of the data share storage units, the database, each of the data storage units, each of the user devices, each of the computing units, as discussed in the respective embodiments above.

The system can be configured to carry out the method according to any of the preceding method embodiments. Furthermore, features, advantages and effects discussed with reference to the above method embodiments are also valid for the system and vice versa.

The first data processing unit can be configured to execute the first computer program discussed above.

Alternatively or additionally, the first data processing unit can be configured to execute the second computer program discussed above.

The user device and/or the database, if provided, can be configured to execute the third computer program discussed above.

The system can further comprise a general computing device.

The general computing device can comprise at least one of a general central processing unit, volatile and/or non-volatile memories, interfaces configured to interconnect the internal components of the general computing device and interfaces for facilitating the connection of the general computing device with external devices.

The general computing device can comprise an interface configured to facilitate a connection for data transmission between the first data processing unit and the general computing device.

The general computing device can be configured to facilitate establishing a communication channel with at least one user device.

The general computing device can be configured to facilitate establishing a communication channel with the database.

The system can further comprise at least one password protected storage.

The at least one password protected storage can be provided in a respective cloud-based storage.

The first data processing unit can be configured to store at least one data element share.

The first data processing unit can be configured to store the M encrypted data element shares.

In a further aspect, the present invention relates to a first data processing unit configured to encrypt M data element shares with an encryption key, respectively, and to thus generate M encrypted data element shares, wherein each of the encryption keys corresponds to a decryption key, respectively, wherein M is an integer greater than 1.

The first data processing unit can further be configured to output the M encrypted data element shares.

The first data processing unit can further be configured to generate the M data element shares based on a data element.

The first data processing unit can comprise a processing unit, such as, a microcontroller, preferably a tamperproof (i.e. secure) microcontroller. For example, the first data processing unit can comprise a microcontroller from the NXP SmartMX secure microcontroller family, e.g. the NXP P71. The use of secure microcontrollers can be particularly advantageous for executing security sensitive tasks, such as, generating the data element (e.g. generating a random string), generating based on the data element data element shares and encrypting the data element shares. This way the data element and the data element shares can only be present (i.e. live) in a secure environment. The secure microcontroller, can be configured to provide hardware and software solutions to mitigate malware presence.

For example, the secure microcontroller can be sandboxed from the rest of the first data processing unit (e.g. from I/O interfaces of the first data processing unit). More particularly, the secure microcontroller can be configured to send/receive data only upon successful authentication of the sender/receiver. Furthermore, it can be configured to only execute a limited amount of instructions, e.g., generating the data element (e.g. generating a random string), generating based on the data element data element shares and encrypting the data element shares. Furthermore, it can be configured to output the data element shares only in an encrypted state. Furthermore, it can be configured to receive only encryption keys and preferably encryption keys with certificates issued by a trusted certificate authority. Thus, even under malware presence the secrecy of the data element can be still preserved. The secure microcontroller can be configured to prevent malware from providing instructions to the secure microcontroller and/or from receiving the data element and/or the data element shares in an unencrypted state.

Furthermore, the secure microcontroller can be configured to mitigate side channel attacks, such as, through outside electricity consumption measures. Further still, the secure microcontroller can be configured to be resistant to brute-force attacks. For example, the secure microcontroller may auto destroy (e.g. reset, clear all of its memories) after a limited number of failed authentications.

It will be understood, that any available secure microcontroller can be used with the present invention, such as and preferably, the NXP P71 secure microcontroller.

In addition, the first processing data unit may comprise a general processing unit configured to carry out general tasks not impacting the security of the data element, such as, sending and receiving encrypted data element shares and/or encryption keys to/from external devices that are external to the first data processing unit.

That is, the secure microcontroller can be configured to execute tasks related to data from which the data element can be determined, such as, the data element and the data element shares in an unencrypted state and the general processing unit can be configured to execute tasks related to data from which the data element cannot be determined, such as, the encryption keys (that can be provided to the first data processing unit) and the encrypted data element shares. Furthermore, the first data processing unit can be configured to execute all the tasks related to data from which the data element can be determined on the secure microcontroller.

The first data processing unit may further comprise a memory device, preferably a secure memory device, such as, a self-encrypted memory. The use of a secure memory device can be particularly advantageous for storing the data element and the data element shares in a secure manner. For example, the secure memory can be configured to only be accessed by the secured microcontroller discussed above.

In addition, the first data processing unit may comprise a general memory device, which can be configured to store data from which the data element cannot be determined, such as, encryption keys that can be provided to the first data processing unit and/or computer instructions.

Put simply, the first data processing unit may comprise a secure portion which can comprise hardware-based and software-based security features. The secure portion, which can comprise one or more secure microcontroller and/or one or more secure memory devices, can be advantageous particularly for processing and/or storing data from which the data element can be determined. Thus, the secure portion can facilitate hiding the data element.

The first data processing unit can comprise at least one hardware accelerator, and is preferably configured to increase the efficiency of executing at least one of asymmetric public/private key algorithm such as, and not limited to, RSA, ECC P256k1, ECC P256r1, X25519, Shamir's secret sharing algorithm, Elliptic Curve Cryptographic Digital Signature Algorithm (ECDSA), key derivation algorithm (e.g. adapted KDF-BIP 32) and SHA 1, SHA 256. That is, the first data processing unit can be customized to efficiently execute cryptographic algorithms.

The first data processing unit can comprise an external communication component configured to facilitate sending and/or receiving data to/from a device external to the first data processing unit. This can be particularly advantageous as it can facilitate providing the M encryption keys to the first data processing unit. It can further facilitate the first data processing unit outputting the M encrypted data element shares. The external communication component may comprise one or more I/O device or interface.

The first data processing unit can comprise an internal communication component which can be configured to allow the internal components of the first data processing unit to communicate with each other. That is, the first data processing unit can comprise one or more processors, one or more microcontrollers, one or more memory components, one or more I/O devices or interfaces and one or more accelerators which can transfer data between each other through the internal communication component. Typically, the internal communication component can comprise a bus connection that can interconnect and facilitate synchronizing the communication between two or more internal components of the first data processing unit.

The first data processing unit may comprise an input user interface which can facilitate a user of the first data processing unit to provide at least one input, e.g. an instruction, to the first data processing unit. The input user interface may comprise a button, a keypad, keyboard, number pad, mouse or any combination thereof.

The first data processing unit can comprise an output user interface configured to provide indications to the user of the first data processing unit.

The first data processing unit can be configured to execute a data encryption routine, such as, an asymmetric encryption routine. The data encryption routine can be a computer program comprising instructions which, when the program is executed by a computer can cause the computer to encrypt data. Thus, when the data encryption routine is executed by the first data processing unit, one or more data element shares can be encrypted and therefore generating encrypted data element shares.

As discussed, the first data processing unit may comprise a memory device. The memory device can be configured to store computer instructions of at least one data encryption routine. This can facilitate automating the encryption of the data element shares by the first data processing unit.

The first data processing unit can be configured to execute a data splitting routine, such as, a secret sharing scheme, e.g., a Shamir's secret sharing scheme. The data splitting routine can for example be a computer program comprising instructions which, when the program is executed by a computer, can cause the computer to split data into multiple parts. Thus, when the data splitting routine is executed by the first data processing unit, one or more data element shares can be generated.

As discussed, the first data processing unit may comprise a memory device. The memory device can be configured to store computer instructions of at least one data splitting routine. This can facilitate automating the generation of the data element shares.

The first data processing unit can be configured to execute an authentication protocol prior to transferring data with an external device. That is, before sending data to an external device the first data processing unit can execute an authentication protocol to verify the identity of the external device. Similarly, before receiving data from an external device the first data processing can execute an authentication protocol to verify the identity of the external device. The external device can be an encryption key storage units, a data share storage units, a database, a data storage unit, a user devices or a computing units.

The first data processing unit can be configured to store at least one data element share.

The first data processing unit can be configured to store the M encrypted data element shares.

The first data processing unit can be configured to execute the first computer program discussed above.

Alternatively or additionally, the first data processing unit can be configured to execute the second computer program discussed above.

The first data processing unit discussed above, can correspond to the first data processing unit of the above discussed method and system. It will be understood that, features, advantages and effects discussed with reference to the above method and system embodiments related to the first data processing unit are also valid for the first data processing unit embodiments and vice versa.

In a further aspect, the present invention relates to a determining method to determine the data element of the above discussed method. The determining method comprises providing at least N of M of the data element shares of the above method in an unencrypted state, wherein N is an integer greater than or equal to 1 and smaller than or equal to M and determining the data element based on the at least N data element shares in the unencrypted state. That is, as discussed in the first method, based on a data element M data element shares can be generated. Of the M data element shares the determining method requires at least N data element shares for determining the data element.

As an initial matter, the determining method can be advantageous as it allows for the data element to be recovered. This can be particularly advantageous if the first data processing unit gets lost, damaged and/or compromised. The determining method can provide a way to recover the data element without the need of the first data processing unit.

Secondly, the determining method allows for N to be smaller than M, meaning that the data element can be determined with less than the total number of data element shares. More particularly, the number of data element shares required to determine the data element (i.e. N) can be specified during the generation of the data element shares during the method according to the first aspect of the invention.

Determining the data element with a subset of the total number of data element shares can increase robustness against losing the data element. That is, even if some data element shares (at most M-N data element shares) get lost or destroyed, the data element can still be recovered. On the other hand, with less than N data element shares it can be impossible (i.e. computationally unfeasible) to determine the data element.

Further still and particularly if N is smaller than M, the data element can be determined more conveniently as instead of requiring all the M data element shares, only N of M are required.

As such, the data element can be securely stored (cannot be determined with less than N data element shares) and at the same time can be robust against losing the data element (M-N data element share loses can be tolerated). In addition, the data element can be determined in a convenient way, as not all of the M data element shares may be required during recovery. This is particularly true if N is smaller then M.

The step of determining the data element based on the at least N data element shares can be performed by a device. Thus, a first data processing unit can be used during the method of the first aspect for generating, encrypting and outputting M data element shares of a data element as discussed above. Then, a device can be used to recover the data element based on at least N of M data element shares.

The first data processing unit and the device can be different devices. Nevertheless, the first data processing unit and the device can comprise a similar architecture.

Using a device (different from the first data processing unit) can be particularly advantageous if the first data processing unit gets damaged, lost or compromised. As discussed, typically the data element or the data element shares in an unencrypted state can be securely stored and/or processed within the first data processing unit, preferably within a secure portion of the first data processing unit. Moreover, the first data processing unit can be configured—for security reasons—to never output the data element and/or the data element shares in an unencrypted state. Furthermore, the data element can be randomly generated inside the first data processing unit, meaning that the data element never lives outside the first data processing unit. Thus, if the first data processing unit gets lost or damaged or compromised, the data element may become lost as a result. To mitigate this, the determining method can allow for a device to facilitate recovering the secret based on at least N data element shares. Thus, the device can clone the first data processing unit, without the need of using the first data processing unit.

Providing at least N of M of the data element shares in an unencrypted state can comprise providing each of the at least N data element shares in an encrypted state to the device and unencrypting each of the at least N data element shares in an encrypted state on the device and thus getting the at least N data element shares in an unencrypted state. That is, the determining method can determine the data element even if the data element shares are in an encrypted state. In such embodiments, the determining method can further comprise decrypting the at least N encrypted data element shares to obtain at least N data element shares in an unencrypted state and based thereon determine the data element.

This can be particularly advantageous as it alleviates the need of storing the data element shares in an unencrypted state. Storing the data element shares unencrypted can is not as secure as storing the encrypted data element shares. Furthermore, also the need of providing the data element shares in an unencrypted state can be alleviated. In this case, even if an authorized party obtains the encrypted data element shares, still no information about the data element can be obtained as they are in an encrypted state.

Further still, determining the data element by providing encrypted data element shares and decrypting them, can be advantageous as the data element or the data element shares (in an unencrypted state) live only within secure environments, such as, the first data processing unit (or a secure portion of the first data processing unit), as discussed above, and/or the device (or a secure portion of the device). This can increase robustness against, malware, man-in-the middle attacks and side channel attacks.

However, providing encrypted data element shares may require the provision of decryption keys which can allow the decryption of encrypted data element shares in a computationally feasible way.

Furthermore, the determining method can comprise storing each of the M decryption keys respectively corresponding to the M encryption keys used to encrypt the data element shares to generate the encrypted data element shares on a separate decryption key storage unit, respectively. That is, M separate decryption key storage units can be provided, each storing a respective decryption key of the M decryption keys. Each of the M decryption key storage units can correspond to (i.e. be owned by) a respective user. For example, each of the M decryption key storage units can be a user device corresponding to a user or can be part of (i.e. integrated in or internal to) a user device corresponding to a user. Each user device can for example be a smartphone, tablet, laptop, pocket computer, cellphone, smart card, contact card and/or contactless cars (e.g. NFC card). That is, M users can comprise a respective decryption key which can be stored on the user's respective decryption key storage unit or on the user's respective user device comprising a decryption key storage unit. Each of the decryption key storage units can be a stand-alone memory component that can store a decryption key. Alternatively, each of the decryption key storage units can be part of a respective memory component that can store, among other data, a decryption key of the M decryption keys. In some embodiments, each decryption key storage unit can be integrated in or comprised by a smart card (e.g. a contact or contactless card, such as, a near field communication (NFC) card). Furthermore, each smart card can be owned by (i.e. correspond to) a respective user.

In some embodiments, providing each of the at least N data element shares in an encrypted state to the device can comprise providing at least N encrypted data element shares to the device. That is, in some embodiments, the at least N encrypted data element shares, can be a subset of the M encrypted data element shares generate by the first data processing unit. In other words, the at least N encrypted data element shares correspond to respective data element shares that were encrypted using a respective encryption key of the M encryption keys, as discussed with respect to the method according to the first aspect of the present invention.

As discussed, the M encrypted data element shares can be stored on M data share storage units, respectively. In such embodiments, providing each of the at least N data element shares in an encrypted state to the device can comprise providing from each of at least N data share storage units the encrypted data element share stored therein to the device.

Alternatively or additionally, as discussed, the M encrypted data element shares can be stored all in a database In such embodiments, providing each of the at least N data element shares in an encrypted state to the device can comprise providing from the database at least N encrypted data element shares stored therein to the device.

Further, the determining method comprises providing at least N decryption keys to the device, wherein each of the at least N decryption keys corresponds to a respective encryption key used to generate the at least N encrypted data element shares that are provided to the device. This can be advantageous for being able to decrypt the encrypted data element shares in a computationally feasible way. In some embodiments, first the N encrypted data element shares can be provided and based thereon the corresponding N decryption keys can be provided to the device. Alternatively, firstly N decryption keys can be provided to the device and then the N encrypted data element shares that can be decrypted with the provided N decryption keys can be provided to the device. Alternatively still, the N decryption keys and N encrypted data element shares can be provided in pairs, each pair comprising one decryption key and the corresponding encrypted data element share.

The at least N of M decryption keys can be provided to the device from the respective decryption key storage unit.

Furthermore, the step of providing at least N decryption keys to the device can preferably comprise providing each of the at least N decryption keys to the device through a secure communication channel, respectively. This can increase the difficulty of the decryption keys being received by devices other than the device.

For example, in some embodiments, each of the at least N decryption keys can be provided to the device in an encrypted state, such that, only the device comprises the required decryption key. This can mitigate the man-in-the middle attacks.

In some embodiments, the step of providing at least N decryption keys to the device can comprise providing each of the at least N decryption keys with a corresponding digital certificate, such as, a X.509 certificate. Digital certificates are particularly advantageous for proving the ownership of a decryption key and/or the authenticity of the sender of the decryption key. Typically, digital certificates are issued by a third-party entity, also referred to as a certificate authority (CA) that is known and trusted by the communicating parties.

Further, the determining method may comprise providing at least N computing units. Each of the at least N computing units can correspond to a respective user or be part of a respective user device corresponding to a respective user. The computing unit may be a single processor or a plurality of processors, and may be, a CPU (central processing unit), GPU (graphical processing unit), DSP (digital signal processor), APU (accelerator processing unit), ASIC (application-specific integrated circuit), ASIP (application-specific instruction-set processor) or FPGA (field programmable gate array).

Each of the at least N computing units can be configured to access a respective decryption key storage unit. Thus, each of the at least N computing units can be configured to receive a decryption key stored on the respective decryption key storage unit. This can facilitate providing at least N decryption keys to the device and/or the each of the computing units decrypting a respective encrypted data element share.

Each of the at least N computing unit can be configured to access a respective data share storage unit that that stores the encrypted data element share which decryption key is stored on the decryption key storage unit, that the computing unit is configured to access. In other words, the computing unit can be configured to receive a decryption key from a respective decryption key storage unit that it can access. In addition, the computing unit can be configured to receive a corresponding encrypted data element share by accessing a respective data share storage unit. That is, the encryption key storage unit and the data share storage unit that can be accessed by the same processing unit can be configured to store a decryption key and an encrypted data element share, respectively, which correspond to each other. This is particularly advantageous if the M encrypted data element shares are stored on the M separate data storage units.

Alternatively or additionally, the computing unit can be configured to access the database and receive the corresponding encrypted data element share from the database. This is particularly advantageous if the M encrypted data element shares are stored on the database.

In some embodiments, the device can generate one temporary encryption key and one corresponding temporary decryption key.

Further, the device can provide the temporary encryption key to each of at least N out of M data storage units and/or to the database. This can be advantageous as it can allow a user device (e.g. the computing unit) to receive the temporary encryption key.

In general, the device can output the temporary encryption key. However, the device can be configured not to output the temporary decryption key. Preferably, the device can be configured to securely store the temporary decryption key.

Each of the at least N computing units can receive from the decryption key storage unit, that the respective computing unit is configured to access, the decryption key stored therein. Each of the at least N computing units can further receive from the data share storage unit, that the respective computing unit is configured to access, the encrypted data element share stored therein. Alternatively, each of the at least N computing units unit can receive from the database an encrypted data element share corresponding to the received decryption key. Further, each of the at least N computing units can decrypt the received encrypted data element share using the received decryption key to obtain a data element share in an unencrypted state. Furthermore, each of the at least N computing units can receive the temporary encryption key generated by the device. Using the temporary encryption key, each of the at least N computing units can encrypt the data element share to generate a respective temporary data element share.

This can be advantageous, as the data element shares can be provided to the device, without the need of providing any decryption key to the device.

Furthermore, the computing unit can comprise a tamper-proof (i.e. secure) microcontroller. For example, the computing unit can comprise a microcontroller from the NXP SmartMX secure microcontroller family, e.g. the NXP P71. The use of secure microcontrollers can be particularly advantageous for executing security sensitive tasks, such as, storing the decryption keys and/or decrypting the encrypted data element shares as discussed above. This way the data element shares in an unencrypted state can only be present (i.e. live) in a secure environment. The secure microcontroller, can be configured to provide hardware and software solutions to mitigate malware presence, side channel attacks and brute-force attacks.

Thus, in some embodiments, providing at least N of M of the data element shares in an unencrypted state can comprise providing at least N temporary encrypted data element shares to the device, and unencrypting each of the at least N temporary encrypted data element share on the device and thus obtaining the at least N data element shares in an unencrypted state. Again, these embodiments can provide increased security as they do not require providing decryption keys to the device. Instead, only encryption keys (which generally can be made public without compromising security) can be transferred.

In the above, one temporary encryption key and one corresponding temporary decryption key were generated. Alternatively, the device may generate at least N temporary encryption keys and at least N corresponding temporary decryption keys. That is, for each of the at least N computing units (or user devices) a respective and unique temporary encryption key can be generated.

Similarly, the determining method can comprise the device providing a respective temporary encryption key to each of at least N out of M data storage units and/or to the database. Again, the device can output only the temporary encryption keys while securely storing the temporary decryption keys.

Each of the at least N computing units can receive from the decryption key storage unit, that the respective computing unit is configured to access, the decryption key stored therein. Each of the at least N computing units can further receive from the data share storage unit, that the respective computing unit is configured to access, the encrypted data element share stored therein. Alternatively, each of the at least N computing units unit can receive from the database an encrypted data element share corresponding to the received decryption key. Further, each of the at least N computing units can decrypt the received encrypted data element share using the received decryption key to obtain a data element share in an unencrypted state. Furthermore, each of the at least N computing units can receive the temporary encryption key generated by the device. Using the temporary encryption key, each of the at least N computing units can encrypt the data element share to generate a respective temporary data element share.

This can be advantageous, as the data element shares can be provided to the device, without the need of providing any decryption key to the device.

Furthermore, the computing unit can comprise a tamper-proof (i.e. secure) microcontroller. For example, the computing unit can comprise a microcontroller from the NXP SmartMX secure microcontroller family, e.g. the NXP P71. The use of secure microcontrollers can be particularly advantageous for executing security sensitive tasks, such as, storing the decryption keys and/or decrypting the encrypted data element shares as discussed above. This way the data element shares in an unencrypted state can only be present (i.e. live) in a secure environment. The secure microcontroller, can be configured to provide hardware and software solutions to mitigate malware presence, side channel attacks and brute-force attacks.

Thus, in some embodiments, providing at least N of M of the data element shares in an unencrypted state can comprise providing at least N temporary encrypted data element shares to the device, and unencrypting each of the at least N temporary encrypted data element share on the device and thus obtaining the at least N data element shares in an unencrypted state. Again, these embodiments can provide increased security as they do not require providing decryption keys to the device. Instead, only encryption keys (which generally can be made public without compromising security) can be transferred. Furthermore, in such embodiments, unique temporary encryption and temporary decryption keys are used for each encrypted data element share. This can be advantageous as N decryption keys (instead of one) need to be obtained by an unauthorized party to obtain the data element.

As discussed above, in some embodiments of the method, the data element can be determined without communicating decryption keys to the recovery device. This can be achieved by the use of temporary encryption keys and temporary decryption keys generated by the recovery device. In other embodiments, recovering the secret without communicating the decryption keys can be achieved using a factory shared secret. More particularly, the recovery device and each of the computing units can comprise a factory shared secret in common. The factory shared secret can be provided to the recovery device and to each of the computing units (or to a device comprising the computing units, e.g., to the user device) during the manufacturing of the recovery device and the computing units. In addition, the factory shared secret may be provided to the backup device. In general, the factory shared secret can be unique to a group of devices, comprising at least one of the backup device, the recovery device, the computing units and the user devices. The factory shared secret can increase security of the communication between the said devices. More particularly, the factory shared secret can be used to encrypt data communicated from one device to the other, e.g., from the recovery device to the computing units and vice versa. For example, a symmetric encryption scheme (e.g., AES) can be used.

This can further alleviate the need to generate and communicate temporary encryption keys and temporary decryption. Instead, each of the N computing units may encrypt the respective share with the factory share secret using a symmetric encryption scheme. Then, each of the N computing units may provide the respective factory-secret-encrypted share with the factory shared secret to the recovery device. The recovery device, which can already comprise the factory shared secret, can decrypt the factory-secret-encrypted share to generate N shares of the secret in an unencrypted state.

The factory shared secret can be provided inside a respective secure enclave that can be comprised by the backup device, recovery device, computing units and/or the respective devices comprising the computing units. For example, the factory shared secret can be provided inside a self-encrypted memory and/or hardware-based key manager.

In some embodiments, the temporary encryption keys and the factory shared secret can be used on top of each other for enhanced security. That is, the shares can be encrypted using both the temporary encryption keys and the factory shared secret.

As discussed, the M decryption keys respectively corresponding to the M encryption keys used to encrypt respective data element shares to obtain the encrypted data element shares can be stored on respective decryption key storage units. Each of the decryption key storage units can be external to the device.

Furthermore, the M data share storage units, each configured to store a respective encrypted data element share, can be external to the device.

Further still, the database configured to store the M encrypted data element shares, can be external to the device.

Further still, each of the at least N computing units can be external to the device.

Furthermore, for each computing unit, the respective computing unit and the respective decryption key storage unit, that the computing unit is configured to access, are integrated into a single device, such as, in a user device.

In some embodiments, the device may execute an authentication protocol prior to transferring data with an external device. That is, before sending data to an external device the device can execute an authentication protocol to verify the identity of the external device. Similarly, before receiving data from an external device the recovery data processing can execute an authentication protocol to verify the identity of the external device. The external device can be each of the decryption key storage units, each of the data share storage units, the database, each of the data storage units, each of the user devices, each of the computing units, as discussed in the respective embodiments above.

Thus, the device can communicate only with authenticated devices. As such, an un-authorized device may not send and/or receive data to/from the device. This can decrease the risk of an un-authorized device breaching the security of the device.

Different authentication protocols can be executed by the device for authenticating an external device, such as, each of the decryption key storage units, each of the data share storage units, the database, each of the data storage units, each of the user devices, each of the computing units, as discussed in the respective embodiments above. That is, the present invention is not limited to a particular authentication protocol. For example, the authentication protocol that can be executed by the device can be based on a password authentication protocol (PAP), challenge-handshake authentication protocol (CHAP), extensible authentication protocol (EAP), authentication-authorization-accounting (AAA) architecture protocols, such as, terminal access controller access-control system (TACACS), Extended TACACS, TACACS+, remote authentication dial-in user service (RADIUS), diameter protocol, Kerberos protocol, RFID authentication protocols, physical unclonable function (PUF) based authentication or any combination thereof.

Typically, authentication of the external device by the device can be based on a challenge-response authentication, wherein the device can provide a challenge to the external device and the external device is required to provide a valid response to the challenge to be authenticated.

Similarly, the external device can execute an authentication protocol (e.g. any of the above-mentioned authentication protocols) for authenticating the device before sending and/or receiving data to/from the device. In such embodiments, the external device can send a challenge to the device and the device is required to provide a valid response to the challenge to be authenticated.

In some embodiments, only upon successful authentication of the external device by the device and/or the device by the external device, communication between the external device and the device may initiate. Again, for the sake of brevity, the term external device is used in the above to refer to any of each of the decryption key storage units, each of the data share storage units, the database, each of the data storage units, each of the user devices, each of the computing units, as discussed in the respective embodiments above.

In some embodiments, the determining method can be a computer implemented method. This can allow the automation of determining the data element. That is, the determining method can be implemented as a set of computer-instructions which can be carried out by one or more processing devices, one of each being the device.

In a further aspect, the present invention relates to a forth computer program comprising instructions which, when the program is executed by a device, causes the device to determine a data element based on at least N of M data element shares, wherein N is an integer greater than or equal to 1, and smaller than or equal to M and M is an integer greater than 1, according to the determining method according to any of the preceding determining method embodiments.

In a further aspect, the present invention relates to a fifth computer program comprising instructions which, when the program is executed by a device causes the device to carry out or facilitate the steps of the determining method according to any of the preceding determining method embodiments.

In some embodiments, providing at least N of M of the data element shares in an unencrypted state can comprises providing to the device at least N of M of the data element shares in an unencrypted state, wherein N is an integer greater than or equal to 1, and smaller than or equal to M.

The method can further comprise the device carrying out a digital signature functionality using the data element after determining the data element. In such embodiments the data element can comprise a private key.

In some embodiments, as discussed, the device can be different from the first data processing unit. That is, the device can be a recovery data processing unit.

It will be noted that for the sake of brevity, the device can also be referred to as a recovery device. Throughout the text, the terms recovery device and device are used interchangeably.

Alternatively, the device can be the first data processing unit. That is, the first data processing unit can be used to facilitate the backup and determining the data element.

In such embodiments, providing at least N of M of the data element shares in an unencrypted state can comprises providing a data element share from a respective password protected storage to the first data processing unit.

Furthermore, providing a data element share from a respective password protected storage to the first data processing unit can comprise a user device executing a computer program, the computer program comprising instructions for receiving the data element share stored in the password protected storage using a respective computer program specific password, the user device executing said instructions and receiving the data element share and the user device providing the data element share to the first data processing unit. Thus, the data element shares can be provided automatically to the first data processing unit.

In some embodiments of the determining method, providing at least N of M of the data element shares in an unencrypted state comprises providing to the recovery data processing unit at least N of M of the data element shares in an unencrypted state, wherein N is an integer greater than or equal to 1, and smaller than or equal to M.

In a further aspect, the present invention comprises a determining system comprising a device configured to obtain at least N of M data element shares in an unencrypted state related to a data element, wherein M is an integer greater than 1 and N is an integer greater than or equal to 1, and smaller than or equal to M. Further, the device can be configured to determine the data element based on the at least N data element shares in the unencrypted state.

The device can comprise a processing unit, such as, a microcontroller, preferably a tamperproof (i.e. secure) microcontroller. For example, the device can comprise a microcontroller from the NXP SmartMX secure microcontroller family, e.g. the NXP P71. The use of secure microcontrollers can be particularly advantageous for executing security sensitive tasks, such as, determining the data element based on the at least N data element shares. This way the data element and the data element shares can only be present (i.e. live) in a secure environment. The secure microcontroller, can be configured to provide hardware and software solutions to mitigate malware presence.

For example, the secure microcontroller can be sandboxed from the rest of the device (e.g. from I/O interfaces of the device). More particularly, the secure microcontroller can be configured to send/receive data only upon successful authentication of the sender/receiver. Furthermore, it can be configured to only execute a limited amount of instructions, e.g., generating the data element based on the at least N data element shares. Furthermore, it can be configured to output the data element shares only in the encrypted state. Thus, even under malware presence the secrecy of the data element can be still preserved during recovery. The secure microcontroller can be configured to prevent malware from providing instructions to the secure microcontroller and/or from receiving the data element and/or the data element shares in an unencrypted state.

Furthermore, the secure microcontroller can be configured to mitigate side channel attacks, such as, through outside electricity consumption measures. Further still, the secure microcontroller can be configured to be resistant to brute-force attacks. For example, the secure microcontroller may auto destroy (e.g. reset, clear all of its memories) after a limited number of failed authentications.

It will be understood, that any available secure microcontroller can be used with the present invention, such as the NXP P71 secure microcontroller.

In addition, the device may comprise a general processing unit configured to carry out general tasks not impacting the security of the data element, such as, sending and receiving encrypted data element shares and/or temporary encryption keys to/from external devices that are external to the device.

That is, the secure microcontroller can be configured to execute tasks related to data from which the data element can be determined, such as, the data element and the data element shares in an unencrypted state and the general processing unit can be configured to execute tasks related to data from which the data element cannot be determined, such as, the temporary encryption keys and the encrypted data element shares. Furthermore, the device can be configured to execute all the tasks related to data from which the data element can be determined on the secure microcontroller.

The device may further comprise a memory device, preferably a secure memory device, such as, a self-encrypted memory. The use of a secure memory device can be particularly advantageous for storing decryption keys, temporary decryption key(s), the data element and the data element shares in a secure manner. For example, the secure memory can be configured to only be accessed by the secured microcontroller discussed above.

In addition, the device may comprise a general memory device, which can be configured to store data from which the data element cannot be determined, such as, temporary encryption keys and/or computer instructions.

Put simply, the device may comprise a secure portion which can comprise hardware-based and software-based security features. The secure portion, which can comprise one or more secure microcontroller and/or one or more secure memory devices, can be advantageous particularly for processing and/or storing data from which the data element can be determined. Thus, the secure portion can facilitate hiding the data element.

The device can comprise at least one hardware accelerator, and is preferably configured to increase the efficiency of executing at least one of asymmetric public/private key algorithm such as, and not limited to, RSA, ECC P256k1, ECC P256r1, X25519, Shamir's secret sharing algorithm, Elliptic Curve Cryptographic Digital Signature Algorithm (ECDSA), key derivation algorithm (e.g. adapted KDF-BIP 32) and SHA 1, SHA 256. That is, the device can be customized to efficiently execute cryptographic algorithms.

The device can comprise an external communication component configured to facilitate sending and/or receiving data to/from a device external to the device. This can be particularly advantageous as it can facilitate providing the at least N data element shares to the device. The external communication component may comprise one or more I/O device or interface.

The device can comprise an internal communication component which can be configured to allow the internal components of the device to communicate with each other. That is, the device can comprise one or more processors, one or more microcontrollers, one or more memory components, one or more I/O devices or interfaces and one or more accelerators which can transfer data between each other through the internal communication component. Typically, the internal communication component can comprise a bus connection that can interconnect and facilitate synchronizing the communication between two or more internal components of the device.

The device may comprise an input user interface which can facilitate a user of the device to provide at least one input, e.g. an instruction, to the device. The input user interface may comprise a button, a keypad, keyboard, number pad, mouse or any combination thereof.

The device can comprise an output user interface configured to provide indications to the user of the device.

The device can be configured to execute a data decryption routine, such as, an asymmetric decryption routine. The data decryption routine can be a computer program comprising instructions which, when the program is executed by a computer can cause the computer to decrypt encrypted data. Thus, when the data decryption routine is executed by the device, one or more data element shares in an encrypted state can be decrypted.

As discussed, the device may comprise a memory device. The memory device can be configured to store computer instructions of at least one data decryption routine. This can facilitate automating the decryption of the data element shares in an encrypted state by the device.

The device can be configured to execute a data recovery routine based on a secret sharing scheme, e.g., a Shamir's secret sharing scheme. That is, the device can be configured to execute a data recovery routine for determining the secret based on at least N data element shares. In general, the data recovery routine can be a computer program comprising instructions which, when the program is executed by a computer, can cause the computer to recover the original data from N shares generated based on the original data. Thus, when the data recovery routine is executed by the device, the data element can be determined based on the at least N data element shares of the secret. For example, the recovery routine may be a routine configured to calculate one or more constants of a polynomial of degree N−1, based on at least N points of the polynomial, and based thereon calculate a point of the polynomial wherein the data element is mapped, and based thereon determine the data element.

As discussed, the device may comprise a memory device. The memory device can be configured to store computer instructions of at least one data recovery routine. This can facilitate automating the determination of the data element.

The determining system may further comprise at least N separate decryption key storage units, each configured to store a respective decryption key. That is, the decryption key can be stored on a distributed manner. This can be particularly advantageous as it can allow each decryption key to be assigned or belong to a user.

The device can be configured to at least receive data from each of the decryption keys storage units. This can facilitate providing at least N decryption keys to the device.

The determining system can further comprise a secure data communication channel between the device and each of the decryption key storage units. This can increase the difficulty of the decryption keys being received by devices other than the device.

The device can be configured to receive a respective decryption key from each of the M decryption key storage units, respectively. This can facilitate the device decrypting at least N encrypted data element shares to obtain N data element shares in an unencrypted state.

Further the determining system can comprise at least N separate data share storage units configured to store a respective encrypted data element share. Thus, the determining system can be configured to store the encrypted data element shares required to determine the data element in a distributed manner.

The device can be configured to at least receive data from each of the at least N data share storage units. This can facilitate providing each of the at least N encrypted data element shares to the device.

The determining system can further comprise a respective data communication channel between the device and each of the at least N data share storage units. This can facilitate transferring data between the device and each of the data share storage units.

The device can be configured to receive a respective encrypted data element share from each of the at least N data share storage units, respectively. This can facilitate the device obtaining at least N data element shares.

The determining system can further comprise a database configured to store a plurality of encrypted data element shares, preferably M encrypted data element shares. That is, the M encrypted data element share can be centrally stored on a database.

The device can be configured to at least receive data from the database. Thus, at least N encrypted data element shares can be received by the device directly from the database.

The determining system can further comprise a data communication channel between the device and the database. This can facilitate transferring data from the database to the device.

The device can be configured to receive at least N encrypted data element shares from the database.

The device can be configured to generate at least one pair of cryptographic keys, wherein each pair comprises one temporary encryption key and one temporary decryption key.

Further, the determining system may comprise at least N computing units. Each of the at least N computing units can correspond to a respective user or be part of a respective user device corresponding to a respective user. The computing unit may be a single processor or a plurality of processors, and may be, a CPU (central processing unit), GPU (graphical processing unit), DSP (digital signal processor), APU (accelerator processing unit), ASIC (application-specific integrated circuit), ASIP (application-specific instruction-set processor) or FPGA (field programmable gate array).

Each of the at least N computing units can be configured to access a respective decryption key storage unit. Thus, each of the at least N computing units can be configured to receive a decryption key stored on the respective decryption key storage unit. This can facilitate providing at least N decryption keys to the device and/or the each of the computing units decrypting a respective encrypted data element share.

Each of the at least N computing unit can be configured to access a respective data share storage unit that that stores the encrypted data element share which decryption key is stored on the decryption key storage unit, that the computing unit is configured to access. In other words, the computing unit can be configured to receive a decryption key from a respective decryption key storage unit that it can access. In addition, the computing unit can be configured to receive a corresponding encrypted data element share by accessing a respective data share storage unit. That is, the encryption key storage unit and the data share storage unit that can be accessed by the same processing unit can be configured to store a decryption key and an encrypted data element share, respectively, which correspond to each other. This is particularly advantageous if the M encrypted data element shares are stored on the M separate data storage units.

Alternatively or additionally, the computing unit can be configured to access the database and receive the corresponding encrypted data element share from the database. This is particularly advantageous if the M encrypted data element shares are stored on the database.

Each of the at least N computing units can configured to receive a temporary encryption key from the device. This can be advantageous as it can alleviate the need of providing at least N decryption keys to the device.

Each of the at least N computing units can be configured to receive from the decryption key storage unit, that the respective computing unit is configured to access, the decryption key stored therein. Each of the at least N computing units can further be configured to receive from the data share storage unit, that the respective computing unit is configured to access, the encrypted data element share stored therein. Alternatively, each of the at least N computing units unit can be configured to receive from the database an encrypted data element share corresponding to the received decryption key. Further, each of the at least N computing units can be configured to decrypt the received encrypted data element share using the received decryption key to obtain a data element share in an unencrypted state. Furthermore, each of the at least N computing units can be configured to receive the temporary encryption key generated by the device. Using the temporary encryption key, each of the at least N computing units can be configured to encrypt the data element share to generate a respective temporary data element share.

This can be advantageous, as the data element shares can be provided to the device, without the need of providing any decryption key to the device.

Furthermore, the computing unit can comprise a tamper-proof (i.e. secure) microcontroller. For example, the computing unit can comprise a microcontroller from the NXP SmartMX secure microcontroller family, e.g. the NXP P71.

The use of secure microcontrollers can be particularly advantageous for executing security sensitive tasks, such as, storing the temporary decryption key(s) and/or decrypting the encrypted data element shares as discussed above. This way the data element shares in an unencrypted state can only be present (i.e. live) in a secure environment. The secure microcontroller, can be configured to provide hardware and software solutions to mitigate malware presence, side channel attacks and brute-force attacks.

Further, each of the at least N computing units can be configured to provide the temporary encrypted data element share that it is configured to generate to the device. Again, these embodiments can provide increased security as they do not require providing decryption keys to the device. Instead, only encryption keys (which generally can be made public without compromising security) can be transferred.

In embodiments wherein the decryption key data storage units are provided, each of the decryption key storage units can be external to the device. That is, the decryption keys can correspond to devices that are external to the device.

In embodiments wherein the data share storage units are provided, each of the data share storage units can be external to the device. Thus, the encrypted data element shares can be stored on a distributed manner and externally to the device.

In embodiments wherein the database is provided, the database can be external to the device.

In embodiments wherein the computing units are provided, each computing unit can be external to the device.

Moreover, for each computing unit, the respective computing unit and the respective decryption key storage unit, that the computing unit is configured to access, can be integrated into a single device. The said single devices can be part of a respective user device.

The data element can comprise digital data to be protected.

Alternatively, the data element can comprise an encryption key used to encrypt digital data to be protected. This can be advantageous particularly if the data to be protected comprise a large size. Instead of securing the entire data, instead they can be encrypted with an encryption key (which is different from the M encryption keys discussed above) and the encryption key can be secured instead.

The data element can comprise a cryptographic key, such as, a private key associated with a block within a blockchain. The data element can comprise a cryptographic key, such as, a private key associated with one or more cryptographic assets. The data element can comprise a cryptographic key, such as, a private key associated with one or more cryptocurrency units.

The data element can comprise a cryptographic key, such as, a master private key. The master private key can be used to derive cryptographic keys. Additionally or alternatively, the master private key is used for digital signature functionalities.

The device can be configured to execute an authentication protocol prior to transferring data with an external device. That is, before sending data to an external device the device can execute an authentication protocol to verify the identity of the external device. Similarly, before receiving data from an external device the recovery data processing can execute an authentication protocol to verify the identity of the external device. The external device can be each of the encryption key storage units, each of the data share storage units, the database, each of the data storage units, each of the user devices, each of the computing units, as discussed in the respective embodiments above.

The determining system can be configured to carry out the determining method according to any of the preceding determining method embodiments. Furthermore, features, advantages and effects discussed with reference to the above determining method embodiments are also valid for the determining system and vice versa.

The device can be configured to execute the forth computer program discussed above.

Alternatively or additionally, the first data processing unit can be configured to execute the fifth computer program discussed above.

The system can further comprise a general computing device.

The general computing device can comprise at least one of a general central processing unit, volatile and/or non-volatile memories, interfaces configured to interconnect the internal components of the general computing device and interfaces for facilitating the connection of the general computing device with external devices.

The general computing device can comprise an interface configured to facilitate a connection for data transmission between the device and the general computing device.

The general computing device can be configured to facilitate establishing a communication channel with at least one user device.

The general computing device can be configured to facilitate establishing a communication channel with the database.

The system can further comprise at least one password protected storage.

The at least one password protected storage can be provided in a respective cloud-based storage.

Furthermore, the device being configured to obtain at least N of M data element shares in an unencrypted state can comprise the device being configured to receive each of at least N data element shares in an encrypted state and decrypt each of the at least N data element shares in an encrypted state to obtain the at least N data element shares in an unencrypted state.

Further still, the device being configured to obtain at least N of M data element shares in an unencrypted state can comprises the device being configured to receive a respective encrypted data element share from each of the at least M data share storage units, respectively, and decrypt each of the at least N data element shares in an encrypted state to obtain the at least N data element shares in an unencrypted state.

In some embodiments, the device can be a recovery data processing unit. Alternatively, the device can be the first data processing unit.

In a further aspect, the present invention relates to a recovery data processing unit configured to receive M data element shares in an unencrypted state related to a data element, wherein M is an integer greater than 1 and determine the data element based on the at least N data element shares in the unencrypted state.

The recovery data processing unit can comprise a processing unit, such as, a microcontroller, preferably a tamperproof (i.e. secure) microcontroller. For example, the recovery data processing unit can comprise a microcontroller from the NXP SmartMX secure microcontroller family, e.g. the NXP P71. The use of secure microcontrollers can be particularly advantageous for executing security sensitive tasks, such as, determining the data element based on the at least N data element shares. This way the data element and the data element shares can only be present (i.e. live) in a secure environment. The secure microcontroller, can be configured to provide hardware and software solutions to mitigate malware presence.

For example, the secure microcontroller can be sandboxed from the rest of the recovery data processing unit (e.g. from I/O interfaces of the recovery data processing unit). More particularly, the secure microcontroller can be configured to send/receive data only upon successful authentication of the sender/receiver. Furthermore, it can be configured to only execute a limited amount of instructions, e.g., generating the data element based on the at least N data element shares. Furthermore, it can be configured to output the data element shares only in the encrypted state. Thus, even under malware presence the secrecy of the data element can be still preserved during recovery. The secure microcontroller can be configured to prevent malware from providing instructions to the secure microcontroller and/or from receiving the data element and/or the data element shares in an unencrypted state.

Furthermore, the secure microcontroller can be configured to mitigate side channel attacks, such as, through outside electricity consumption measures. Further still, the secure microcontroller can be configured to be resistant to brute-force attacks. For example, the secure microcontroller may auto destroy (e.g. reset, clear all of its memories) after a limited number of failed authentications.

It will be understood, that any available secure microcontroller can be used with the present invention, such as the NXP P71 secure microcontroller.

In addition, the recovery data processing unit may comprise a general processing unit configured to carry out general tasks not impacting the security of the data element, such as, sending and receiving encrypted data element shares and/or temporary encryption keys to/from external devices that are external to the recovery data processing unit.

That is, the secure microcontroller can be configured to execute tasks related to data from which the data element can be determined, such as, the data element and the data element shares in an unencrypted state and the general processing unit can be configured to execute tasks related to data from which the data element cannot be determined, such as, the temporary encryption keys and the encrypted data element shares. Furthermore, the recovery data processing unit can be configured to execute all the tasks related to data from which the data element can be determined on the secure microcontroller.

The recovery data processing unit may further comprise a memory device, preferably a secure memory device, such as, a self-encrypted memory. The use of a secure memory device can be particularly advantageous for storing decryption keys, temporary decryption key(s), the data element and the data element shares in a secure manner. For example, the secure memory can be configured to only be accessed by the secured microcontroller discussed above.

In addition, the recovery data processing unit may comprise a general memory device, which can be configured to store data from which the data element cannot be determined, such as, temporary encryption keys and/or computer instructions.

Put simply, the recovery data processing unit may comprise a secure portion which can comprise hardware-based and software-based security features. The secure portion, which can comprise one or more secure microcontroller and/or one or more secure memory devices, can be advantageous particularly for processing and/or storing data from which the data element can be determined. Thus, the secure portion can facilitate hiding the data element.

The recovery data processing unit can comprise at least one hardware accelerator, and is preferably configured to increase the efficiency of executing at least one of asymmetric public/private key algorithm such as, and not limited to, RSA, ECC P256k1, ECC P256r1, X25519, Shamir's secret sharing algorithm, Elliptic Curve Cryptographic Digital Signature Algorithm (ECDSA), key derivation algorithm (e.g. adapted KDF-BIP 32) and SHA 1, SHA 256. That is, the recovery data processing unit can be customized to efficiently execute cryptographic algorithms.

The recovery data processing unit can comprise an external communication component configured to facilitate sending and/or receiving data to/from a device external to the recovery data processing unit. This can be particularly advantageous as it can facilitate providing the at least N data element shares to the recovery data processing unit. The external communication component may comprise one or more I/O device or interface.

The recovery data processing unit can comprise an internal communication component which can be configured to allow the internal components of the recovery data processing unit to communicate with each other. That is, the recovery data processing unit can comprise one or more processors, one or more microcontrollers, one or more memory components, one or more I/O devices or interfaces and one or more accelerators which can transfer data between each other through the internal communication component. Typically, the internal communication component can comprise a bus connection that can interconnect and facilitate synchronizing the communication between two or more internal components of the recovery data processing unit.

The recovery data processing unit may comprise an input user interface which can facilitate a user of the recovery data processing unit to provide at least one input, e.g. an instruction, to the recovery data processing unit. The input user interface may comprise a button, a keypad, keyboard, number pad, mouse or any combination thereof.

The recovery data processing unit can comprise an output user interface configured to provide indications to the user of the recovery data processing unit.

The recovery data processing unit can be configured to execute a data decryption routine, such as, an asymmetric decryption routine. The data decryption routine can be a computer program comprising instructions which, when the program is executed by a computer can cause the computer to decrypt encrypted data. Thus, when the data decryption routine is executed by the recovery data processing unit, one or more data element shares in an encrypted state can be decrypted.

As discussed, the recovery data processing unit may comprise a memory device. The memory device can be configured to store computer instructions of at least one data decryption routine. This can facilitate automating the decryption of the data element shares in an encrypted state by the recovery data processing unit.

The recovery data processing unit can be configured to execute a data recovery routine based on a secret sharing scheme, e.g., a Shamir's secret sharing scheme. That is, the recovery data processing unit can be configured to execute a data recovery routine for determining the secret based on at least N data element shares. In general, the data recovery routine can be a computer program comprising instructions which, when the program is executed by a computer, can cause the computer to recover the original data from N shares generated based on the original data. Thus, when the data recovery routine is executed by the recovery data processing unit, the data element can be determined based on the at least N data element shares of the secret. For example, the recovery routine may be a routine configured to calculate one or more constants of a polynomial of degree N−1, based on at least N points of the polynomial, and based thereon calculate a point of the polynomial wherein the data element is mapped, and based thereon determine the data element.

As discussed, the recovery data processing unit may comprise a memory device. The memory device can be configured to store computer instructions of at least one data recovery routine. This can facilitate automating the determination of the data element.

The recovery data processing unit can be configured to execute an authentication protocol prior to transferring data with an external device. That is, before sending data to an external device the recovery data processing unit can execute an authentication protocol to verify the identity of the external device. Similarly, before receiving data from an external device the recovery data processing can execute an authentication protocol to verify the identity of the external device. The external device can be each of the encryption key storage units, each of the data share storage units, the database, each of the data storage units, each of the user devices, each of the computing units, as discussed in the respective embodiments above.

The recovery data processing unit can be configured to execute the forth computer program discussed above.

Alternatively or additionally, the first data processing unit can be configured to execute the fifth computer program discussed above.

The recovery data processing unit discussed above, can correspond to the recovery data processing unit of the above discussed determining method and determining system. It will be understood that, features, advantages and effects discussed with reference to the above determining method and determining system embodiments related to the recovery data processing unit are also valid for the recovery data processing unit embodiments and vice versa.

In a further aspect, the present invention related to a composite method, wherein the composite method comprises the method according to first aspect of the present invention and the determining method according to any of the preceding determining method embodiments. Furthermore, the composite method can comprise performing the method according to the first aspect of the present invention before the determining method.

In a further aspect the present invention related to a composite system comprising the system according to any of the preceding system embodiments and the determining system according to any of the preceding determining system embodiments. Furthermore, the composite system can be configured to carry out the composite method.

In a further aspect, the present invention relates to a method for storing a data element. The method comprises providing at least two devices, wherein each of the at least two devices comprises an initial key, which is identical for each of the at least two devices. Further the method comprises each of the at least two devices respectively generating the same data element based on the initial key. In other words, the present method can allow two devices to generate the same data element. This can be advantageous as it ensures that the data element is not lost even if one of the devices gets damaged and/or lost. For example, one of the devices can be used to utilize the data element for cryptographic functionalities (e.g., encryption, decryption, key derivation and/or for digital signature) while the other device(s) can be used to recover the data element in case the device used to utilize the data element gets damaged and/or lost. As discussed, this method comprises providing at least two devices, wherein each of the at least two devices comprises an initial key, which is identical for each of the at least two devices. For example, the method may comprise providing the discussed devices and the devices then generating the initial keys, or providing the discussed devices, and then also providing the respective initial keys to the devices. In any case, any option resulting in the respective devices comprising the respective initial keys should be understood to be covered by the described method.

In some embodiments, each of the at least two devices can comprises a secure enclave. The secure enclave can be a hardware-based key manager that can be isolated from the rest of the device, thus, providing an extra layer of security. When data is stored in the secure enclave, it is only handled inside the secure enclave. That is, the secure enclave can generate the data element, securely store it, and perform operations with it. Only the output of these operations, such as, encrypted data or a cryptographic signature can be provided outside the secure enclave. The data element itself may never be provided outside the secure enclave.

In some embodiments, providing an initial key to each of the at least two devices can comprise the at least two devices exchanging the initial key.

In some embodiments, providing the at least two devices, wherein each of the at least two devices comprises an initial key, which is identical for each of the at least two devices, can comprise exchanging data and based thereon each of the at least two devices generating the initial key. In other words, the initial key itself may never be transmitted from one device to another. Instead, certain parameters can be exchanged between the devices, allowing them to perform computations on the exchanged parameters and based thereon all of them can determine the same initial key.

In some embodiments, providing the at least two devices, wherein each of the at least two devices comprises an initial key, which is identical for each of the at least two devices, can comprise the at least two devices agreeing on the initial key. For example, each of the at least two devices may determine the initial key according to a key agreement protocol. The key agreement protocol can preferably be a secure key agreement protocol. That is, even if the communication link between the devices is insecure, the secure key agreement protocol can be configured to make it computationally infeasible for a third party to determine the key.

The key agreement protocol can be based on the Diffie-Hellman key agreement protocol, preferably on the Elliptic Curve Diffie-Hellman (ECDH) key agreement protocol. ECDH key agreement protocol is particularly advantageous as it can allow two devices, each having an elliptic-curve public-private key pair, to establish a shared secret over an insecure channel.

In some embodiments, providing the at least two devices, wherein each of the at least two devices comprises an initial key, which is identical for each of the at least two devices, can comprise each of the at least two devices determining the initial key without communicating the initial key between the at least two devices.

In embodiments wherein each of the devices respectively comprise a secure enclave, the initial key can be provided inside the respective secure enclave of each of the devices. For example, the initial key can be determined and/or stored inside the secure enclave. This provides further secrecy of the initial key.

In some embodiments, the method can comprise generating a random string.

The random string can be generated outside the secure enclaves of the at least two devices. That is, the random string can be generated by a random number generator that cannot be part of the secure enclave and/or by a random number generator function that may not be executed by the secure enclave.

Further, the method can comprise providing the random string to the at least two devices. If the secure enclave is provided, the random string can be provided inside the secure enclave of each of the devices.

In some embodiments, the step of each of the at least two devices respectively generating the same data element can comprise each of the at least two devices executing at least two different functions to generate the data element, wherein at least one of the functions receives as an input the initial key. Each function can further scramble the initial key to produce the data element, thus, enhancing the security of the data element. It will be understood, that each device executes the same functions such that they can all derive the same data element.

Executing at least two different functions to generate the data element can comprises executing a first function before executing a second function, wherein the second function receives as input the results of the first function.

The first function can receive as input the initial key and the random string and can output a result based on an operation performed on the initial key and on the random string. In other words, the first function combines the initial key with the random string, thus making it harder for a third party to determine the data element.

In some embodiments, the first function can comprise concatenating the random string with the initial key.

The second function can comprise a hash function. Using a hash function can be advantageous as it can allow generating a data element with a fixed size, irrespective of the size of the initial key and/or of the random string.

The second function can comprise an encryption function. The encryption can be performed alternatively or additionally to the hashing function. For example, the results of the first function can be encrypted before hashing.

In some embodiments, the step of each of the at least two devices respectively generating the same data element can comprise each of the at least two devices executing a concatenating function.

In some embodiments, the step of each of the at least two devices respectively generating the same data element can comprise each of the at least two devices executing a hashing function.

In some embodiments, the step of each of the at least two devices respectively generating the same data element can comprise each of the at least two devices executing an encryption function.

Preferably, the step of generating the data element based on the initial key can be carried out by each respective secure enclave of the at least two devices. It can be particularly advantageous to generate the data element inside the secure enclave. This can ensure that the data element only lives inside the secure enclave of each device, hence, majorly enhancing security.

In some embodiments, the at least two devices can comprise an identical factory shared secret. The factory shared secret can be specific only to the at least two devices. That is, a group of devices can all comprise the same factory shared secret and this factory shared secret can be unique to the group of devices. For example, a plurality of devices provided to a certain user may all comprise the same factory shared secret.

The factory shared secret can be utilized to encrypt communication between the at least two devices. This can be advantageous as it alleviates the need for the devices to exchange encryption keys.

In such embodiments, a symmetric encryption scheme can be utilized to encrypt communication between the at least two devices with the factory shared secret.

The factory shared secret can be stored within the respective secure enclave of each of the at least two devices. This may ensure that the factory shared secret remains secret and may not be accessed by another party. As such, the factory shared secret can only live inside the secure enclave. It may never be output outside the secure enclave.

In preferred embodiments, during the step of providing the at least two devices, wherein each of the at least two devices comprises an initial key, which is identical for each of the at least two devices, each device can encrypt data using the factory shared secret before sending them to another device. This makes the said step more robust to eavesdropping attacks.

Preferably, the data can be encrypted with the factory shared secret inside the respective secure enclave of each device. This can be particularly the case if the factory shared secret is stored inside the secure enclave.

In preferred embodiments, during the step of wherein providing the at least two devices, wherein each of the at least two devices comprises an initial key, which is identical for each of the at least two devices, each device can decrypt data using the factory shared secret after receiving them from another device.

Preferably, the data is decrypted using the factory shared secret inside the respective secure enclave of each device.

In some embodiments, the method can comprise utilizing a first device to perform at least one of encrypting data with the data element as an encryption key, decrypting data using the data element as a decryption key, deriving cryptographic keys using the data element as a master key, and performing digital signature functionalities using the data element. In other words, at least one of the devices can be utilized to perform cryptographic functionalities using the data element, such as, the afore-mentioned functionalities.

The method can further comprise utilizing a second device to recover the data element.

In other words, after each of the at least two devices may generate the same data element, at least one of them can be used to utilize the data element for cryptographic functionalities and at least one other of them can be used as to recover the data element in case the device used to utilize the data element for cryptographic functionalities becomes non-operational.

Moreover, the method can further comprise utilizing the second device to perform the same functionalities as the first device before it became non-operational.

In a further aspect, the present invention relates to a system comprising at least two devices each configured to generate the same data element based on an initial key. In other words, the present system can allow two devices to generate the same data element. This can be advantageous, as it ensures that the data element is not lost even if one of the devices gets damaged and/or lost. For example, one of the devices can be used to utilize the data element for cryptographic functionalities (e.g., encryption, decryption, key derivation and/or for digital signature) while the other device(s) can be used to recover the data element in case the device used to utilize the data element gets damaged and/or lost.

Each of the at least two devices can comprise at least one processing unit. This can allow the devices to actively perform computations.

Each of the at least two devices can comprise one or more micro-controller unit(s), such as, one or more tamperproof micro-controller unit(s). The use of a secure (i.e. tamperproof) micro-controller unit can be particularly advantageous for enhancing security of the data element.

Each of the at least two devices can comprises a memory component.

The memory component can be a secure memory device, such as, a self-encrypted memory. The use of a secure memory device can be particularly advantageous for enhancing security of the data element.

Each of the at least two devices can comprise at least one hardware accelerator. The at least one hardware accelerator can be a customized chip configured to perform a particular function. The use of hardware accelerators can be particularly advantageous for increasing performance, particularly computational speed, of the devices.

Each of the at least two devices can comprise an external communication component. This can allow the devices to communicate with external devices. For example, the external communication component can allow inter device communication.

Each of the at least two devices can comprises an internal communication component. This can allow the different components of the devices to communicate with each other (i.e. it can allow intra-device communication). Parts of the internal communication component may comprise encrypted communication channels, wherein data is always transmitted in an encrypted state. For example, such encrypted communication channels may link the secure microcontroller unit(s), the secure memory device and/or the secure enclave of the device with other components of the device.

Each of the at least two devices comprise a secure enclave. As discussed, this can greatly protect the data element.

The at least two devices can comprise identical architectures. This can be advantageous, as the devices, after generating the data element, can be utilized as clones of each other.

The at least two devices can comprise a factory shared secret in common.

Each of the at least two devices can be configured to receive the factory share secret, preferably, during manufacturing.

Each of the at least two devices can be configured to encrypt and decrypt data using the factory shared secret.

Each of the at least two devices can be configured to encrypt and decrypt data using the factory shared secret, respectively, before sending them to or receiving them from another one of the at least two devices.

The system can be configured to carry out the method according to the preceding aspect of the present invention.

At least one of the devices can be configured to perform at least one of encrypting data with the data element as an encryption key, decrypting data using the data element as a decryption key, deriving cryptographic keys using the data element as a master key, and performing digital signature functionalities using the data element. Moreover, at least another one of the devices can be utilized to recover the data element.

The present invention is also defined by the following numbered embodiments.

Below, method embodiments will be discussed. These embodiments are abbreviated with the letter M followed by a number. Whenever reference is herein made to method embodiments, these embodiments are meant.

M1. A method, the method comprising based on a data element (50), generating M data element shares (52), wherein M is an integer greater than 1;
- a first data processing unit (10) encrypting each of the M data element shares (52) with an encryption key (42), respectively, and thus generating M encrypted data element shares (55), wherein each of the encryption keys (42) corresponds to a decryption key (45), respectively.

It will be noted that the data element (50) can also be referred to as a secret (50) and may comprise a master private key (50). Similarly, the data element share (52) can also be referred to as a secret share (52) or share (52) and may refer to a share of the data element that is in an unencrypted state. On the other hand, the encrypted data element share (55) can also be referred to as an encrypted secret share (55) or encrypted share (55) and refers to a share of the data element in an encrypted state. A first data processing unit (10) can also be referred to as a backup device (10). Furthermore, the term key refers to a cryptographic key.

General Features

M2. The method according to the preceding embodiment, wherein the data element (50) can be determined with N unencrypted data element shares (52), where N is an integer greater than or equal to 1, and smaller than or equal to M.

M3. The method according to any of the preceding embodiments and further comprising storing each of the M encryption keys (42) on a separate encryption key storage unit (30A), respectively.

M4. The method according to any of the preceding embodiments and further comprising at least one of
- storing each of the M encrypted data element shares (55) on a separate data share storage unit (30B), respectively,
- storing each of the M encrypted data element shares (55) on a database (60).

M5. The method according to any of the preceding embodiments, wherein the method comprises the first data processing unit (10) outputting the M encrypted data element shares (55).

Architecture

M6. The method according to any of the preceding embodiments and with the features of embodiment M3 and M4, wherein the method comprises providing M data storage units (30), wherein each of the M data storage units (30) respectively comprises
- one encryption key storage unit (30A) of the separate encryption key storage units (30A) and one data share storage unit (30B) of the separate data share storage units (30B),
- wherein the encryption key (42) stored in the encryption key storage unit (30A) of the respective data storage unit (30) is used to generate the encrypted data element share (55) stored in the respective data share storage unit (30B) of the respective data storage unit (30).

M7. The method according to any of the preceding embodiments and with the features of embodiments M3 and M4, wherein the database (60) is external to any of the encryption key storage units (30A).

M8. The method according to any of the preceding embodiments and with the features of embodiment M4, wherein the database (60) is external to any of the data share storage units (30A).

In such embodiments, the method comprises storing each of the M encrypted data element shares (55) on a separate data share storage unit (30B), respectively, and storing each of the M encrypted data element shares (55) on a database (60).

Extra Details

M9. The method according to any of the preceding embodiments and with the features of embodiments M4 and M5, wherein the step of the first data processing unit (10) outputting the M encrypted data element shares (55) comprises at least one of
- the first data processing unit (10) providing each of the M encrypted data element shares (55) to a separate data share storage unit (30B), respectively,
- the first data processing unit (10) providing each of the M encrypted data element shares (55) to the database (60).

M10. The method according to the preceding embodiment and with the features of embodiment M6, wherein the step of the first data processing unit (10) providing each of the M encrypted data element shares (55) to a separate data share storage unit (30B), respectively, comprises
- the first data processing unit (10) providing to each data storage unit (30) of the M data storage units (30) a corresponding encrypted data element share (55),
- wherein an encrypted data element share (55) of the M encrypted data element shares (55) corresponding to a data storage unit (30) of the M data storage units (30) means that the encryption key (42) with which the encrypted data element share (55) is generated is stored in the respective data storage unit (30), such as, in the respective encryption key storage unit (30A) of the respective data storage unit (30).

Secret Sharing Scheme

M11. The method according to any of the preceding embodiments and with the features of embodiment M2, wherein the step of based on a data element (50), generating M data element shares (52),
- is based on a secret sharing scheme, preferably a threshold secret sharing scheme with a total number of shares equal to M and threshold equal to N, such as, the Shamir's secret sharing scheme and/or the Berkley's secret sharing scheme.

It will be noted that a secret sharing scheme can also be referred to as secret sharing, secret splitting or secret splitting scheme.

M12. The method according to the preceding embodiment further comprising mapping the data element (50) to a point of a graph represented by a polynomial, wherein the polynomial has a degree of N−1.

M13. The method according to the preceding embodiment and further comprising generating the M data element shares (52) based on M different points of the graph represented by the polynomial.

M14. The method according to the preceding embodiment wherein the point wherein the data element (50) is mapped is different from the M different points based on which the M data element shares (52) are generated.

M15. The method according to any of the 3 preceding embodiments and further comprising generating the polynomial by randomly generating N−1 coefficients of the polynomial and calculating the $N^{th}$ coefficient such that the point wherein the data element (50) is mapped lies on the graph represented by the polynomial.

M16. The method according to any of the preceding embodiments, wherein the step of based on a data element (50), generating M data element shares (52) is carried out by the first data processing unit (10).

Encryption Keys

M17. The method according to any of the preceding embodiments further comprising providing to the first data processing unit (10) M different encryption keys (42).

M18. The method according to any of the preceding embodiments and preferably with the features of embodiment M3, further comprising providing each of (the) M encryption keys (42) to the first data processing unit (10), preferably from the respective encryption key storage unit (30A).

M19. The method according to any of the preceding embodiments further comprising storing the encryption keys (42) in M separate user devices (100), respectively.

M20. The method according to the preceding embodiment and with the features of embodiment M3, wherein each of M user devices (100) comprises one respective encryption key storage unit (30A).

M21. The method according to the preceding embodiment and with the features of embodiment M6, wherein each of the M user device (100) comprises one respective data storage unit (30).

M22. The method according to any of the preceding embodiments and with the features of embodiment M17, wherein the step of providing to the first data processing unit (10) M different encryption keys (42) comprises providing each encryption key with a corresponding digital certificate, such as, a X.509 certificate.

Encryption Algorithms

M23. The method according to any of the preceding embodiments, wherein the step of the first data processing unit (10) encrypting each of the M data element shares (52) with an encryption key (42)
is based on an asymmetric encryption scheme, such as, RSA, ECC P256k1, ECC P256r1, or X25519.

M24. The method according to the preceding embodiment, wherein the encryption key (42) is a public key (42) and the decryption key (45) is a private key (45).

Decryption Keys

M25. The method according to any of the preceding embodiments and further comprising storing each of the M decryption keys (45) corresponding to each of the M encryption keys (42), respectively, on a separate decryption key storage unit (30C), respectively.

Computing Units

M26. The method according to any of the preceding embodiments and with the features of embodiment M3 and M4 further comprising providing M separate computing units (35) each configured to access a respective encryption key storage unit (30A) and at least one of
a respective data share storage unit (30B) that stores the encrypted data element share (55) which encryption key (42) is stored in the encryption key storage unit (30A),
the database (60).

M27. The method according to the preceding embodiment and with the features of embodiment M25, wherein each of the M computing units (35) is configured to access a respective decryption key storage unit (30C) wherein the decryption key (45) stored therein corresponds to the encryption key (42) stored in the encryption key storage unit (30A) that the computing unit is configured to access.

M28. The method according to any of the 2 preceding embodiments and with the features of embodiment M3, wherein for each computing unit (35), the respective computing unit (35) and the respective encryption key storage unit (30A), that the computing unit (35) is configured to access, are integrated into a single device.

M29. The method according to any of the 3 preceding embodiments and with the features of embodiment M4, wherein for each computing unit (35), the respective computing unit (35) and the respective data share storage unit (30B), that the computing unit (35) is configured to access, are integrated into a single device.

M30. The method according to any of the 4 preceding embodiments and with the features of embodiment M3 and M4, wherein for each computing unit (35), the respective computing unit (35), the respective encryption key storage unit (30A) and the respective data share storage unit (30B), that the computing unit (35) is configured to access, are integrated into a single device.

M31. The method according to any of the 5 preceding embodiments and with the features of embodiment M27, wherein for each computing unit (35), the respective computing unit (35) and the respective decryption key storage unit (30C), that the computing unit (35) is configured to access, are integrated into a single device.

Authentication

M32. The method according to any of the preceding embodiments, wherein the first data processing unit (10) executes an authentication protocol prior to transferring data with an external device for authenticating the external device.

M33. The method according to the preceding embodiment, wherein data is transferred between the first data processing unit (10) and the external device only upon successful authentication of the external device by the first data processing unit (10).

M34. The method according to any of the preceding embodiments, wherein an external device executes an authentication protocol prior to transferring data with the first data processing unit (10) for authenticating the first data processing unit (10).

M35. The method according to the preceding embodiment, wherein data is transferred between the external device and the first data processing unit (10) only upon successful authentication of the first data processing unit (10) by the external device.

For the sake of brevity, the term external device is used in the above to refer to any of each of the encryption key storage units, each of the data share storage units, the database, each of the data storage unit, each of the user devices, each of the computing units, as discussed in the respective embodiments above.

Further Features

M36. The method according to any of the preceding embodiments, wherein the method comprises storing each of the M encrypted data element shares (55) on the first data processing unit (10).

M37. The method according to any of the preceding embodiments and with the features of embodiment M2, wherein N is equal to 2.

M38. The method according to the preceding embodiment and further comprising
storing one of the M data element shares (52) in the first data processing unit (10) and
storing each of the remaining M−1 data element shares (52) in a respective password protected storage (1110).

M39. The method according to the preceding embodiment, wherein the method comprises generating a respective password for each of the M−1 password protected storages (1110).

M40. The method according to the preceding embodiment, wherein each of the M−1 password protected storages (1110) allows access to the data stored therein if the corresponding password is provided.

M41. The method according to any of the two preceding embodiments, wherein storing each of the remaining M−1 data element shares (52) in a respective password protected storage (1110) comprises
storing each of the remaining M−1 data element shares (52) encrypted with the password generated for the respective password protected storage (1110).

M42. The method according to any of the three preceding embodiments, wherein generating a respective password for each of the M−1 password protected storages (1110)
comprises each of M−1 users defining a user defined password for a respective password protected storage (1110).

M43. The method according to any of the four preceding embodiments, wherein generating a respective
password for each of the M−1 password protected storages
comprises generating a respective computer program specific password and wherein each computer program specific password is used by a respective computer program (1115) to access the data element share (52) stored in the respective password protected storage (1110) that the computer program specific password corresponds to.

M44. The method according to the preceding embodiment, wherein each of the M−1 computer programs (1115) is executed on a respective user device (100).

M45. The method according to any of the two preceding embodiments, wherein at least one of the computer program specific passwords is an app-specific password.

M46. The method according to any of the eight preceding embodiments, wherein each of the M−1 password protected storages (1110) is part of a respective cloud-based storage (1100).

M47. The method according to the preceding embodiment, wherein each cloud-based storage (1100) corresponds to a respective user.

M48. The method according to any of the two preceding embodiments, wherein for each cloud-based storage (1100) credential data are generated and each cloud-based storage (1100) is accessed only if the correct credential data are provided.

M49. The method according to preceding embodiment, wherein each of the credential data comprise a unique ID and at least one of
a password, a one-time PIN, biometric data of a user, a digital certificate and a private key.

Computer Implement Method

M50. The method according to any of the preceding embodiments, wherein the method is a computer implemented method.

M51. A first computer program comprising instructions which, when the program is executed by a first data processing unit (10), causes the first data processing unit (10)
to encrypt, according to any of the preceding method embodiments, each of M data element shares (52) with an encryption key (42), respectively, and thus generating M encrypted data element shares (55), wherein each of the encryption keys (42) corresponds to a decryption key (45), respectively.

M52. The first computer program according to the preceding embodiment, wherein the first computer program causes the first data processing unit (10) to transmit, according to any of the preceding method embodiments, each of the encrypted data element shares (55) to at least one of a respective encryption key storage unit (30A) and database (60).

M53. A second computer program comprising instructions which, when the program is executed by a first data processing unit (10) causes the first data processing unit (10) to carry out or facilitate the steps of the method according to any of the preceding method embodiments.

M54. A third computer program comprising instructions which, when the program is executed by an external device causes the external device to
provide an encryption key (42) comprised by the external device to the first data processing unit (10), and/or
receive an encrypted data element share (55) generated using the encryption key (42), and/or
receive M encrypted data element shares (55).

For the sake of brevity, the term external device is used in the above to refer to any of each of the encryption key storage units, each of the data share storage units, the database, each of the data storage unit, each of the user devices, each of the computing units, as discussed in the respective embodiments above.

Below, system embodiments will be discussed. These embodiments are abbreviated with the letter A followed by a number. Whenever reference is herein made to system embodiments, these embodiments are meant.

A1. A system comprising
a first data processing unit (10) configured to generate M data element shares (52) based on a data element (50), wherein M is an integer greater than 1;
the first data processing unit (10) configured to encrypt each of the M data element shares (52) with an encryption key (42), respectively, and to thus generate M encrypted data element shares (55), wherein each of the encryption keys (42) corresponds to a decryption key (45), respectively.

A2. The system according to the preceding embodiment, wherein the first data processing unit (10) is configured to output the M encrypted data element shares (55).

First Data Processing Unit

A3. The system according to any of the preceding system embodiments, wherein the first data processing unit (10) comprises a processing unit (250), such as a micro-controller (250), preferably a tamperproof micro-controller (250).

A4. The system according to any of the preceding system embodiments, wherein the first data processing unit (10) comprises a memory device (240), preferably a secure memory device (240), such as, a self-encrypted memory (240).

A5. The system according to any of the preceding system embodiments, wherein the first data processing unit (10) comprises at least one hardware accelerator, and is preferably configured to increase the efficiency of executing at least one of
- asymmetric public/private key algorithm such as, and not limited to, RSA, ECC P256k1, ECC P256r1, X25519;
- Shamir's secret sharing algorithm;
- Elliptic Curve Cryptographic Digital Signature Algorithm (ECDSA);
- key derivation algorithm (e.g. adapted KDF-BIP 32); and
- SHA 1, SHA 256.

A6. The system according to any of the preceding system embodiments, wherein the first data processing unit (10) comprises an external communication component (230) configured to facilitate sending and/or receiving data to/from a device external to the first data processing unit (10).

A7. The system according to any of the preceding system embodiments, wherein the first data processing unit (10) comprises an internal communication component (260) configured to allow the internal components of the first data processing unit (10) to communicate with each other.

A8. The system according to the preceding embodiment, wherein the internal communication component (260) comprises a bus connection (260).

A9. The system according to any of the preceding embodiments, wherein the first data processing unit (10) comprises an input user interface (210) which facilitates a user of the first data processing unit (10) to provide at least one input, e.g. an instruction, to the first data processing unit (10).

A10. The system according to any of the preceding system embodiments, wherein the first data processing unit (10) comprises an output user interface (220) configured to provide indications to the user of the first data processing unit (10).

A11. The system according to any of the preceding system embodiments, wherein the first data processing unit (10) is configured to execute a data encryption routine, such as, an asymmetric encryption routine.

A12. The system according to any of the preceding system embodiments and with the features of embodiment A4, wherein the memory component (240) is configured to store computer instructions of at least one data encryption routine.

A13. The system according to any of the preceding system embodiments, wherein the first data processing unit (10) is configured to execute a data splitting routine, such as, a secret sharing scheme, e.g., a Shamir's secret sharing scheme.

A14. The system according to any of the preceding system embodiments and with the features of embodiment A4, wherein the memory component (240) is configured to store computer instructions of at least one data splitting routine.

Encryption Key Storage Units

A15. The system according to any of the preceding system embodiments and further comprising M separate encryption key storage units (30A), each configured to store a respective encryption key (42).

A16. The system according to the preceding embodiment, wherein the first data processing unit (10) is configured to at least receive data from each of the encryption key storage units (30A).

A17. The system according to any of the 2 preceding embodiments, wherein the system further comprises a respective data communication channel (70A) between the first data processing unit (10) and each of the encryption key storage units (30A).

A18. The system according to any of the system preceding embodiments, and preferably with the features of embodiment A15, wherein the first data processing unit (10) is configured to receive M encryption keys (42), wherein the first data processing unit (10) is preferably configured to receive a respective encryption key (42) from each of the M encryption key storage units (30A), respectively.

Data Share Storage Units

A19. The system according to any of the preceding system embodiments and further comprising M separate data share storage units (30B) configured to store a respective encrypted data element share (55).

A20. The system according to the preceding embodiment, wherein the first data processing unit (10) is configured to at least provide data to each of the at least M data share storage units (30B).

A21. The system according to any of the 2 preceding embodiments, wherein the system further comprises a respective data communication channel (70B) between the first data processing unit (10) and each of the data share storage units (30B).

A22. The system according to any of the 3 preceding embodiments, wherein the first data processing unit (10) is configured to provide a respective encrypted data element share (55) to each of the M data share storage units (30B), respectively.

Database

A23. The system according to any of the preceding system embodiments and further comprising a database (60) configured to store a plurality of encrypted data element shares (55), preferably M encrypted data element shares (55).

A24. The system according to the preceding embodiment, wherein the first data processing unit (10) is configured to at least provide data to the database (60).

A25. The system according to any of the 2 preceding embodiments, wherein the system further comprises a data communication channel (95) between the first data processing unit (10) and the database (60).

A26. The system according to any of the 3 preceding embodiments, wherein the first data processing unit (10) is configured to provide the M encrypted data element shares (55) to the database (60).

Architecture

A27. The system according to any of the preceding system embodiments and with the features of embodiment A15, wherein each of the encryption key storage units (30A) is external to the first data processing unit (10).

A28. The system according to any of the preceding system embodiments and with the features of embodiment A19, wherein each of the data share storage units (30A) is external to the first data processing unit (10).

A29. The system according to any of the preceding system embodiments and with the features of embodiment A23, wherein the database (60) is external to the first data processing unit (10).

A30. The system according to any of the preceding system embodiments and with the features of embodiments A27 and A28, wherein for each encryption key storage unit (30A) there is one corresponding data share storage unit (30B) such that the encrypted data element share (55) stored in the data share storage unit (30B) is generated using the encryption key (42) stored in the encryption key storage unit (30A).

A31. The system according to the preceding embodiment, wherein for each encryption key storage unit (30A), the respective encryption key storage unit (30A) and the corresponding data share storage unit (30B) are embedded in a single device, such as, in a data storage unit (30).

A32. The system according to the preceding embodiment, wherein the data storage unit (30) is part of a user device (100).

Data Element

A33. The system according to any of the preceding system embodiments, wherein the data element (50) comprises digital data to be protected.

A34. The system according to any of the preceding system embodiments, wherein the data element (50) comprises an encryption key used to encrypt digital data to be protected.

A35. The system according to any of the preceding system embodiments, wherein the data element (50) comprises a cryptographic key, such as, a private key associated with a block within a blockchain.

A36. The system according to any of the preceding system embodiments, wherein the data element (50) comprises a cryptographic key, such as, a private key associated with one or more cryptographic assets.

A37. The system according to any of the preceding system embodiments, wherein the data element (50) comprises a cryptographic key, such as, a private key associated with one or more cryptocurrency units.

A38. The system according to any of the preceding system embodiments, wherein the data element (50) comprises a cryptographic key, such as, a master private key.

A39. The system according to the preceding embodiment, wherein the master private key is used to derive cryptographic keys.

A40. The system according to any of the two preceding embodiments, wherein the master private key is used for digital signature functionalities.

Authentication/Program

A41. The system according to any of the preceding system embodiments, wherein the first data processing unit (10) is configured to execute an authentication protocol prior to transferring data with an external device.

A42. The system according to any of the preceding system embodiments, wherein the system is configured to carry out the method according to any of the preceding method embodiments.

A43. The system according to any of the preceding system embodiments, wherein the first data processing unit (10) is configured to execute the first computer program of any of the embodiments M51 and M52.

A44. The system according to any of the preceding system embodiments, wherein the first data processing unit (10) is configured to execute the second computer program of embodiment M53.

A45. The system according to any of the preceding system embodiments and with the features of embodiments A23, wherein the database (60) is configured to execute the third computer program of embodiment M54.

A46. The system according to any of the preceding system embodiments and with the features of embodiments A32, wherein the data storage unit (30) is configured to execute the third computer program of embodiment M54.

General Computing Device

A47. The system according to any of the preceding system embodiments, wherein the system further comprises a general computing device (90).

A48. The system according to the preceding embodiment wherein the general computing device (90) comprises at least one of
- a general central processing unit, volatile and/or non-volatile memories, interfaces configured to interconnect internal components of the general computing device (90) and interfaces for facilitating the connection of the general computing device (90) with external devices.

A49. The system according to any of the two preceding embodiments, wherein the general computing device (90) comprises an interface configured to facilitate a connection for data transmission between the first data processing unit (10) and the general computing device (90).

A50. The system according to any of the 3 preceding embodiments and with the features of embodiment A32, wherein the general computing device (90) is configured to facilitate establishing a communication channel with at least one user device (100).

A51. The system according to any of the 4 preceding embodiments and with the features of embodiment A23, wherein the general computing device (90) is configured to facilitate establishing a communication channel with the database (60).

Password Protected Storage

A52. The system according to any of the preceding system embodiments, wherein the system further comprises at least one password protected storage (1110).

A53. The system according to the preceding embodiment, wherein the at least one password protected storage (1100) is provided in a respective cloud-based storage (1100).

Further Features of the First Data Processing Unit

A54. The system according to any of the preceding system embodiments, wherein the first data processing unit (10) is configured to store at least one data element share (52).

A55. The system according to any of the preceding system embodiments to any of the preceding device embodiments, wherein the first data processing unit (10) is configured to store the M encrypted data element shares (55).

Below, device embodiments will be discussed. These embodiments are abbreviated with the letter B followed by a number. Whenever reference is herein made to device embodiments, these embodiments are meant.

B1. A first data processing unit (10) configured
- to encrypt M data element shares (52) with an encryption key (42), respectively, and to thus generate M encrypted data element shares (55), wherein each of the encryption keys (42) corresponds to a decryption key (45), respectively, wherein M is an integer greater than 1.

B2. The first data processing unit (10) according to the preceding embodiment, and further configured to output the M encrypted data element shares (55).

B3. The first data processing unit (10) according to any of the preceding device embodiments, wherein the first data processing unit (10) is further configured to generate the M data element shares (52) based on a data element (50).

B4. The first data processing unit (10) according to any of the preceding device embodiments, wherein the first data processing unit (10) comprises a processing unit (250), such as, a micro-controller (250), preferably a tamperproof micro-controller (250).

B5. The first data processing unit (10) according to any of the preceding device embodiments, wherein the first data processing unit (10) comprises a memory device (240), preferably a secure memory device (240), such as, a self-encrypted memory (240).

B6. The first data processing unit (10) according to any of the preceding device embodiments, wherein the first data processing unit (10) comprises at least one hardware accelerator, and is preferably configured to increase the efficiency of executing at least one of
- asymmetric public/private key algorithm such as, and not limited to, RSA, ECC P256k1, ECC P256r1, X25519;
- Shamir's secret sharing algorithm;
- Elliptic Curve Cryptographic Digital Signature Algorithm (ECDSA); and
- key derivation algorithm (e.g. adapted KDF-BIP 32), SHA 1, SHA 256.

B7. The first data processing unit (10) according to any of the preceding device embodiments, wherein the first data processing unit (10) comprises an external communication component (230) configured to facilitate sending and/or receiving data to/from a device external to the first data processing unit (10).

B8. The first data processing unit (10) according to any of the preceding device embodiments, wherein the first data processing unit (10) comprises an internal communication component (260) configured to allow the internal components of the first data processing unit (10) to communicate with each other.

B9. The first data processing unit (10) according to the preceding embodiment, wherein the internal communication component (260) comprises a bus connection (260).

B10. The first data processing unit (10) according to any of the preceding device embodiments, wherein the first data processing unit (10) comprises an input user interface (210) which facilitates a user of the first data processing unit (10) to provide at least one input, e.g. an instruction, to the first data processing unit (10).

B11. The first data processing unit (10) according to any of the preceding device embodiments, wherein the first data processing unit (10) comprises an output user interface (220) which allows the first data processing unit (10) to provide indications to the user of the first data processing unit (10).

B12. The first data processing unit (10) according to any of the preceding device embodiments, wherein the first data processing unit (10) is configured to execute a data encryption routine, such as, an asymmetric encryption routine.

B13. The first data processing unit (10) according to any of the preceding device embodiments and with the features of embodiment B5, wherein the memory component (240) is configured to store computer instructions of at least one data encryption routine.

B14. The first data processing unit (10) according to any of the preceding device embodiments, wherein the first data processing unit (10) is configured to execute a data splitting routine, such as, a secret sharing scheme, e.g., a Shamir's secret sharing scheme.

B15. The first data processing unit (10) according to any of the preceding device embodiments and with the features of embodiment B6, wherein the memory component (240) is configured to store computer instructions of at least one data splitting routine.

B16. The first data processing unit (10) according to any of the preceding device embodiments, wherein the first data processing unit (10) is configured to execute an authentication protocol prior to transferring data with an external device.

B17. The first data processing unit (10) according to any of the preceding device embodiments, wherein the first data processing unit (10) is configured to store at least one data element share (52).

B18. The first data processing unit (10) according to any of the preceding device embodiments, wherein the first data processing unit (10) is configured to store the M encrypted data element shares (55).

B19. The first data processing unit (10) according to any of the preceding device embodiments, wherein the first data processing unit (10) is configured to execute the first computer program according to any of embodiments M51 and M52.

B20. The first data processing unit (10) according to any of the preceding device embodiments, wherein the first data processing unit (10) is configured to execute the second computer program of embodiment M53.

B21. The first data processing unit (10) according to any of the preceding device embodiments, wherein the first data processing unit (10) comprises a factory shared secret.

Below, determining method embodiments will be discussed. These embodiments are abbreviated with the letter D followed by a number. Whenever reference is herein made to determining method embodiments, these embodiments are meant.

D1. A determining method to determine the data element (50) of embodiment M1, wherein the determining method comprises
- providing at least N of M of the data element shares (52) of embodiment M1 in an unencrypted state, wherein N is an integer greater than or equal to 1, and smaller than or equal to M;
- determining the data element (50) based on the at least N data element shares (52) in the unencrypted state.

D2. The determining method according to the preceding embodiment, wherein determining the data element (50) based on the at least N data element shares (52) in the unencrypted state is performed by a device (200).

D3. The determining method according to the preceding embodiment, wherein the device (200) is different from the first data processing unit (10).

D4. The determining method according to any of the 2 preceding embodiments, wherein providing at least N of M of the data element shares (52) of embodiment M1 in an unencrypted state comprises
- providing each of the at least N data element shares in an encrypted state to the device (200),
- unencrypting each of the at least N data element shares in an encrypted state on the device (200) and thus getting the at least N data element shares in an unencrypted state.

D5. The determining method according to any of the preceding determining method embodiments, wherein each of the M decryption keys (45) of embodiment M1 is stored on a separate decryption key storage unit (30C), respectively.

Providing Encrypted Shares

D6. The determining method according to any of the preceding determining method embodiments with the features of the penultimate embodiment, wherein providing each of the at least N data element shares in an encrypted state to the device (200) comprises
- providing at least N encrypted data element shares (55) of embodiment M1 to the device (200).

D7. The determining method according to any of the preceding determining method embodiments with the features of embodiment D4, wherein providing each of the at least N data element shares in an encrypted state to the device (200) comprises at least one of
- providing from each of at least N data share storage units (30B) of embodiment M4 the encrypted data element share (55) stored therein to the device (200),
- providing from the database (60) of embodiment M4 at least N encrypted data element shares (55) stored therein to the device (200).

D8. The determining method according to any of the preceding determining method embodiments with the features of embodiment D4 and further comprising providing at least N decryption keys (45) to the device (200)
- wherein each of the at least N decryption keys (45) corresponds to a respective encryption key (42) used to generate the at least N encrypted data element shares (55) that are provided to the device (200).

D9. The determining method according to the preceding embodiment and with the features of embodiment D5, wherein the step of providing at least N decryption keys (45) to the device (200) comprises
- providing from each of the at least N of M decryption key storage units (30C) a decryption key (45) that is stored therein to the device (200).

D10. The determining method according to any of the 2 preceding embodiments, wherein the step of providing at least N decryption keys (45) to the device (200) comprises providing each of the at least N decryption keys (45) to the device (200) through a secure communication channel (82C), respectively.

D11. The determining method according to any of the 3 preceding embodiments, wherein the step of providing at least N decryption keys (45) to the device (200) comprises providing each of the at least N decryption keys (45) in an encrypted state such that only the recovery data processing unit comprises the required decryption key.

D12. The determining method according to any of the 4 preceding embodiments, wherein the step of providing at least N decryption keys (45) to the device (200) comprises providing each of the at least N decryption keys (45) with a corresponding digital certificate, such as, a X.509 certificate.

Computing Unit

D13. The determining method according to any of the preceding determining method embodiments further comprising providing at least N computing units (35).

D14. The determining method according to the preceding embodiment and with the features of embodiment D5, wherein each of the at least N computing units (35) is configured to access a respective decryption key storage unit (30C).

D15. The determining method according to any of the 2 preceding embodiments, wherein each of the at least N computing units (35) is configured to access at least one of
- a respective data share storage unit (30B) of embodiment M4 that stores the encrypted data element share (55) which decryption key (45) is stored in the decryption key storage unit (30C), that the computing unit is configured to access,
- the database (60) of embodiment M4.

Providing Temporary Encrypted Shares Encrypted with Same Temporary Encryption Key D16. The determining method according to any of the preceding determining method embodiments and with the features of embodiment D2 further comprising the device (200) generating one temporary encryption key (42T) and one corresponding temporary decryption key (45T).

D17. The method according to the preceding embodiment further comprising at least one of
- the device (200) providing the temporary encryption key (42T) to each of at least N out of M data storage units (30) of embodiment M6,
- the device (200) providing the temporary encryption key (42T) to the database (60) of embodiment M4.

D18. The method according to any of the 2 preceding embodiments and with the features of embodiment D14 and D15 further comprising, each of the at least N computing units (35)
- receiving from the decryption key storage unit (30C), that the respective computing unit (35) is configured to access, the decryption key (45) stored therein,
- receiving from the data share storage unit (30B), that the respective computing unit (35) is configured to access, the encrypted data element share (55) stored therein or receiving from the database (60) an encrypted data element share (55) corresponding to the received decryption key (45),
- decrypting the received encrypted data element share (55) using the received decryption key (45) to obtain a data element share (52) in an unencrypted state,
- receiving the temporary encryption key (42T), and
- encrypting the data element share (52) using the temporary encryption key (42T) to generate a respective temporary encrypted data element share (55T).

D19. The determining method according to the preceding embodiment wherein providing at least N of M of the data element shares of embodiment M1 in an unencrypted state comprises
- providing at least N temporary encrypted data element shares (55T) to the device (200), and unencrypting each of the at least N temporary encrypted data element share (55T) on the device (200) and thus obtaining the at least N data element shares in an unencrypted state.

Providing Temporary Encrypted Shares Encrypted with Different Temporary Encryption Keys D20. The method according to any of the preceding determining method embodiments and with the features of embodiment D2 and further comprising the device (200) generating at least N temporary encryption keys (42T) and at least N corresponding temporary decryption keys (45T).

D21. The method according to the preceding embodiment further comprising at least one of
- the device (200) providing a respective temporary encryption key (42T) to each of at least N out of M data storage units (30) of embodiment M6,
- the device (200) providing the at least N temporary encryption keys (42T) to the database (60) of embodiment M4.

D22. The method according to any of the 2 preceding embodiments and with the features of embodiment D14 and D15 further comprising, each of the at least N computing units (35)
- receiving from the decryption key storage unit (30C), that the respective computing unit (35) is configured to access, the decryption key (45) stored therein,
- receiving from the data share storage unit (30B), that the respective computing unit (35) is configured to access, the encrypted data element share (55) stored therein or receiving from the database (60) an encrypted data element share (55) corresponding to the received decryption key (45),
- decrypting the received encrypted data element share (55) using the received decryption key (45) to obtain a data element share (52) in an unencrypted state,
- receiving a respective temporary encryption key (42T), and
- encrypting the data element share (52) using the respective temporary encryption key (42T) to generate a respective temporary encrypted data element share (55T).

D23. The determining method according to the preceding embodiment wherein providing at least N of M of the data element shares of embodiment M1 in an unencrypted state comprises
- providing at least N temporary encrypted data element share (55T) to the device (200), and
- unencrypting each of the at least N temporary encrypted data element share (55T) on the device (200) and thus getting the at least N data element shares in an unencrypted state.

Architecture

D24. The determining method according to any of the preceding determining method embodiments and with the features of embodiments D2 and D5, wherein each of the decryption key storage units (30C) is external to the device (200).

D25. The determining method according to any of the preceding determining method embodiments and with the features of embodiments D2, wherein each of the at least N data share storage units (30B) of embodiment M4 is external to the device (200).

D26. The determining method according to any of the preceding determining method embodiments and with the features of embodiments D2, wherein the database (60) of embodiment M4 is external to the device (200).

D27. The determining method according to any of the preceding determining method embodiments and with the features of embodiments D2 and D13, wherein each of the at least N computing units (35) is external to the device (200).

D28. The determining method according to any of the preceding determining method embodiments and with the features of embodiment D14, wherein for each computing unit (35), the respective computing unit (35) and the respective decryption key storage unit (30C), that the computing unit (35) is configured to access, are integrated into a single device.

Authentication

D29. The determining method according to any of the preceding determining method embodiments, wherein the device (200) executes an authentication protocol prior to transferring data with an external device for authenticating the external device.

D30. The determining method according to the preceding embodiment, wherein data is transferred between the device (200) and the external device only upon successful authentication of the external device by the device (200).

D31. The determining method according to any of the preceding embodiments, wherein an external device executes an authentication protocol prior to transferring data with the device (200) for authenticating the device (200).

D32. The determining method according to the preceding embodiment, wherein data is transferred between the external device and the device (200) only upon successful authentication of the device (200) by the external device.

For the sake of brevity, the term external device is used in the above to refer to any of each of the decryption key storage units, each of the data share storage units, the database, each of the data storage unit, each of the user devices, each of the computing units, as discussed in the respective embodiments above.

Computer Implement Method

D33. The determining method according to any of the preceding determining method embodiments, wherein the determining method is a computer implemented method.

D34. A forth computer program comprising instructions which, when the program is executed by a device (200), causes the device (200)
- to determine a data element (50) based on at least N of M data element shares (52), wherein N is an integer greater than or equal to 1, and smaller than or equal to M and M is an integer greater than 1, according to the determining method according to any of the preceding determining method embodiments.

D35. A fifth computer program comprising instructions which, when the program is executed by a device (200) causes the device (200) to carry out or facilitate the steps of the determining method according to any of the preceding determining method embodiments.

Further Features

D36. The determining method according to any of the preceding determining method embodiments and with the features of embodiment D2, wherein providing at least N of M of the data element shares (52) of embodiment M1 in an unencrypted state comprises
- providing to the device (200) at least N of M of the data element shares (52) of embodiment M1 in an unencrypted state, wherein N is an integer greater than or equal to 1, and smaller than or equal to M.

D37. The determining method according to any of the preceding determining method embodiments and with the features of embodiment D2, further comprising the device (200) carrying out a digital signature functionality using the data element (50) after determining the data element (50).

D38. The determining method according to any of the preceding determining method embodiments with the features of embodiment D2, wherein the device (200) is a recovery data processing unit (20).

D39. The determining method according to any of the preceding determining method embodiments and without the features of the preceding embodiment, wherein the device (200) is the first data processing unit (10) of embodiment M1.

D40. The determining method according to the preceding embodiment, wherein providing at least N of M of the data element shares (52) of embodiment M1 in an unencrypted state comprises
- providing a data element share (52) from a respective password protected storage (1110) of embodiment M38 to the first data processing unit (10).

D41. The determining method according to the preceding embodiment, wherein providing a data element share (52) from a respective password protected storage (1110) of embodiment M38 to the first data processing unit (10) comprises
- a user device (100) executing a computer program (1115), the computer program (1115) comprising instructions for receiving the data element share (52) stored in the password protected storage (1110) using a respective computer program specific password,
- the user device (100) executing said instructions and receiving the data element share (52), and
- the user device (100) providing the data element share (52) to the first data processing unit (10).

Providing Encrypted Shares Encrypted with a Factory Shared Secret

D42. The determining method according to any of the preceding determining method embodiments and with the features of embodiment D2 and D13, wherein the device (200) and each of the at least N computing units (35) comprise a factory shared secret in common.

D43. The method according to the preceding embodiment and with the features of embodiment D14 and D15 further comprising: each of the at least N computing units (35)
- receiving from the decryption key storage unit (30C), that the respective computing unit (35) is configured to access, the decryption key (45) stored therein,
- receiving from the data share storage unit (30B), that the respective computing unit (35) is configured to access, the encrypted data element share (55) stored therein or receiving from the database (60) an encrypted data element share (55) corresponding to the received decryption key (45),
- decrypting the received encrypted data element share (55) using the received decryption key (45) to obtain a data element share (52) in an unencrypted state,
- encrypting the data element share (52) using the factory shared secret to generate a respective factory-secret-encrypted data element share.

D44. The determining method according to the preceding embodiment wherein providing at least N of M of the data element shares of embodiment M1 in an unencrypted state comprises
- providing at least N factory-secret-encrypted data element share data element shares to the device (200), and
- unencrypting each of the at least N factory-secret-encrypted data element share data element shares on the device (200) using the factory shared secret and thus obtaining the at least N data element shares in an unencrypted state.

Below, determining system embodiments will be discussed. These embodiments are abbreviated with the letter E followed by a number. Whenever reference is herein made to determining system embodiments, these embodiments are meant.

E1. A determining system comprising
- a device (200) configured to obtain at least N of M data element shares (52) in an unencrypted state related to a data element (50), wherein M is an integer greater than 1 and N is an integer greater than or equal to 1, and smaller than or equal to M;
- the device (200) configured to determine the data element (50) based on the at least N data element shares (52) in the unencrypted state.

Recovery Data Processing Unit

E2. The determining system according to the preceding embodiment, wherein the device (200) comprises a processing unit (250), such as a micro-controller (250), preferably a tamperproof micro-controller (250).

E3. The determining system according to any of the preceding determining system embodiments, wherein the device (200) comprises a memory device (240), preferably a secure memory device (240), such as a self-encrypted memory (240).

E4. The determining system according to any of the preceding determining system embodiments, wherein the device (200) comprises at least one hardware accelerator, and is preferably configured to increase the efficiency of executing at least one of
- asymmetric public/private key algorithm such as, and not limited to, RSA, ECC P256k1, ECC P256r1, X25519;
- Shamir's secret sharing algorithm;
- Elliptic Curve Cryptographic Digital Signature Algorithm (ECDSA);
- key derivation algorithm (e.g. adapted KDF-BIP 32); and
- SHA 1, SHA 256.

E5. The determining system according to any of the preceding determining system embodiments, wherein the device (200) comprises an external communication component (230) configured to facilitate sending and/or receiving data to/from a device external to the device (200).

E6. The determining system according to any of the preceding determining system embodiments, wherein the device (200) comprises an internal communication component (260) configured to allow the internal components of the device (200) to communicate with each other.

E7. The determining system according to the preceding embodiment, wherein the internal communication component (260) comprises a bus connection (260).

E8. The determining system according to any of the preceding determining system embodiments, wherein the device (200) comprises an input user interface (210) which facilitates a user of the device (200) to provide at least one input, e.g. an instruction, to the device (200).

E9. The determining system according to any of the preceding determining system embodiments, wherein the device (200) comprises an output user interface (220) which allows the device (200) to provide indications to the user of the device (200).

E10. The determining system according to any of the preceding determining system embodiments, wherein the device (200) is configured to execute a data decryption routine, such as an asymmetric decryption routine.

E11. The determining system according to any of the preceding determining system embodiments and with the features of embodiment E3, wherein the memory component (240) is configured to store computer instructions of at least one data decryption routine.

E12. The determining system according to any of the preceding determining system embodiments, wherein the device (200) is configured to execute a data recovery routine based on a secret sharing scheme, e.g., a Shamir's secret sharing scheme.

E13. The determining system according to any of the preceding determining system embodiments and with the features of embodiment E3, wherein the memory component (240) is configured to store computer instructions of at least one data recovery routine.

Decryption Key Storage Units

E14. The determining system according to any of the preceding determining system embodiments and further comprising at least N separate decryption key storage units (30C), each configured to store a respective decryption key (45).

E15. The determining system according to the preceding embodiment, wherein the device (200) is configured to at least receive data from each of the decryption key storage units (30C).

E16. The determining system according to any of the 2 preceding embodiments, wherein the determining system further comprises a respective secure data communication channel (82C) between the device (200) and each of the decryption key storage units (30C).

E17. The determining system according to any of the 3 preceding embodiments, wherein the device (200) is configured to receive a respective decryption key (45) from each of the M decryption key storage units (30C), respectively.

Data Share Storage Units

E18. The determining system according to any of the preceding determining system embodiments and further comprising at least N separate data share storage units (30B), each configured to store a respective encrypted data element share (55).

E19. The determining system according to the preceding embodiment, wherein the device (200) is configured to at least receive data from each the at least N data share storage units (30B).

E20. The determining system according to any of the 2 preceding embodiments, wherein the determining system further comprises a respective data communication channel (80B) between the device (200) and each of the data share storage units (30B).

E21. The determining system according to any of the 3 preceding embodiments, wherein the device (200) is configured to receive a respective encrypted data element share (55) from each of the at least M data share storage units (30B), respectively.

Database

E22. The determining system according to any of the preceding determining system embodiments and further comprising a database (60) configured to store a plurality of encrypted data element shares (55), preferably M encrypted data element shares (55).

E23. The determining system according to the preceding embodiment, wherein the device (200) is configured to at least receive data from the database (60).

E24. The determining system according to any of the 2 preceding embodiments, wherein the determining system further comprises a data communication channel (97) between the device (200) and the database (60).

E25. The determining system according to any of the 3 preceding embodiments, wherein the device (200) is configured to receive at least N encrypted data element shares (55) from the database (60).

Temporary Keys/Computing Units

E26. The determining system according to any of the preceding determining system embodiments, wherein the device (200) is configured to generate at least one pair of cryptographic keys, each pair comprising one temporary encryption key (42T) and one temporary decryption key (45T).

E27. The determining system according to any of the preceding determining system embodiments, further comprising at least N computing units (35).

E28. The determining system according to the preceding embodiment and with the features of embodiment E14, wherein each of the at least N computing unit (35) is configured to access a respective decryption key storage unit (30C).

E29. The determining method according to any of the 2 preceding embodiments and with the features of embodiment E18 and/or E22, wherein each of the at least N computing units (35) is configured to access at least one of
a respective data share storage unit (30B) that stores the encrypted data element share (55) which decryption key (45) is stored in the decryption key storage unit (30C), that the computing unit is configured to access, the database (60).

E30. The determining system according to any of the preceding determining system embodiments and with the features of embodiment E26 and E27, wherein each of the at least N computing units (35) is configured to receive a temporary encryption key (42T) from the device (200).

E31. The determining system according to any of the preceding determining system embodiments and with the features of embodiment E28 and E29, wherein each of the at least N computing units (35) is configured to
receive from the decryption key storage unit (30C), that the respective computing unit (35) is configured to access, the decryption key (45) stored therein,
receive from the data share storage unit (30B), that the respective computing unit (35) is configured to access, the encrypted data element share (55) stored therein or receive from the database (60) an encrypted data element share (55) corresponding to the received decryption key (45), decrypt the received encrypted data element share (55) using the received decryption key (45) to obtain a data element share (52) in an unencrypted state, receive the temporary encryption key (42T), and encrypt the data element share (52) using the temporary encryption key (42T) to generate a respective temporary encrypted data element share (55T).

E32. The determining system according to the preceding, wherein each of the at least N computing units (35) is configured to provide the temporary encrypted data element share (55T) that it is configured to generate to the device (200).

Architecture

E33. The determining system according to any of the preceding determining system embodiments and with the features of embodiment E14, wherein each of the decryption key storage units (30B) is external to the device (200).

E34. The determining system according to any of the preceding determining system embodiments and with the features of embodiment E18, wherein each of the data share storage units (30A) is external to the device (200).

E35. The determining system according to any of the preceding determining system embodiments and with the features of embodiment E22, wherein the database (60) is external to the device (200).

E36. The determining system according to any of the preceding determining system embodiments and with the features of embodiment E27, wherein each computing unit (35) is external to the device (200).

E37. The determining system according to the preceding embodiment and with the features of embodiment E28, wherein for each computing unit (35), the respective computing unit (35) and the respective decryption key storage unit (30C), that the computing unit (35) is configured to access, are integrated into a single device.

E38. The determining system according to the preceding embodiment, wherein each of the single devices is part of a respective user device (100).

Data Element

E39. The determining system according to any of the preceding determining system embodiments, wherein the data element (50) comprises digital data to be protected.

E40. The determining system according to any of the preceding determining system embodiments, wherein the data element (50) comprises an encryption key used to encrypt digital data to be protected.

E41. The determining system according to any of the preceding determining system embodiments, wherein the data element (50) comprises a cryptographic key, such as, a private key associated with a block within a blockchain.

E42. The determining system according to any of the preceding determining system embodiments, wherein the data element (50) comprises a cryptographic key, such as, a private key associated with one or more cryptographic assets.

E43. The determining system according to any of the preceding determining system embodiments, wherein the data element (50) comprises a cryptographic key, such as, a private key associated with one or more cryptocurrency units.

E44. The determining system according to any of the preceding determining system embodiments, wherein the data element (50) comprises a cryptographic key, such as, a master private key.

E45. The determining system according to the preceding embodiment, wherein the master private key is used to derive cryptographic keys.

E46. The determining system according to any of the 2 preceding embodiments, wherein the master private key is used for digital signature functionalities.

Authentication/Program

E47. The determining system according to any of the preceding determining system embodiments, wherein the device (200) is configured to execute an authentication protocol prior to transferring data with an external device.

E48. The determining system according to any of the preceding determining system embodiments configured to carry out the determining method according to any of the preceding determining method embodiments.

E49. The determining system according to any of the preceding determining system embodiments, wherein the device (200) is configured to execute the forth computer program of embodiment D34.

E50. The determining system according to any of the preceding determining system embodiments, wherein the device (200) is configured to execute the fifth computer program of embodiment D35.

General Computing Device

E51. The determining system according to any of the preceding determining system embodiments, wherein the system further comprises a general computing device (90).

E52. The determining system according to the preceding embodiment wherein the general computing device (90) comprises at least one of
- a general central processing unit, volatile and/or non-volatile memories, interfaces configured to interconnect the internal components of the general computing device (90) and interfaces for facilitating the connection of the general computing device (90) with external devices.

E53. The determining system according to any of the two preceding embodiments, wherein the general computing device (90) comprises an interface configured to facilitate a connection for data transmission between the device (200) and the general computing device (90).

E54. The determining system according to any of the preceding determining system embodiments and with the features of embodiment E38, wherein the general computing device (90) is configured to facilitate establishing a communication channel with at least one user device (100).

E55. The system according to any of the preceding embodiments and with the features of embodiment E22, wherein the general computing device (90) is configured to facilitate establishing a communication channel with the database (60).

Password Protected Storage

E56. The system according to any of the preceding embodiments, wherein the system further comprises at least one password protected storage (1110).

E57. The system according to the preceding embodiment, wherein the at least one password protected storage (1100) is provided in a respective cloud-based storage (1100).

Further Features

E58. The determining system according to any of the preceding determining system embodiments, wherein the device (200) being configured to obtain at least N of M data element shares (52) in an unencrypted state comprises the device (200) being configured to receive each of at least N data element shares in an encrypted state and decrypt each of the at least N data element shares in an encrypted state to obtain the at least N data element shares in an unencrypted state.

E59. The determining system according to any of the preceding determining system embodiments and with the features of embodiment E14, wherein the device (200) being configured to obtain at least N of M data element shares (52) in an unencrypted state comprises the device (200) being configured to receive a respective encrypted data element share (55) from each of the at least M data share storage units (30B), respectively, and decrypt each of the at least N data element shares in an encrypted state to obtain the at least N data element shares in an unencrypted state.

E60. The system according to any of the preceding determining system embodiments, wherein the device (200) is a recovery data processing device (20).

E61. The determining method according to any of the preceding determining system embodiments and without the features of the preceding embodiment, wherein the device (200) is the first data processing unit (10) of embodiment M1.

E62. The determining method according to any of the preceding determining system embodiments and without the features of the penultimate embodiment, wherein the device (200) is the first data processing unit (10) of embodiment A1.

Factory Shared Secret

E63. The determining system according to any of the preceding determining system embodiments and with the features of embodiment E27, wherein the device (200) and the at least N computing units comprise a factory shared secret in common.

E64. The determining system according to the preceding embodiment and with the features of embodiment E28 and E29, wherein each of the at least N computing units (35) is configured to receive from the decryption key storage unit (30C), that the respective computing unit (35) is configured to access, the decryption key (45) stored therein, receive from the data share storage unit (30B), that the respective computing unit (35) is configured to access, the encrypted data element share (55) stored therein or receive from the database (60) an encrypted data element share (55) corresponding to the received decryption key (45), decrypt the received encrypted data element share (55) using the received decryption key (45) to obtain a data element share (52) in an unencrypted state, encrypt the data element share (52) using the factory shared secret to generate a respective factory-secret-encrypted data element share.

E65. The determining system according to the preceding, wherein each of the at least N computing units (35) is configured to provide the factory-secret-encrypted data element share that it is configured to generate to the device (200).

Below, determining device embodiments will be discussed. These embodiments are abbreviated with the letter F followed by a number. Whenever reference is herein made to determining device embodiments, these embodiments are meant.

F1. A recovery data processing unit (20) configured to receive M data element shares (52) in an unencrypted state related to a data element (50), wherein M is an integer greater than 1;

determine the data element (50) based on the at least N data element shares (52) in the unencrypted state.

F2. The recovery data processing unit (20) according to the preceding embodiment, wherein the recovery data processing unit (20) comprises a processing unit (250), such as a micro-controller (250), preferably a tamperproof micro-controller (250).

F3. The recovery data processing unit (20) according to any of the preceding determining device embodiments, wherein the recovery data processing unit (20) comprises a memory device (240), preferably a secure memory device (240), such as a self-encrypted memory (240).

F4. The recovery data processing unit (20) according to any of the preceding determining device embodiments, wherein the recovery data processing unit (20) comprises at least one hardware accelerator, and is preferably configured to increase the efficiency of executing at least one of asymmetric public/private key algorithm such as, and not limited to, RSA, ECC P256k1, ECC P256r1, X25519;

Shamir's secret sharing algorithm;

Elliptic Curve Cryptographic Digital Signature Algorithm (ECDSA);

key derivation algorithm (e.g. adapted KDF-BIP 32); and SHA 1, SHA 256.

F5. The recovery data processing unit (20) according to any of the preceding determining device embodiments, wherein the recovery data processing unit (20) comprises an external communication component (230) configured to facilitate sending and/or receiving data to/from a device external to the recovery data processing unit (20).

F6. The recovery data processing unit (20) according to any of the preceding determining device embodiments, wherein the recovery data processing unit (20) comprises an internal communication component (260) configured to allow the internal components of the recovery data processing unit (20) to communicate with each other.

F7. The recovery data processing unit (20) according to the preceding embodiment, wherein the internal communication component (260) comprises a bus connection (260).

F8. The recovery data processing unit (20) according to any of the preceding embodiments, wherein the recovery data processing unit (20) comprises an input user interface (210) which facilitates a user of the recovery data processing unit (20) to provide at least one input, e.g., an instruction to the recovery data processing unit (20).

F9. The recovery data processing unit (20) according to any of the preceding determining device embodiments, wherein the recovery data processing unit (20) comprises an output user interface (220) which allows the recovery data processing unit (20) to provide indications to the user of the recovery data processing unit (20).

F10. The recovery data processing unit (20) according to any of the preceding embodiments, wherein the recovery data processing unit (20) is configured to execute a data decryption routine, such as an asymmetric decryption routine.

F11. The recovery data processing unit (20) according to any of the preceding determining device embodiments and with the features of embodiment F3, wherein the memory device (240) is configured to store computer instructions of at least one data decryption routine.

F12. The recovery data processing unit (20) according to any of the preceding determining device embodiments, wherein the recovery data processing unit (20) is configured to execute a data recovery routine, based on a secret sharing scheme, e.g., a Shamir's secret sharing scheme.

F13. The recovery data processing unit (20) according to any of the preceding determining device embodiments and with the features of embodiment F3, wherein the memory device (240) is configured to store computer instructions of at least one data recovery routine.

F14. The recovery data processing unit (20) according to any of the preceding determining device embodiments, wherein the recovery data processing unit (20) is configured to execute an authentication protocol prior to transferring data with an external device.

F15. The recovery data processing unit (20) according to any of the preceding determining device embodiments, wherein the recovery data processing unit (20) is configured to execute the forth computer program of embodiment D34.

F16. The recovery data processing unit (20) according to any of the preceding determining device embodiments, wherein the recovery data processing unit (20) is configured to execute the fifth computer program of embodiment D35.

Below, composite method embodiments will be discussed. These embodiments are abbreviated with the letter C followed by a number. Whenever reference is herein made to composite method embodiments, these embodiments are meant.

C1. A composite method, wherein the composite method comprises the method according to any of the preceding method embodiments and the determining method according to any of the preceding determining method embodiments.

C2. The composite method according to the preceding embodiment, wherein the method according to any of the preceding method embodiments is performed before the determining method.

Below, composite system embodiments will be discussed. These embodiments are abbreviated with the letter G followed by a number. Whenever reference is herein made to composite system embodiments, these embodiments are meant.

G1. A composite system comprising the system according to any of the preceding system embodiments and the system according to any of the preceding determining system embodiments.

G2. The composite system according to the preceding embodiment configured to carry out the composite method according to any of the composite method embodiments.

Below, embodiments of a method for storing a data element will be discussed. These embodiments are abbreviated with the letter H followed by a number.

H1. A method for storing a data element (50), the method comprising:
  providing at least two devices (200), wherein each of the at least two devices (200) comprises an initial key, which is identical for each of the at least two devices (200);
  each of the at least two devices respectively generating the same data element (50) based on the initial key.

H2. The method according to the preceding embodiment, wherein each of the at least two devices (200) comprises a respective secure enclave.

H3. The method according to any of the 2 preceding embodiments, wherein providing the at least two devices (200), wherein each of the at least two devices (200) comprises an initial key, which is identical for each of the at least two devices (200), comprises the at least two devices (200) agreeing on the initial key.

H4. The method according to any of the 3 preceding embodiments, wherein providing the at least two devices (200), wherein each of the at least two devices (200) comprises an initial key, which is identical for each of the at least two devices (200), comprises
  the at least two devices (200) exchanging data and based thereon each of the at least two devices (200) respectively determining the initial key.

H5. The method according to any of the 4 preceding embodiments, wherein providing the at least two devices (200), wherein each of the at least two devices (200) comprises an initial key, which is identical for each of the at least two devices (200), comprises
  each of the at least two devices (200) determining the initial key according to a key agreement protocol.

H6. The method according to the preceding embodiment, wherein the key agreement protocol is a secure key agreement protocol.

H7. The method according to any of the 2 preceding embodiments, wherein the key agreement protocol is based on the Diffie-Hellman key agreement protocol.

H8. The method according to any of the 3 preceding embodiments, wherein the key agreement protocol is based on the Elliptic Curve Diffie-Hellman (ECDH) key agreement protocol.

H9. The method according to any of the 8 preceding embodiments, wherein providing the at least two devices (200), wherein each of the at least two devices (200) comprises an initial key, which is identical for each of the at least two devices (200), comprises
  each of the at least two devices (200) determining the initial key without communicating the initial key between the at least two devices (200).

H10. The method according to any of the 9 preceding embodiments and with the features of embodiment H2, wherein providing the at least two devices (200), wherein each of the at least two devices (200) comprises an initial key, which is identical for each of the at least two devices (200), comprises
  providing the initial key inside the respective secure enclave of each of the at least two devices (200).
  Preferably, the initial key is provided only inside the respective secure enclave of each of the at least two devices.

H11. The method according to the preceding embodiment, wherein providing the at least two devices (200), wherein each of the at least two devices (200) comprises an initial key, which is identical for each of the at least two devices (200), comprises
  storing the initial key inside the respective secure enclave of each of the at least two devices (200).

H12. The method according to any of the 2 preceding embodiments, wherein providing the at least two devices (200), wherein each of the at least two devices (200) comprises an initial key, which is identical for each of the at least two devices (200), comprises
  determining the initial key inside the respective secure enclave of each of the at least two devices (200).

H13. The method according to any of the 12 preceding embodiments, wherein the method comprises generating a random string.

H14. The method according to the preceding embodiment and with the features of embodiment H2, wherein the random string is generated outside each of the secure enclaves of the at least two devices (200).

H15. The method according to the preceding embodiment and with the features of embodiment H2, wherein the random string is generated by a random number generator and wherein the random number generator is an integrated circuit not comprised by any of the secure enclaves of the at least two devices (200).

H16. The method according to any of the 2 preceding embodiments and with the features of embodiment H2, wherein the random string is generated by a random number generator function and wherein the random number generator function is not executed by any of the secure enclaves of the at least two devices (200).

H17. The method according to any of the 4 preceding embodiments, wherein the method comprises providing the random string to each of the at least two devices (200).

H18. The method according to the preceding embodiment and with the features of embodiment H2, wherein providing the random string to each of the at least two devices (200) comprises providing the random string inside the respective secure enclave of each of the at least two devices (200).

H19. The method according to any of the 18 preceding embodiments, wherein each of the at least two devices (200) generating the same data element (50) based on the initial key comprises each of the at least two devices (200) executing at least two different functions to generate the data element (50), wherein at least one of the functions receives as an input the initial key.

H20. The method according to the preceding embodiment, wherein executing at least two different functions to generate the data element (50) comprises executing a first function before executing a second function, wherein the second function receives as input the results of the first function.

H21. The method according to the preceding embodiment and with the features of embodiment H17, wherein the first function receives as input the initial key and the random string and outputs a result based on an operation performed on the initial key and on the random string.

H22. The method according to the preceding embodiment, wherein the first function comprises concatenating the random string with the initial key.

H23. The method according to any of the 3 preceding embodiments, wherein the second function comprises a hash function.

H24. The method according to any of the 4 preceding embodiments, wherein the second function comprises an encryption function.

The second function and the first function can preferably be deterministic functions.

H25. The method according to any of the 24 preceding embodiments, wherein each of the at least two devices (200) generating the same data element (50) based on the initial key comprises each of the at least two devices (200) executing a concatenating function.

H26. The method according to any of the 25 preceding embodiments, wherein each of the at least two devices (200) generating the same data element (50) based on the initial key comprises each of the at least two devices (200) executing a hashing function.

H27. The method according to any of the 26 preceding embodiments wherein each of the at least two devices (200) generating the same data element (50) based on the initial key comprises each of the at least two devices (200) executing an encryption function.

H28. The method according to any of the 27 preceding embodiments and with the features of embodiment H2, wherein each of the at least two devices (200) generating the same data element (50) based on the initial key is carried out by the respective secure enclave of each of the at least two devices (200).

H29. The method according to any of the 28 preceding embodiments, wherein the at least two devices (200) comprise an identical factory shared secret.

H30 The method according to the preceding embodiment, wherein the factory shared secret is specific only to the at least two devices (200).

H31. The method according to any of the 2 preceding embodiments, wherein the factory shared secret is utilized to encrypt communication between the at least two devices (200).

H32. The method according to the preceding embodiment, wherein a symmetric encryption scheme is utilized to encrypt communication between the at least two devices (200) with the factory shared secret.

H33. The method according to any of the 2 preceding embodiments and with the features of embodiment H2, wherein the factory shared secret is stored within the respective secure enclave of each of the at least two devices (200).

H34. The method according to any of the 3 preceding embodiments, wherein providing the at least two devices (200), wherein each of the at least two devices (200) comprises an initial key, which is identical for each of the at least two devices (200), comprises
  each of the devices (200) encrypting data using the factory shared secret before sending them to another one of the devices (200).

H35. The method according to the preceding embodiment and with the features of embodiment H2, wherein data is encrypted with the factory shared secret inside the respective secure enclave of each of the devices (200).

H36. The method according to any of the 5 preceding embodiments, wherein providing the at least two devices (200), wherein each of the at least two devices (200) comprises an initial key, which is identical for each of the at least two devices (200), comprises
  each of the devices (200) decrypting data using the factory shared secret after receiving them from another of the devices (200).

H37. The method according to the preceding embodiment and with the features of embodiment H2, wherein data is decrypted using the factory shared secret inside the respective secure enclave of each of the devices (200).

H38. The method according to any of the 37 preceding embodiments, wherein the method comprises utilizing a first device (200) to perform at least one of:
  encrypting data with the data element (50) as an encryption key,
  decrypting data using the data element (50) as a decryption key,
  deriving cryptographic keys using the data element (50) as a master key, and
  performing digital signature functionalities using the data element (50);
  and utilizing a second device (200) to recover the data element (50).

H39. The method according to the preceding embodiment, wherein the second device (200) is utilized to recover the data element (50) if the first device (200) becomes non-operational.

H40. The method according to the preceding embodiment, wherein the method comprises further utilizing the second device (200) to perform the same functionalities as the first device (200) before it became non-operational.

Below system embodiments will be discussed. These embodiments are abbreviated by the letter J followed by a number.

J1. A system comprising at least two devices (200) each configured to generate the same data element (50) based on an initial key.

J2. The system according to the preceding embodiment, wherein each of the at least two devices (200) comprises at least one processing unit (250).

J3. The system according to any of the 2 preceding embodiments, wherein each of the at least two devices (200) comprises one or more micro-controller unit(s) (250), such as, one or more tamperproof micro-controller unit(s) (250).

J4. The system according to any of the 3 preceding embodiments, wherein each of the at least two devices (200) comprises a memory component (240).

J5. The system according to the preceding embodiment, wherein the memory component (240) is a secure memory device (240), such as, a self-encrypted memory.

J6. The system according to any of the 5 preceding embodiments, wherein each of the at least two devices (200) comprises at least one hardware accelerator (270).

J7. The system according to any of the 6 preceding embodiments, wherein each of the at least two devices (200) comprises an external communication component (230).

J8. The system according to any of the 7 preceding embodiments, wherein each of the at least two devices (200) comprises an internal communication component (260).

J9. The system according to any of the 8 preceding embodiments, wherein each of the at least two devices (200) comprises a secure enclave.

J10. The system according to any of the 9 preceding embodiments, wherein the at least two devices (200) comprise identical architectures.

J11. The system according to any of the 10 preceding embodiments, wherein the at least two devices (200) comprise a factory shared secret in common.

J12. The system according to the preceding embodiment, wherein each of the at least two devices (200) is configured to receive the factory share secret, preferably, during manufacturing.

J13. The system according to any of the 2 embodiments, wherein each of the at least two devices (200) is configured to encrypt and decrypt data using the factory shared secret.

J14. The system according to the preceding embodiment, wherein each of the at least two devices (200) is configured to encrypt and decrypt data using the factory shared secret, respectively, before sending them to or receiving them from another one of the at least two devices (200).

J15. The system according to any of the 14 preceding embodiments, wherein the system is configured to carry out the method according to any of the method embodiments H1 to H40.

J16. The system according to any of the 15 preceding embodiments, wherein at least one of the devices (200) is configured to perform at least one of:
encrypting data with the data element (50) as an encryption key,
decrypting data using the data element (50) as a decryption key,
deriving cryptographic keys using the data element (50) as a master key, and
performing digital signature functionalities using the data element (50);

and wherein at least another one of the devices (200) is configured to be utilized to recover the data element (50).

Below further method embodiments will be discussed.

M55. The method according to any of the preceding method embodiments M1 to M54, wherein the method further comprises the steps of the method according to any of the preceding embodiments H1 to H40.

M56. The method according to the preceding embodiment, wherein at least one of the devices (200) of embodiment H1 is the first data processing unit (10).

Below further system embodiments will be discussed.

A56. The system according to any of the preceding system embodiments A1 to A55, wherein the system further comprises the system according to any of the preceding embodiments J1 to J16.

A57. The system according to the preceding embodiment, wherein at least one of the devices (200) of embodiment J1 is the first data processing unit (10).

Below, further composite method embodiments will be discussed.

C3. A composite method, wherein the composite method comprises at least two of
the method according to any of the preceding method embodiments,
the determining method according to any of the preceding determining method embodiments and
the method according to any of the embodiments H1 to H40.

C4. The composite method according to the preceding embodiment, wherein the method according to any of the preceding method embodiments is performed before the determining method.

C5. The method according any of the 2 devices, wherein the method according to any of the embodiments H1 to H40 is performed before the method according to any of the preceding embodiments.

C6. The method according to any of the 3 preceding embodiments, wherein at least one of the devices (200) of embodiment H1 is the first data processing unit of embodiment M1 and at least one other of the devices (200) of embodiment H1 is the device (200) of embodiment D2.

Below, further composite system embodiments will be discussed.

G3. A composite system comprising at least one of
the system according to any of the preceding system embodiments,
the system according to any of the preceding determining system embodiments and
the system according to any of the embodiment J1 to J16.

G4. The composite system according to the preceding embodiment configured to carry out the composite method according to any of the composite method embodiments.

BRIEF DESCRIPTION OF THE DRAWINGS

FIG. 2*c* illustrates with a time diagram the method for determining a data element according to the first embodiment;

FIG. 3b illustrates with a time diagram the method for storing a data element according to the second embodiment;

DETAILED DESCRIPTION OF THE DRAWINGS

Figure 1:
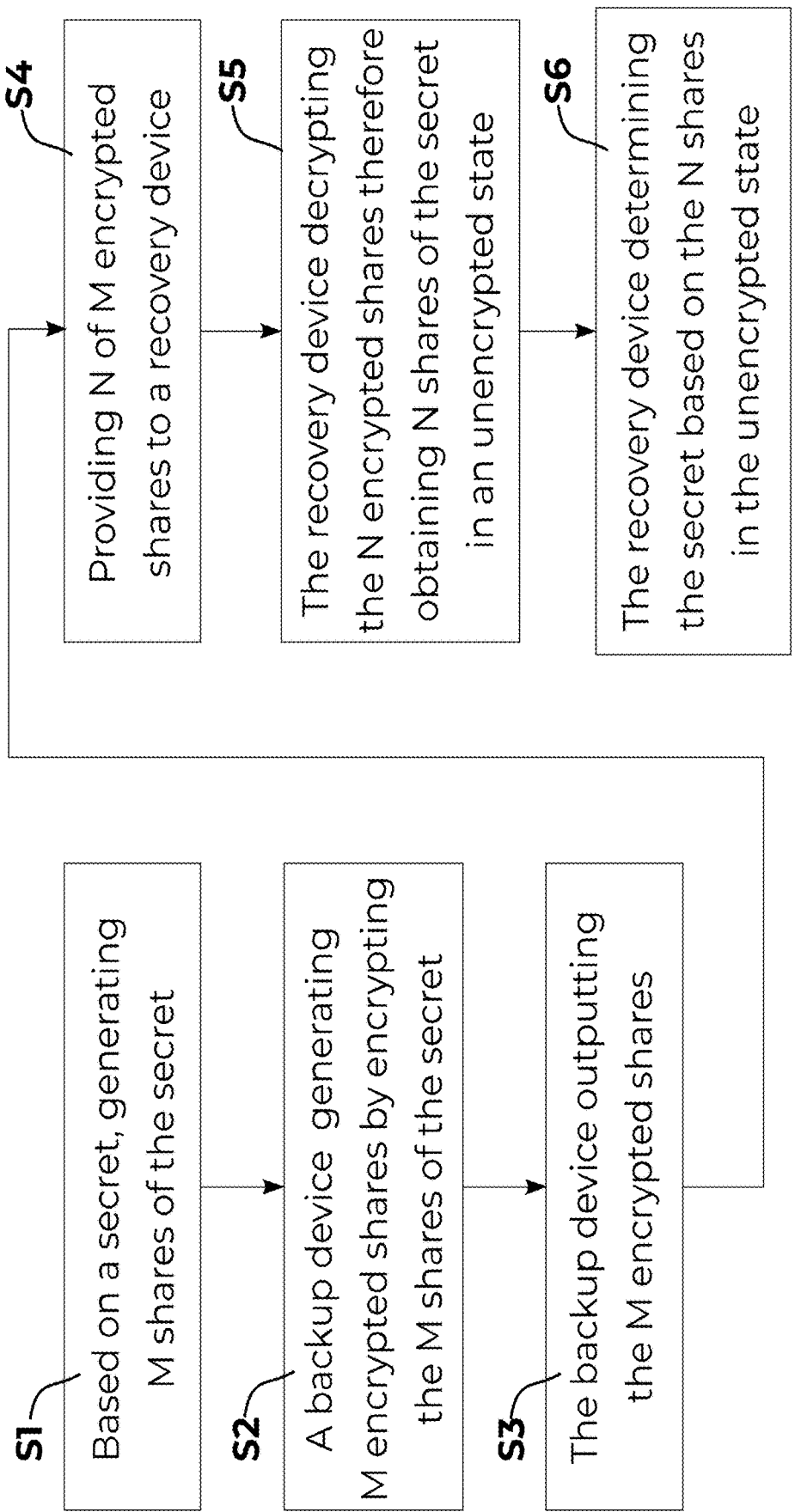
FIG. 1 depicts a method for storing a data element and a corresponding method for determining the data element.

In the following, exemplary embodiments of the invention will be described, referring to the figures. These examples are provided to give further understanding of the invention, without limiting its scope.

In the following description, a series of features and/or steps are described. The skilled person will appreciate that unless explicitly required and/or unless requires by the context, the order of features and steps is not critical for the resulting configuration and its effect. Further, it will be apparent to the skilled person that irrespective of the order of features and steps, the presence or absence of time delay between steps can be present between some or all of the described steps.

The present invention generally relates to methods, devices and systems for storing and determining a data element.

Throughout the text, the data element can be referred to as a secret, for the sake of brevity. More particularly, the terms data element and secret are interchangeably used. A secret and data element, as used herein, may refer to any digital data, the access to which need to be controlled such that only authorized users or devices may access the data. In some embodiments, the data to be protected itself may form the secret. Alternatively, the data to be protected may be encrypted and the decryption key that can be used to decrypt the data can form the secret. In some embodiments, the secret may be a master private key that can be used for digital signature functionalities and/or to derive further encryption keys. That is, the secret may be a digital document, valuable digital assets (e.g. in the form of cryptocurrencies), a cryptographic key (e.g. encryption key, decryption key, private key), one or more private keys corresponding to a cryptocurrency or any combination thereof. However, it will be understood that the above are only some practical examples of a secret.

It will be understood that throughout the text the term key refers to a cryptographic key, which can be a string of data that can be used to lock or unlock cryptographic functions, including authentication, authorization and encryption.

The present invention generally relates to storing a data element (i.e., a secret) in a secure manner such that it cannot be accessed by unauthorized users and/or devices. In addition, the present invention relates to mitigating the risk of losing the secret. The present invention achieves the above two effects by providing improved methods for storing a secret, and corresponding improved methods for determining the secret. Furthermore, the present invention provides a first data processing unit for facilitating the backup (i.e. storing) of a secret. For the sake of brevity, the first data processing unit can also be referred to as a backup device. Throughout the text the terms backup device and first data processing unit are used interchangeably.

In addition, the present invention provides a recovery data processing unit for facilitating the recovery of the secret. For the sake of brevity, the recovery data processing unit can also be referred to as a recovery device. Throughout the text the terms recovery device and recovery data processing unit are used interchangeably.

FIG. 1 generally describes a method for storing and determining a secret according to embodiments of the present invention. More particularly, steps S1, S2 and S3 relate to a method for storing the secret and steps S4, S5 and S6 relate to a corresponding method for determining the secret.

In step S1, the method comprises based on a secret, generating M shares of the secret, wherein M is an integer greater than 1. That is, information about the secret can be split into a plurality of parts, each part referred to as a secret share (or a data element share) or for the sake of brevity as a share. It will be noted that the terms secret share, data element share and share are used interchangeably and refer to a share of the secret in an unencrypted state as generated in step S1.

In some embodiments, in step S1 a data splitting routine may be executed. The data splitting routine can for example be a computer program comprising instructions which, when the program is executed by a computer, can cause the computer to split data into multiple parts. Thus, when the data splitting routine is executed M shares of a secret can be generated.

In some embodiments, step S1 can be carried on a backup device. The backup device can be configured to generate M shares of a secret based on the secret. For example, the backup device can comprise one or more processing units configured to execute the data splitting routine.

Furthermore, in step S1 the M shares of the secret can be generated such that at least N shares of the secret are required for determining the secret, wherein N can be an integer greater than or equal to 1 and smaller than or equal to M, i.e., $1 \leq N \leq M$. Moreover, in step S1 the M secret shares can be generated such that it can be computationally infeasible to determine the secret when comprising less than N secret shares. N can be referred to as a threshold and the data splitting routine of step S1 can be part of a secret sharing scheme referred to as a threshold secret sharing scheme. It can also be referred to as an (N, M) threshold secret sharing, wherein M shares of a secret are generated and at least N shares of the secret are required for determining the secret.

Computational infeasibility as used in this document, refers to a computation would require too many resources to actually compute, making the computation impractical. For example, a computationally infeasible computation may require time in the amount of years to millennia to compute with conventional data processing means or even with supercomputers. Typically, the infeasible computation's cost is greater than the reward obtained by computing it.

In one particular embodiment, the data splitting routine can be based on the Shamir's secret sharing scheme. The Shamir's secret scheme is a particular implementation of a threshold secret sharing scheme. Through the Shamir's secret sharing scheme, the secret can be divided into multiple parts, giving each subject its own unique part. To reconstruct the original secret, a minimum number of parts is required. The Shamir's secret sharing scheme can be implemented as a threshold scheme, meaning that a minimum number of shares required can be less than the total number of shares. Moreover, the shares are constructed such that information on any number of shares smaller than the minimum number of shares makes it computationally infeasible to calculate the original share.

In such embodiments, in step S1 a polynomial of degree $N-1$ can be defined (e.g. by the backup device). For example, $N-1$ numbers (e.g. positive integers) $a_1, \ldots, a_{N-1}$ can be generated, preferably by generating random or pseudo-random numbers. Next, a polynomial of degree $N-1$, of the form $$f(x) = a_0 + a_1 x + a_2 x^2 + \ldots + a_{N-1} x^{N-1},$$

can be built. Generally, the coefficients $a_1, \ldots, a_{N-1}$ can be generated such that they are smaller than a predefined prime number P. Moreover, P can be chosen such that it is larger than M. Coefficient $a_0$, on the other hand, can be chosen such that it provides information on the secret. For example, the secret may be mapped to a number $a_0$, such that the secret can be determined based on $a_0$ in a computationally feasible way. Thus, knowledge on $a_0$ can provide all the information of the secret. More particularly, the secret can be easily and fully reconstructed if $a_0$ is known. The mapping of the secret to $a_0$ can, for example, be based on an injective function. Further, the mapping of the secret to $a_0$ can, for example, be based on a two-way function. That is, it is easy to calculate $a_0$ based on the secret and the secret based on $a_0$.

In the above, as an example, the secret is mapped to coefficient $a_0$ (i.e. the coefficient multiplying the zero-degree variable). More particularly, the secret is mapped to the value of the polynomial when the variable is set to 0. It will be understood that similarly the secret can be mapped to any other value of the polynomial. That is, in general, the secret can be mapped to any f(i), wherein i is in the domain of the polynomial. However, typically i equals 0.

Next, M points of the polynomial can be calculated by inputting a non-zero integer to the polynomial and calculating the output. That is, a point of the polynomial can be represented as (x, f(x)). Points of the polynomial can be used to generate the shares of the secret. That is, each share of the secret can comprise a unique point on the polynomial. As it can be noticed, a secret share does not necessarily comprise a direct part of the secret per se. This can further be ensured by not allowing the point (i, f(i)) corresponding to the point wherein the secret is mapped, to be shared as a share of the secret. In other words, the content of the secret is not necessarily comprised by the shares.

As discussed, the polynomial can be constructed with a degree of $N-1$. Thus, at least N points of the polynomial are required to determine it. Based on the N points, the constants of the polynomial can be calculated and the secret can be determined by calculating the value of the polynomial with a zero input (i.e. $f(0)=a_0 \rightarrow S$). On the other hand, with less than N points the polynomial cannot be defined. That is, at least one of the constants of the polynomial cannot be calculated if there are less then N points of the polynomial. As such, f(0), or in general f(i), cannot be calculated. Thus, the secret cannot be determined.

To further increase the computational complexity of determining the secret when comprising less than N shares of the secret, finite field arithmetic can be used instead of integer field arithmetic. A field of size p, wherein $p > a_0$ and $p > n$ can be used. The points of the polynomial are calculated as (x, f(x) mod p) instead of (x, f(x)), wherein mod is an abbreviation of the modulus operator which finds the remainder after division of one number by another. Typically and preferably, a large prime number is chosen for p.

Using the Shamir's secret sharing scheme, briefly described above, calculating shares of a secret comprises simply calculating the value of a polynomial given a certain input for the variable of the polynomial, which is a computationally easy operation, typically comprising summation, multiplication and exponentiation. Similarly, reconstructing the secret given at least N shares comprises solving a system of linear equations which typically is also a computationally feasible operation (particularly when the degree of the polynomial is not too large). However, reconstructing the secret with less than N shares is computationally infeasible. More particularly, having less than N points of a polynomial of degree $N-1$, leaves the polynomial unspecified, and as such the point on the polynomial wherein the secret is mapped cannot be calculated.

It will be noted that the above is only an exemplary technique of generating the M shares of the secret in step S1.

After generating the secret shares, it can be advantageous to delete the secret. This can further contribute into increasing the security of the secret.

In a further step S2, the method can comprise the backup device encrypting the shares of the secret. Each share of the secret can be encrypted with a respective encryption key. Thus, M encrypted shares of the secret (also referred to as encrypted data element shares) can be generated, each encrypted with a respective encryption key. Furthermore, each encryption key corresponds to a corresponding decryption key.

It will be noted that an encrypted share of the secret refers to a share of the secret in an encrypted state. That is, a share of the secret, as used herein, is in an unencrypted state. On the other hand, an encrypted share of the secret is in an encrypted state. When decrypted, each encrypted share yields a respective share of the secret.

In other words, by encrypting M shares, M encrypted shares can be generated. Each share can preferably be encrypted with a unique encryption key. Thus, during step S2 a one-to-one mapping (or association) can be performed between M shares and M encryption keys. In some embodiments, the mapping between the shares and the encryption keys can be random or can depend on the time order that the encryption keys are provided to the backup device or on the time order that the encrypted shares are generated. In other words, in some embodiments, the mapping between shares and the encryption keys may not be of importance and may not impact the result. This can particularly be the case if the M shares are generated in step S1 with equal share value (i.e. equal amount of information for determining the secret), e.g., shares comprise an equal number of points of the polynomial discussed above.

Alternatively, a predefined rule can be used for mapping the shares to encryption keys. This can be particularly advantageous when the shares are generated in step S1 with unequal value, that is, when the shares comprise a different amount of information for determining the secret, e.g., shares comprise different number of points of the polynomial discussed above. As the shares are differentiated (i.e. some can contribute more on determining the secret than others) a predefined assignment between the shares and encryption keys can be performed. In other words, the owners of the encryption keys and corresponding decryption keys can be differentiated. The assignment between shares and encryption keys can be based on the owners of the encryption keys, such that, some owners are provided with encrypted shares of higher share value than the others.

An owner of an encryption key and corresponding decryption key may refer to a device comprising a memory component wherein the encryption key and corresponding decryption key are stored. Alternatively, the owner of an encryption key and corresponding decryption key may refer to the memory component wherein the encryption key and corresponding decryption key are stored, such as, an encryption key storage unit (also referred to as first data storage unit) and a decryption key storage unit (also referred to as third data storage unit), which will be discussed further below. Alternatively or additionally, the owner of an encryption key and corresponding decryption key may refer to a user comprising or having access to the memory component wherein the encryption key and corresponding decryption key are stored.

The backup device can be configured to execute an encryption routine during step S2, and thus encrypt the shares of the secret and generate encrypted shares. In general, the encryption routine can be a computer program comprising instructions which, when the program is executed by a computer can cause the computer to encrypt data. Thus, when the encryption routine is executed by the backup device, one or more shares of the secret can be encrypted.

The encryption routine can be based on one of more encryption schemes. In some embodiments, the encryption routine can be based on a symmetric encryption scheme, such as, and not limited to, Blowfish, Advanced Encryption Standard (AES), Rivest Cipher 4/5/6 (RC4/5/6), or Data Encryption Standard (DES). It should be understood that these are merely exemplary and that also other schemes may be used. In such embodiments, one cryptographic key is used both for encryption and decryption. That is, the encryption key and the decryption key are in fact the same key. Alternatively and preferably, the encryption routine can be based on an asymmetric encryption scheme, such as, and not limited to, RSA, ECC P256k1, ECC P256r1, X25519. In such embodiments, different cryptographic keys are used for encryption and decryption.

That is, in an asymmetric encryption scheme, key pairs are used. The cryptographic keys in the key pair are typically referred to as a private key and a public key. As the names suggest, the private key need to be securely stored and the public key can be made public. The public key can typically be easily calculated from the private key; however, it is computationally unfeasible to derive the private key from the public key. Furthermore, each key can be used for encryption and decryption. In the context of securing data, typically data is encrypted with the public key. Thus, only the owner of the private key may access the data, as only the corresponding private key can be used to decrypt the data. In the context of digital signatures, typically data can be encrypted with the private key.

As used in this document, the encryption key refers to the public key and the decryption key refers to the private key.

After generating the encrypted shares, it can be advantageous to delete the shares of the secret that are in the unencrypted sate. This can further contribute into increasing the security of the secret. That is, even if the backup device is accessed by an unauthorized party, the secret cannot be determined as only encrypted shares are stored therein. As discussed, the secret can only be determined based on at least N shares of the secret in an unencrypted state.

In a further step S3, the backup device can output the M encrypted shares. Since the encrypted shares of the secret are in an encrypted state (as a result of step S2), outputting the encrypted shares does not compromise the secrecy of the secret. Again, the secret cannot be determined from the encrypted shares.

Outputting the encrypted shares in step S3 can be advantageous as it can allow storing the encrypted shares in memory devices external to the backup device. Thus, even if the backup device is lost, damaged or compromised the secret can still be determined as the encrypted shares can also be stored elsewhere (e.g. in the second data storage units and/or database).

Again, steps S1 to S3 relate to storing a secret (i.e. a secret backup). Through steps S1 to S3 the backup device may facilitate storing the secret in a secure manner because instead of storing the secret, multiple encrypted shares of the secret are stored. Furthermore, the encrypted shares can be redundant when N<M, such that even if up to M-N shares are lost or destroyed, the original secret can still be determined. In addition, the encrypted shares of the secret protect the shares from being accessed by unauthorized devices or users. Unauthorized devices or users can also be referred to as third parties. Corollary, only parties (i.e. devices or users) comprising the corresponding decryption key of an encrypted share may access the share. That is, only the owner of the corresponding decryption key of an encrypted share can access the share.

Furthermore, by outputting only the encrypted shares (in step S3) and potentially deleting the unencrypted shares of the secret (e.g., at the end of step S2) the security can be significantly increased. That is, the unencrypted shares of the secret never "leave" the backup device. Moreover, they can have a very short lifetime which can correspond to the time required to execute steps S1 and S2. Thus, in order to obtain the secret, one need not only have to compromise the backup device, but it needs to do this particularly during steps S1 and S2 when the secret and/or shares of the secret are present and unencrypted in the backup device. After step S1, the secret can be deleted, and after step S2 the shares of the secret can be deleted, thus making it computationally infeasible to recover the secret even if the backup device is accessed by an unauthorized party after step S2. In other words, for securing the secret, only steps S1 and S2 need to be performed in a secure part of the backup device.

Further still, in step S1 the shares can be generated with different share value. For example, a first set of shares may comprise a share value of 25% and another set of shares can comprise a share value of 50%. For example, for M=4, one share can comprise only one point of the polynomial (i.e. 25% share value) and three shares can comprise two points of the polynomial (i.e. 50% of share value). The secret can be reconstructed if shares amounting to a value of 75% of total shares (i.e. N=3) are present. Thus, either three from the first set of shares or two from the second set of shares or one from the first set of shares and one from the second set of shares are required to reconstruct the secret. Next, during the mapping between shares and encryption keys in step S2, the owners of the encryption keys can be assigned shares of different values. In other words, the present method allows not only a uniform distribution of the shares but also a non-uniform distribution of the shares.

Furthermore, the method may comprise storing the encrypted shares after they are output by the backup device. As will be discussed further below, the encrypted shares can be stored in separate second data storage units, respectively, i.e., in a distributed manner. This can allow to provide corresponding encrypted shares to the owners of the encryption keys used to encrypt the share and the corresponding decryption key. Alternatively or additionally, the encrypted shares can be stored in a database. Alternatively or additionally still, the encrypted shares can be stored in a memory component of the backup device.

Through steps S4, S5 and S6 a determining method for determining the secret stored according to the above method is discussed. The recovery (i.e. determination) of the secret (i.e., the data element) can be facilitated by a recovery data processing unit, which can be referred to for the sake of brevity as a recovery device.

In step S4, at least N of M encrypted shares can be provided to the recovery device. In some embodiments, at least N of the encrypted shares generated in step S2 can be provided to the recovery device (as discussed, e.g., with reference to FIGS. 2a to 3d). Alternatively, at least N encrypted shares obtained by encrypting the secret shares with a temporary encryption key, wherein the temporary encryption key is generated by the recovery device, can be provided to the recovery device (as discussed, e.g., with reference to FIGS. 4a to 6).

In step S5, the recovery device can decrypt the at least N encrypted shares. Each of the at least N encrypted shares can preferably be decrypted with a unique corresponding decryption key.

Thus, to facilitate step S5 the method can comprise providing the at least N corresponding decryption keys to the recovery device 10. Typically, the at least N corresponding decryption keys can be provided to the recovery device 10 from the owners of the decryption keys. For example, the decryption keys can be provided to the recovery device from separate decryption key storage units (also referred to as third data storage units) wherein they can be stored. Furthermore, it can be advantageous to communicate the decryption keys in a secure manner to the recovery device such that unauthorized parties may not access the decryption key or, in other words, only the recovery device receives the decryption keys.

Thus, during step S5 a matching between the at least N shares and N decryption keys need to be performed. In some embodiments, the matching between the encrypted shares and the decryption keys can be provided to the recovery device (e.g. during step S4). Alternatively, the encrypted shares and the decryption keys can be provided to the recovery device in pairs. That is, each encrypted share can be provided with its corresponding decryption key. Alternatively, the recovery device can determine the matching through a brute-force, trial-and-error process. Alternatively, in embodiments wherein in step S4 the recovery device can be provided with at least N encrypted shares obtained by encrypting the secret shares with a temporary encryption key, wherein the temporary encryption key is generated by the recovery device, the recovery device may already know the corresponding decryption keys from the generation of the keys.

The recovery device can be configured to carry out a decryption routine during step S5, therefore decrypting the encrypted shares and obtaining the secret shares in an unencrypted state. In general, the decryption routine can be a computer program comprising instructions which, when the program is executed by a computer, can cause the computer to decrypt data. Thus, when the decryption routine is executed by the recovery device, one or more shares of the secret can be decrypted. Moreover, for a successful decryption, the decryption routine can be configured or chosen (e.g. from a plurality of decryption routines) to correspond to the encryption routine used to encrypt the encrypted shares. Similarly, the decryption key used in step S5, need to correspond to the encryption key used to encrypt the encrypted shares provided to the recovery device in step S4.

In step S6, the method can comprise the recovery device determining the secret based on at least N secret shares in an unencrypted state. That is, the recovery device can be configured to execute a recovery routine for determining the secret based on at least N shares of the secret. In general, the recovery routine can be a computer program comprising instructions which, when the program is executed by a computer, can cause the computer to recover the original data from N shares generate based on the original data. Thus, when the recovery routine is executed by the recovery device, the secret can be determined based on the at least N shares of the secret. For example, the recovery routine may be a routine configured to calculate one or more constants of a polynomial of degree N−1, based on at least N points of the polynomial, and based thereon calculate a point of the polynomial wherein the secret is mapper, and based thereon determine the secret.

In simple words, the secret can be generated by "cloning" the backup device to the recovery device. That is, the backup device and the recovery device may comprise the same architecture. They may be configured to carry out any of the steps S1 to S6. When used for the secret backup (i.e. steps S1 to S3), the device can be referred to as a backup device. In this case it can be used for generating and sharing shares of the secret as discussed through steps S1 to S3. In addition, the backup device can be used for restoring the secret whenever at least N shares of the secret are provided by carrying out steps S4 to S6. This can be particularly important, if the secret contains a master private key that can be used for deriving further keys and/or for digital signature functionalities.

In case the backup device is damaged or lost or compromised, then a second device, i.e., the recovery device, can be used for determining the secret. The recovery device can be configured to execute steps S4 to S6 for determining the secret. Thus, the backup device that was damaged, lost or compromised is cloned into the recovery device. The recovery device can then be used for restoring the secret whenever at least N shares of the secret are provided by carrying out steps S4 to S6.

Similarly, if the recovery device gets damaged or lost or compromised, a third device (i.e. a second recovery device) can be used for determining the secret. That is, the recovery device gets cloned on the second recovery device and the second recovery device can then be used for restoring the secret whenever at least N shares of the secret are provided by carrying out steps S4 to S6.

Thus, the secret may not bound to a single device. That is, as illustrated with the example above, even when the backup device gets damaged, lost or compromised the secret can still be recovered using a recovery device. Thus, the present invention mitigates the single point of failure issue typically present on conventional storage systems.

Figure 2A:
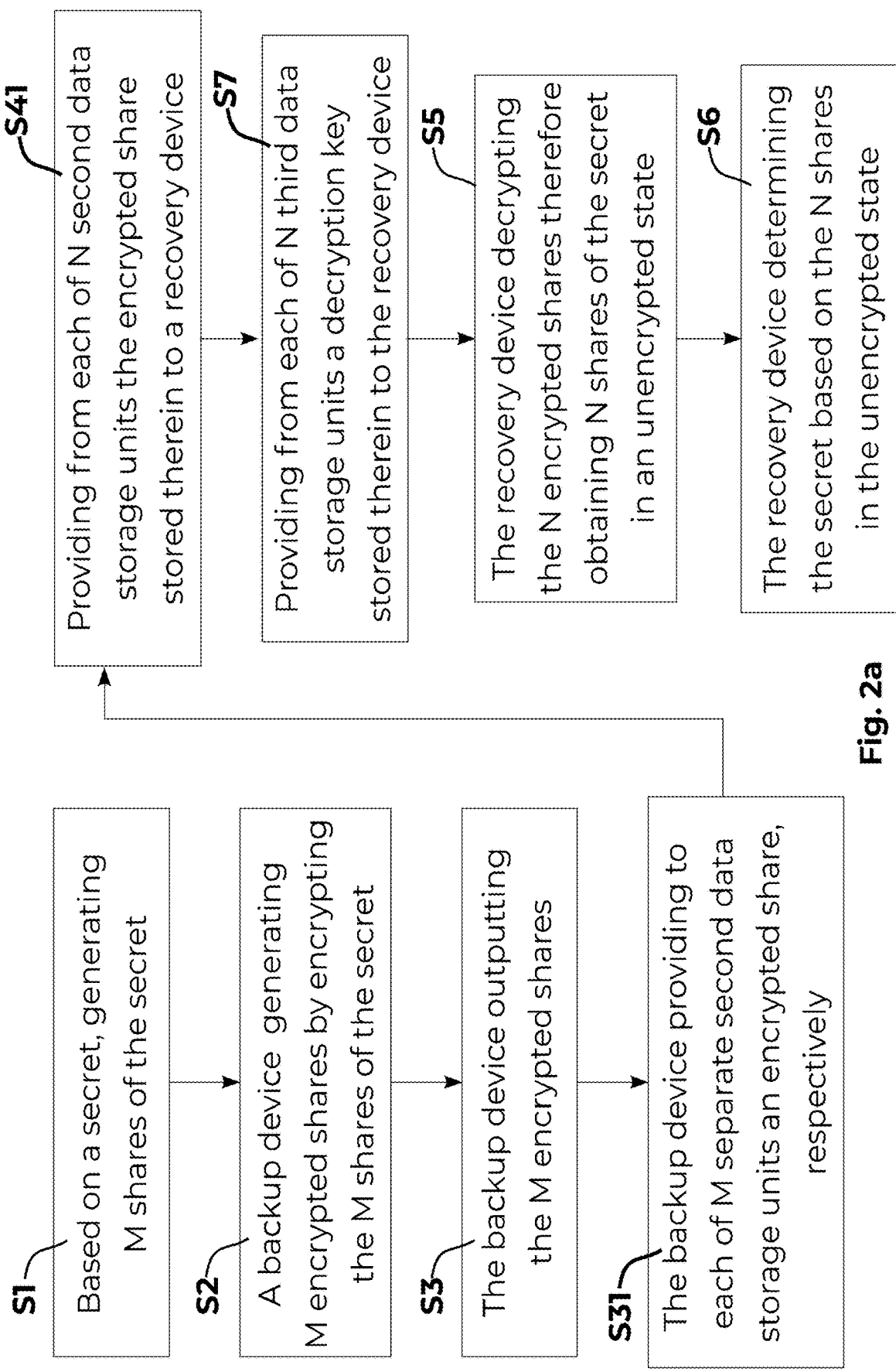
FIG. 2*a* depicts a first embodiment of the method for storing a data element and a corresponding first embodiment of the method for determining the data element.
Figure 2B:
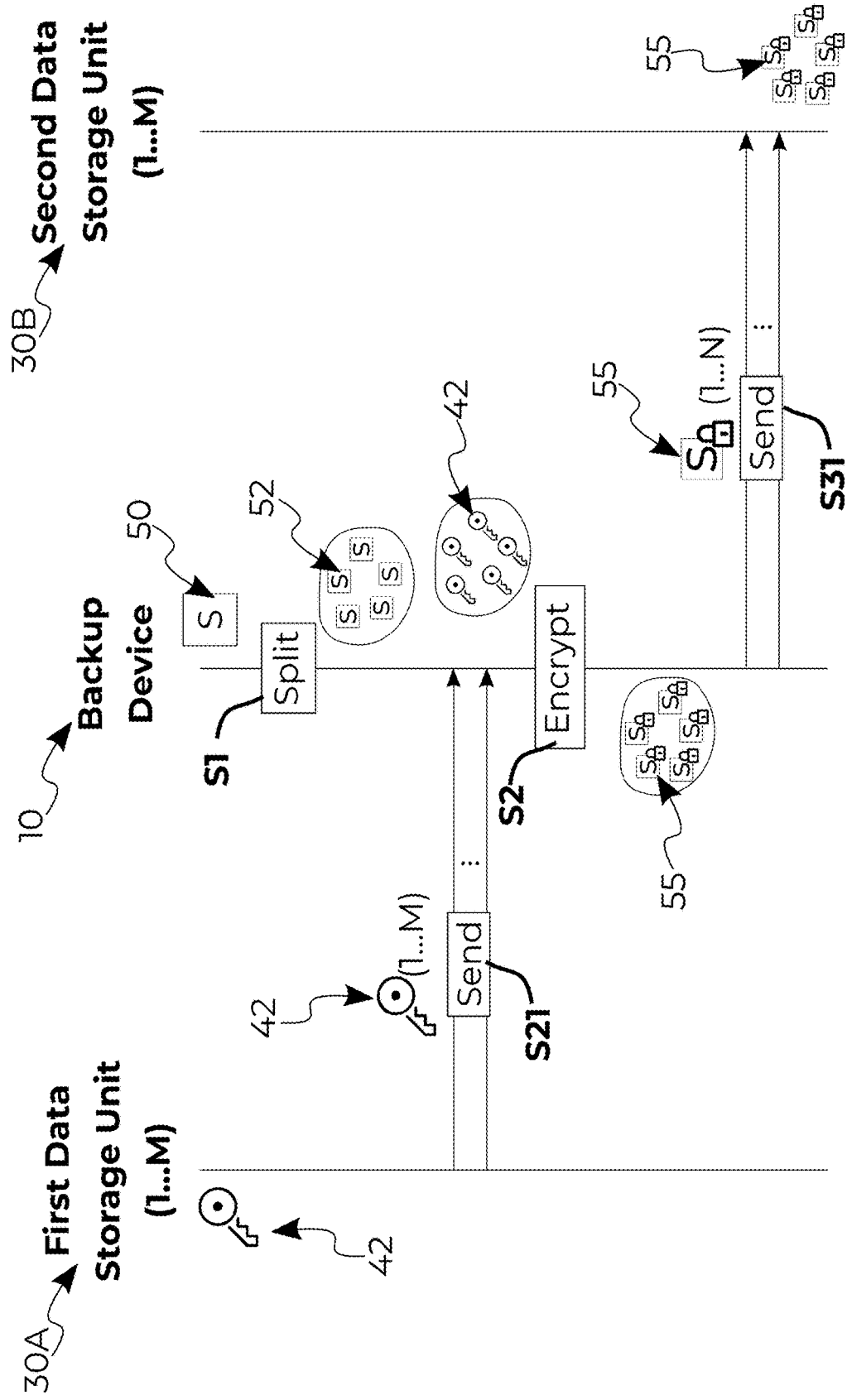
FIG. 2*b* illustrates with a time diagram the method for storing a data element according to the first embodiment.

With respect to FIGS. 2a to 2c, a particular embodiment of the method for storing a data element and the corresponding method for determining the data element is discussed. It will be noted that throughout the figures like reference signs refer to like steps or devices.

Again, as discussed with respect to FIG. 1, in a first step S1, based on a secret, M shares of the secret can be generated (e.g. by a backup device). In a step S2, the backup device can generate M encrypted shares of the secret by encrypting each of the shares of the secret with a respective encryption key. Thus, there can be M encryption keys each used to encrypt a respective share of the secret. Each encryption key can correspond to a respective decryption key. Thus, there can be M decryption keys, each corresponding to a decryption key, respectively. Each of M encryption keys can be stored in a respective encryption key storage unit (also referred to as first data storage unit). Thus, M separate first data storage units can be provided for storing each of M encryption keys, respectively. Preferably, each of the first data storage units is external to the backup device.

On the other hand, each of the M decryption keys corresponding to the M encryption keys respectively, can be stored in a respective decryption key storage unit (also referred to as third data storage unit). That is, M separate third data storage units can be provided, each storing a respective decryption key. However, during steps S1 to S3, i.e. during the storing of the secret, only the first data storage units are required and can thus be provided.

Further, in a step S3 the backup device may output the M encrypted shares. In the embodiment of the method illustrated in FIG. 2a, the step of the backup device outputting the M encrypted shares is followed by step S31 wherein the backup device provides to each of M second data storage a respective encrypted share. That is, the backup device can distribute the M encrypted shares among M separate second data storage units, such that each second data storage unit receives a respective encrypted share. Preferably, each of the second data storage units is external to the backup device.

In some embodiments, each of the M encrypted shares is provided to a corresponding data share storage unit (also referred to as second data storage unit). That is, the distribution of encrypted shares to the second data storage units can be performed based on a rule or order. This is particularly the case in embodiments wherein each of the second data storage units corresponds to a respective first data storage unit. In such embodiments, an encrypted share can be provided to the second data storage unit if the corresponding first data storage unit stores the encryption key used to generate the encrypted share.

Put simply, one first data storage unit (i.e, one encryption key storage unit) and one second data storage unit (i.e., one data share storage unit) can correspond to each other, e.g., be internal to the same device. The first data storage unit can store an encryption key used in step S2 to obtain an encrypted share. This encrypted share can be provided to the second data storage unit.

Figure 7:
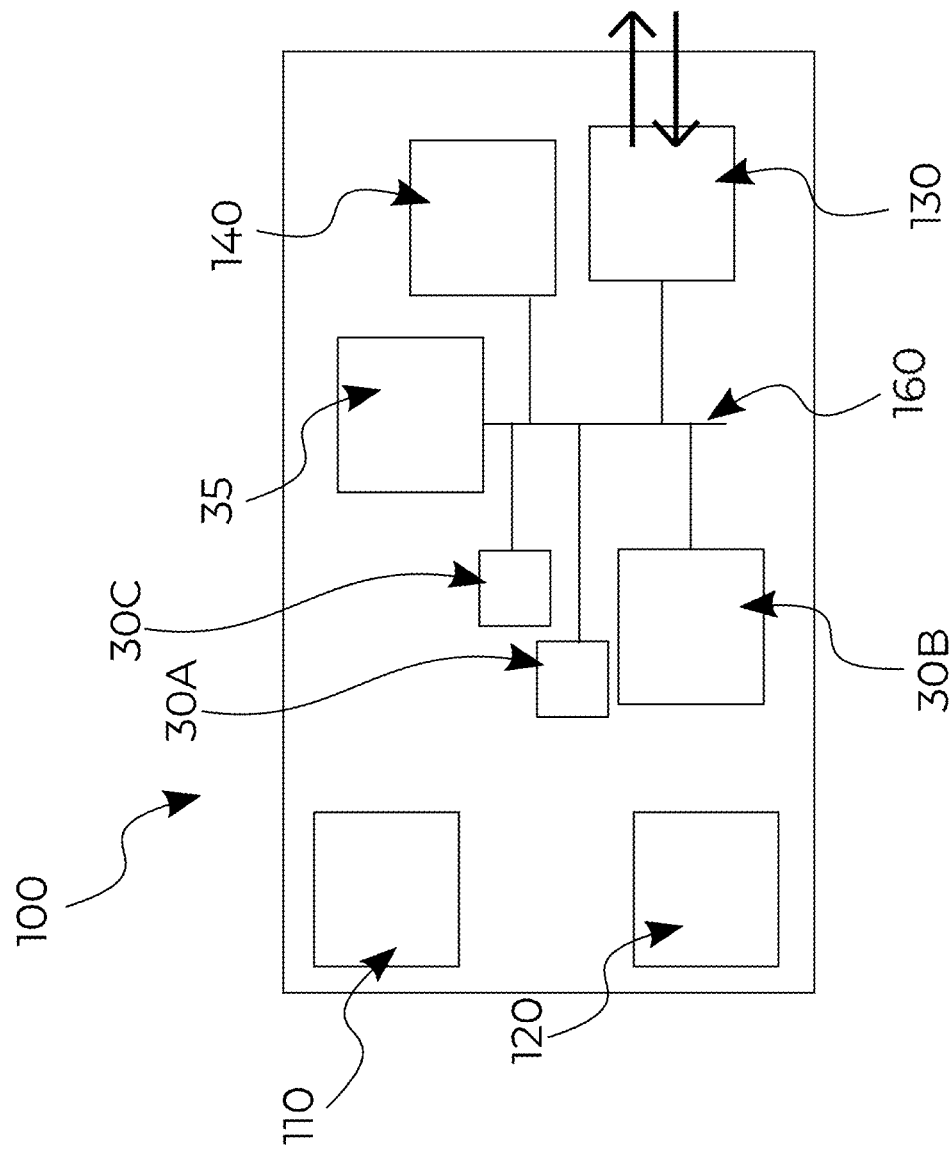
FIG. 7 illustrates a user device that can be part of a system of carrying out the method of the present invention.

For example, a user may comprise a user device (e.g., see FIG. 7). The user device may comprise at least the first data storage unit, wherein a respective encryption key is stored, and a second data storage unit, wherein a respective encrypted share can be stored. Each user device, during step S3, can be provided with the encrypted share obtained using the encryption key stored in the first data storage unit of the respective user device.

During the secret backup in steps S1 to S3, only encryption keys are provided. Thus, during the backup phase, it may not possible to determine the secret, because the decryption keys for decrypting the encrypted shares may not be present or provided during the method of steps S1 to S3.

Through steps S1 to S31, the secret can be distributed to M separate second data storage units such that access to the whole secret is never granted outside the backup device. It will be noted that a user or device of the second data storage unit (or any third party) may have access only to one or more encrypted shares of the secret. However, simply having access to the encrypted shares does not reveal the secret. As discussed, the secret can only be determined based on at least N secret shares in an unencrypted state.

Furthermore, even for recovering a single share of the secret, the corresponding encrypted share and decryption key are required. Thus, access to the respective second data storage unit and respective third data storage unit is required to obtain the corresponding encrypted share and decryption key. Typically, a user or computing unit may have access to only one third data storage unit and the corresponding second data storage unit and as such can only recover its corresponding share of the secret but not the secret itself.

In other words, even if a second data storage unit (i.e., a data share storage unit) and its respective third data storage unit (i.e., a decryption key storage unit) are accessed by an unauthorized party, the secret is still safe because only one share of the secret can be recovered. In fact, even when N−1 second data storage unit and their respective third data storage units are accessed by an unauthorized party, the secret can again not be determined. On the other hand, if at most M-N encrypted shares or decryption keys are lost the secret can still be recovered. Thus, the secret is not only safe (i.e. N second data storage unit and their respective third data storage units need to be accessed to determine the secret), but the likelihood of losing the secret is also minimized (as M−N+1 encrypted shares or decryption keys need to be lost to not be able to determine the secret).

As discussed in conjunction with FIG. 1, in steps S4 to S6 of the method, the secret can be recovered. More particularly, in step S4 at least N encrypted shares of the secret can be provided to the recovery device. In the particular embodiment of the method illustrated in FIG. 2a, step S4 can comprise step S41 wherein the at least N encrypted shares can be provided to the recovery device from their respective second data storage units. That is, each of the N encrypted shares can be transmitted from the respective second data storage unit, wherein the encrypted share is stored, to the recovery device.

In addition, the method may comprise step S7 wherein the respective decryption keys for decrypting the at least N encrypted shares, are provided to the recovery device. In some embodiments, the at least N decryption keys can be stored in separate third data storage units, respectively, prior to providing them to the recovery device. In such embodiments, in step S7, each of the at least N decryption keys is provided to the recovery device from the respective third data storage unit wherein they are stored. Preferably the communication of the decryption keys from their respective third data storage unit to the recovery device can be performed through a secure channel (see FIG. 2d). For example, the decryption key can be communicated in an encrypted state, such that only the recovery device may decrypt it. For example, the decryption key can be encrypted with a public key of the recovery device.

Thus, the recovery device can obtain at least N encrypted shares of the secret and the corresponding decryption keys for decrypting the at least N encrypted shares. Next, in step S5 the recovery device can decrypt the encrypted shares using the corresponding decryption keys to obtain at least N shares of the secret in an unencrypted state. Next, in step S6 the secret can be recovered based on the at least N shares in the unencrypted state.

The above steps of the method illustrated in FIG. 2a are further illustrated with the time diagrams depicted in FIGS. 2b and 2c. More particularly, FIG. 2b provides a time diagram illustrating a method for storing the secret and FIG. 2c provides a time diagram illustrating a method for determining the secret.

FIG. 2b depicts a backup device 10 (which may also be referred to as a first data processing unit), M first data storage units 30A (which may also be referred to as encryption key storage unit) and M second data storage units 30B (which may also be referred to as data share storage unit). The M first data storage units 30A are shown in a compact way, i.e., instead of showing each of the M first data storage units 30A with a respective timeline, they are shown for the sake of brevity, with a single timeline. The same is true for the second data storage units 30B. However, it will be understood that the M first data storage units 30A are separate from each other. Similarly, the M second data storage units 30B are also separate from each other. Furthermore, each of the first data storage units 30A and each of the second data storage using 30B is external to the backup device 10.

Each of the M first data storage units 30A may store a respective encryption key 42. For each of the encryption keys 42, a corresponding decryption key 45 can be stored in one of M third data storage units 30C (which may also be referred to as decryption key storage unit)—see FIG. 2c. The encryption key 42 stored in a first data storage unit 30A and the corresponding decryption key 45 stored in a corresponding third data storage unit 30C can form a key pair. More particularly, the encryption key 42 can be a public key and the decryption key 45 can be a private key 45. Typically, the encryption key 42 can be made public, while the decryption key 45 is securely stored (e.g. each of the M third data storage units 30C is a secure memory component). Furthermore, the encryption key 42 can be used to encrypt data and the decryption key 45 can be used to decrypt data encrypted by the corresponding encryption key 42. Thus, when data is encrypted with the encryption key 42, it can only be decrypted using the corresponding decryption key 45.

A secret 50 (which can also be referred to as a data element) can be provided to the backup device 10. In some embodiments, the backup device 10 can generate the secret 50. In some embodiments, the secret 50 can be a master private key that can be randomly generated by the backup device 10 (see FIGS. 5a and 5b).

In a step S1, as discussed, M shares 52 of the secret 50 can be generated. In the embodiment illustrated in FIG. 2b, the M shares 52 of the secret can be generated by the backup device 10, e.g. executing a data splitting routine. However, it will be understood that alternatively, instead of providing the secret 50, M shares 52 of the secret 50 can be provided to the backup device 10.

In a step S21, each of the M encryption keys 42 can be provided from the respective first data storage unit 30A to the backup device 10. Thus, the backup device 10 can receive M encryption keys 42, one from each of the M first data storage units 30A, as indicated by the multiple arrows S21. That is, a respective communication channel can be established between each of the first data storage units 30A and the backup device 10 for sending the encryption keys 42. In some embodiments, M computing units (not shown), each accessing a respective first data storage unit 30A, may receive from the first data storage unit 30A it accesses the encryption key 42 stored therein and may send the encryption key 42 to the backup device 10. That is, the respective computing units may execute instructions for sending the encryption keys 42 to the backup device 10.

Next, the backup device 10 in a step S2 can encrypt the shares 52 to obtain encrypted shares 55. That is, the backup device 10 can comprise M encrypted shares 52 and M encryption keys 42, as depicted in FIG. 2b. The backup device 10 can map or assign each encryption key 42 with a share 52. Since there can be M encryption keys 42 and M shares 52, a one-to-one mapping between the shares 52 and the encryption keys 42 can be performed. Each of the M shares 52 can be encrypted with a corresponding encryption key 42. Thus, M encrypted shares 55 can be obtained.

In step S31 the backup device 10 can provide (i.e., send) each encrypted share 55 to a respective second data storage unit 30B, as indicated by the multiple arrows S31. That is, a respective communication channel can be established between the backup device 10 and each second data storage unit 30B for sending to each second data storage unit 30B a respective encrypted share 55. Thus, the M encrypted shares 55 can be stored in M separate data storage units 30B, respectively.

FIG. 2c illustrates with a time diagram the steps of determining the secret 50 using at least N shares of the secret 50.

More particularly, FIG. 2c depicts a recovery device 20 (which may also be referred to as a recovery data processing unit), N of M third data storage units 30C and N of M second data storage units 30B. It will be understood that for the recovery of the secret 50 there can be more than N third/second data storage units 30C, 30B present. As defined during the generation of the M shares of the secret in step S1, at least N shares of the secret are required to determine the secret.

Each of the at least N second data storage units 30B comprises a respective encrypted share 55. Each of the N third data storage units 30C comprises a respective decryption key 45. It will be understood that each of the N decryption keys 45 stored in a respective third data storage unit 30C can be used to decrypt an encrypted share stored in a respective second data storage unit 30B. Thus, each of the N third data storage units 30C can correspond to a respective second data storage unit 30B in such a way that the decryption key 45 stored in the third data storage unit 30A can be used to decrypt the encrypted share 55 stored in the corresponding second data storage unit 30B. Similarly, each of the N second data storage units 30B can correspond to a respective third data storage unit 30C in such a way that the encrypted share 55 stored in the second data storage unit 30B can be decrypted with the decryption key 45 stored in the third data storage unit 30B.

In steps S41 and S7, the recovery device is provided with at least N encrypted shares 55 and at least N corresponding decryption keys 45. Although in the time diagram of FIG. 2c step S7 is depicted as following step S41, the two steps are independent from each other and can be performed in any sequence. In some embodiments, steps S7 and S41 are interleaved. That is, the encrypted shares 55 and the decryption keys 45 are provided in pairs to the recovery device, with each pair comprising one encrypted share 55 and the corresponding decryption key 45.

As depicted, in step S41 the at least N encrypted shares 55 are provided to the recovery device 20 from at least N separate second data storage units 30B. In step S7 the at least N corresponding decryption keys 45 are provided to the recovery device 20 from at least N separate third data storage units 30C. In some embodiments, corresponding third and second data storage units 30C and 30B can be provided internal to the same device. Furthermore, each pair of corresponding third and second data storage units 30C and 30B can be accessed by a respective computing unit. Each computing unit may be able to access its respective third data storage unit 30C and its respective second data storage unit 30B. Thus, each computing unit can obtain a respective decryption key 45 and a respective encrypted share 55. Each computing unit can then send the obtained decryption key 45 to the recovery device in step S7 and can send the obtained encrypted share 55 to the recovery device in step S41.

That is, in some embodiments of the method of the present invention, the secret can be stored by distributing encrypted shares of the secret among a plurality of second data storage units 30B. The secret can then be restored by a recovery device 20 by providing to the recovery device 20 from a subset of the second data storage units 30B the respective encrypted shares stored therein. In addition, to allow the recovery device 20 to decrypt the encrypted shares 55, corresponding decryption keys 45 (stored in respective third data storage units 30C) can be provided to the recovery device 20.

Figure 2D:
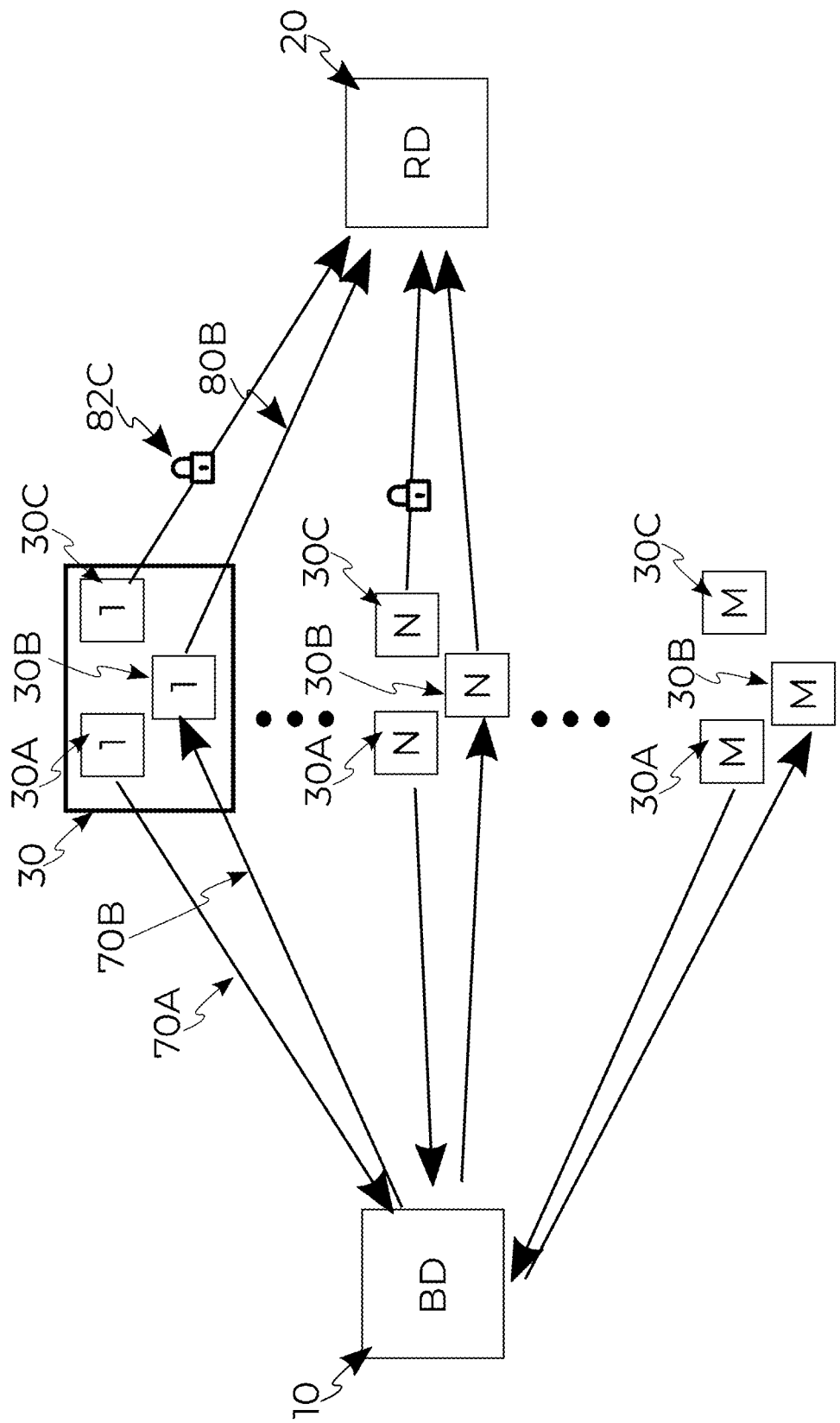
FIG. 2*d* schematically shows a system configured to perform the method for storing a data element according to the first embodiment and the corresponding method for determining the data element according to the first embodiment.

While with respect to FIGS. 2a to 2c, a method of storing and determining a secret is discussed, FIG. 2d illustrates a system configured to carry out the steps of the method.

As illustrated, the system comprises a backup device 10 and a recovery device 20. As discussed, the backup device 10 can be configured to facilitate the backup process of the secret. The recovery device 20 can be configured to facilitate determining the secret.

Furthermore, the system may comprise M first data storage units 30A configured to store a respective encryption key 42. The M first data storage units 30A are separate from each other and external to the backup device 10 and recovery device 20.

In addition, the system can comprise M second data storage units 30B configured to store a respective encrypted share 55 of the secret. The M second data storage units 30B are separate from each other and external to the backup device 10 and recovery device 20.

Additionally still, the system may comprise M third data storage units 30C configured to store a respective decryption key 45. The M third data storage units 30C are separate from each other and external to the backup device 10 and recovery device 20. Furthermore, the M third data storage units 30C are preferably secure memory devices.

Each of the M first data storage units 30A can correspond to a respective second data storage units 30B and to a respective third data storage unit 30C, as illustrated in FIG. 2d, wherein corresponding first and second and third data storage units 30A, 30B, 30C are depicted in groups. Corresponding first and second and third data storage units 30A, 30B, 30C store corresponding a encryption key, a decryption key and an encrypted share, respectively.

In some embodiments, the combination of the first, second and third data storage units 30A, 30B, 30C can be embedded in the same data storage unit 30. Thus, one data storage unit 30 may comprise one first data storage unit 30A and/or one corresponding second data storage unit 30B and/or one corresponding third data storage unit 30C. Thus, each data storage unit 30 may store one encryption key 42, the corresponding encrypted share 55, the corresponding decryption key 45. Moreover, the data storage device 30 may be part of a user device 100 (see, e.g., FIGS. 5, 6, 7).

A respective communication channel 70A can be established between each of the M first data storage devices 30A and the backup device 10. The communication channel 70A can be used to communicate data from the first data storage units 30A to the backup device 10. Thus, in step S21, each of the M encryption keys 42 can be transmitted through the respective communication channel 70A from the respective first data storage unit 30 to the backup device 10.

Similarly, a respective communication channel 70B can be established between each of the M second data storage units 30B and the backup device 10. The communication channels 70B can be used to communicate data from the backup device 10 to each of the second data storage units 30B, respectively. Thus, in step S31 each of the M encrypted shares 55 can be transmitted through the respective communication channel 70B from the backup device 10 to each of the second data storage units 30B, respectively.

On the other hand, for facilitating the recovery of the secret, a respective secure communication channel 82C can be established between each of the at least N third data storage units 30C and the recovery device 20. The secure communication channels 82C can be used to securely communicate data from each of the third data storage units 30C to the recovery device 20, respectively. Thus, in step S7 each of the at least N decryption keys 45 can be transmitted through the respective secure communication channels 82C from each of the at least N third data storage units 30C to the recovery device 20, respectively.

Similarly, a respective communication channel 80B can be established between each of the at least N second data storage units 30B and the recovery device 20. The communication channels 80B can be used to communicate data from each of the second data storage units 30B to the recovery device 20, respectively. Thus, in step S41, each of the at least N encrypted shares 55 can be transmitted through the communication channels 70B from each of the at least N second data storage units 30B to the recovery device 20, respectively.

Steps S21, S31 and S41 do not comprise transmitting sensitive data (i.e. data that if intercepted by a third party may allow a third party to feasibly compute the secret or a share of the secret) between the first and second data storage units 30A, 30B and the backup device 10 or recovery device 20. As such, the communication channels 70A, 70B and 80B may also be insecure communication channels (i.e. communication channels wherein communication can be carried out without any measure against overhearing or tampering).

In step S7, sensitive data (i.e. the decryption key 45) is communicated from the third data storage units 30C to the recovery device 20. Hence, it may be advantageous to implement secure communication channels between the third data storage units 30C and the recovery device 20. Hence, the secure communication channels 82C can be implemented between the at least N third data storage units 30C and the recovery device 20.

A secure channel is a communication channel that is resistant to overhearing and tampering. Thus, the secure communication channels 82C are configured to prevent or reduce the risk of an unauthorized party accessing and/or gaining any intelligibility of the data being transmitted through the secure communication channel 82C. In some embodiments, the secure communication channel 82C can be physically protected. For example, the secure communication channel 82C may comprise a short distance cable connection (e.g. USB connection), a smart card reader and the like. With such technologies, the risk of the secure communication channels 82C being tampered can minimized as the channel (e.g. the cable connection) can be easily visually examined against interferers. However, such channels may require that the recovery device 20 is brought into physical proximity with each of the at least N third data storage units 30C during step S7.

Alternatively or additionally, data communication security protocols may be implemented to ensure that the data is communicated securely over the secure communication channels 82C. Data communication security protocols tend to increase the security not by prohibiting an unauthorized user from obtaining the data, but instead by encrypting the data such that even if intercepted they are unintelligible. Thus, the secure communication channels 82C can be configured such that the data is transmitted therein in an encrypted manner. Transport Layer Security (TLS) and Secure Sockets Layer (SSL) are some examples of data communication security protocols that can be implemented.

In some embodiments, the above discussed communication channels may allow for remote communication (e.g. through the Internet, a wireless connection, local area network, wide area network, cellular network and the like). Alternatively, in some embodiments, the communication channels discussed above may require physical proximity between the sender and receiver. For example, the communication channels 70A, 70B, 80B, 82C may be established based on technologies, such as near field communication (NFC), Bluetooth, WIFI, IEEE 802.15.4, cable connection standards (e.g. USB, smart card) and the like. For example, the backup device 10 and the recovery device 20 may comprise at least one smart card reader (not shown) and each of the first data storage devices 30A, second data storage device 30B and third data storage units 30C can be provided in a respective smart card.

In further embodiments, the secret can be stored by storing the encrypted shares of the secret in a database, such as, an external and/or public database. That is, instead of or in addition to storing the secret by distributing encrypted shares of the secret among a plurality of separate second data storage units, as discussed above, in some embodiments, the secret can be stored by storing encrypted shares of the secret in an external database. FIGS. 3a to 3d illustrate such an embodiment.

Similarly, to the embodiments discussed above, in steps S1 to S3 the backup device generates shares of a secret, encrypts the shares and outputs encrypted shares of the secret. The encrypted shares can be generated by encrypting each share of the secret with a unique encryption key. Preferably each encryption key can correspond to a decryption key, respectively.

In a step S32, the method can comprise providing the M encrypted shares to a database. That is, the backup device can output the encrypted shares and the encrypted shares can be stored in a database. The database can be external to the backup device. In some embodiments, the database can be a public database. It is noted that the database need not be a secure database as the shares of the secret are stored therein in the encrypted state.

That is, step S3, i.e. the backup device outputting the encrypted shares of the secret may be followed by step S31 (see, e.g., FIGS. 2a to 2c) and/or step S32. In step S31 the method comprises storing each of the M encrypted shares in a separate second data storage unit, respectively. In step S32 the M encrypted shares of the secret can be stored in a database. It will be noted that either step S31 or step S32 or both steps S31 and S32 can be implemented.

For determining the secret, as discussed, a recovery device can be provided. Further, in a step S7, at least N decryption keys can be provided to the recovery device. More particularly, at least N decryption keys stored in respective separate third data storage units (also referred to as decryption key data storage units) can be provided to the recovery device. The decryption keys provided in step S7 to the recovery device can correspond to respective encrypted shares of the secret, such that, each encrypted share can be decrypted with a respective decryption key.

In a step S42 of step S4 (i.e. providing N encrypted shares of the secret to the recovery device), the method comprises the recovery device receiving at least N encrypted shares from the database. As discussed, in step S32, M encrypted shares can be stored in a database. In step S42 at least N of the M encrypted shares can be transferred from the database to the recovery device.

Figure 3A:
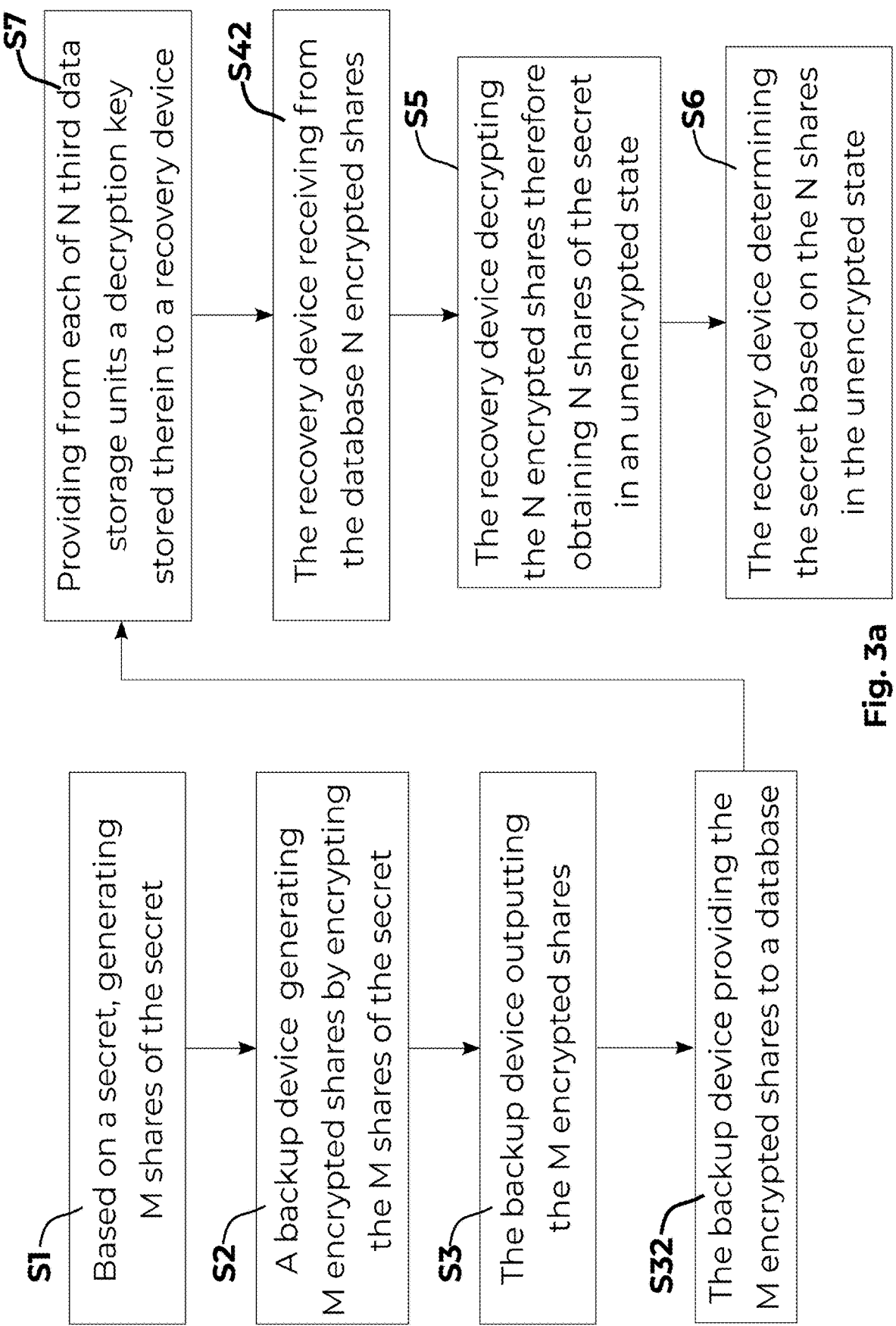
FIG. 3a depicts a second embodiment of the method for storing a data element and a corresponding second embodiment of the method for determining the data element.
Figure 3C:
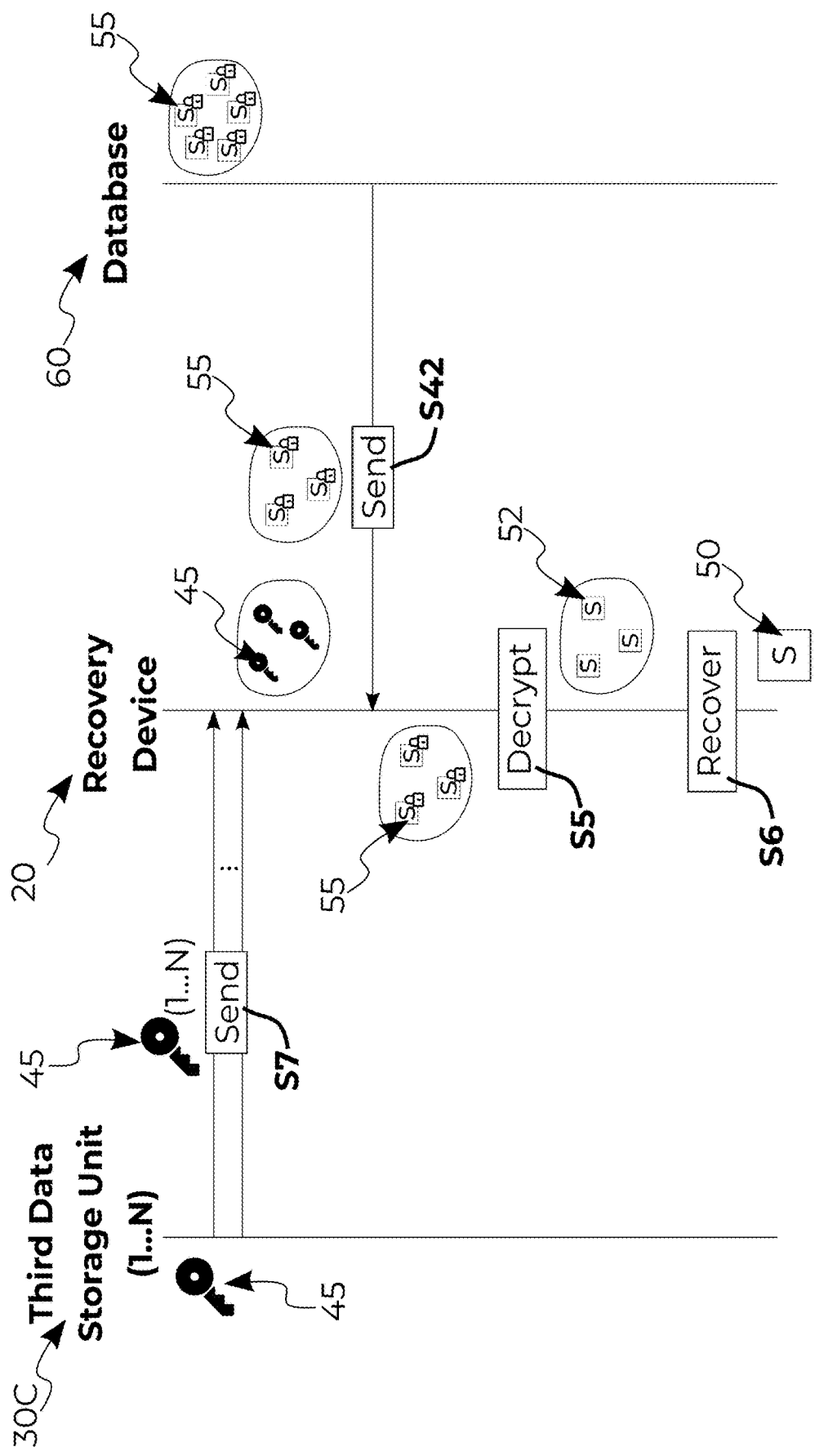
FIG. 3c illustrates with a time diagram the method for determining a data element according to the second embodiment.

Thus, instead of providing the at least N encrypted shares from at least N respective second data storage units to the recovery device for determining the secret as realized in the embodiment illustrated in FIGS. 2a to 2c, in the embodiment illustrated in FIGS. 3a to 3c, at least N encrypted shares can be loaded to the recovery device from a database.

The database can be external to the backup device and recovery device.

Similar to the preceding embodiments, in step S5, the method may comprise decrypting the N encrypted shares, and thus obtaining N shares of the secret in an unencrypted state. That is, using the at least N corresponding decryption keys received in step S7, at least N encrypted shares of the secret can be decrypted in step S5. To facilitate step S5, in step S42 the at least N encrypted shares (out of M encrypted shares) can be loaded from the database such that each of the loaded encrypted shares corresponds to a respective decryption key received in step S7. Thus, the recovery device can comprise for each encrypted share the corresponding decryption key.

Alternatively, in step S42 the recovery device may load all the M encrypted shares of the secret from the database, and decrypt in step S5 at least N encrypted shares through a trial and error process. That is, the recovery device may try to decrypt each encrypted share by trying to decrypt it with each of the at least N decryption keys provided in step S7. In other words, a brute force search can be used to find the corresponding encrypted share of each of the decryption keys received in step S7.

In some embodiments, in step S42, the recovery device may load the encrypted shares from the database one by one and try to decrypt it with the provided decryption keys. This may require that in a best-case scenario N encrypted shares are loaded from the database and in a worst-case scenario M encrypted shares are loaded from the database.

Using the at least N shares of the secret (unencrypted), the recovery device can recover the secret in step S6.

The method according to the embodiment of FIG. 3a is further illustrated with the time diagrams provided in FIGS. 3b and 3c.

FIG. 3b depicts M first data storage units 30A (also referred to as encryption key data storage units), a backup device 10 and a database 60. The database 60 is external to the backup device 10 and to the first data storage units 30A. That is, the database 60 may be a standalone unit. It can further be a remote database 60, i.e., it can be remotely accessed through a local area network or the Internet.

Compared to the embodiment illustrated in FIG. 2b, instead of providing M separate second data storage units 30B, in the embodiment of FIG. 3b, a database 60 is provided instead. Again, it will be noted that in addition to the database 60, the M separate second data storage units 30B can also be provided.

Each of the M first data storage units 30A may store a respective encryption key 42. For each of the encryption keys 42, a corresponding decryption key 45 can be stored in one of M third data storage units 30C (also referred to as decryption key storage units)—see FIG. 2c. The encryption key 42 stored in a first data storage unit 30A and the corresponding decryption key 45 stored in a corresponding third data storage unit 30C can form a key pair. The encryption key 42 can be a public key and the decryption key 45 can be a private key 45. Typically, the encryption key 42 can be made public, while the decryption key 45 is securely stored. Furthermore, the encryption key 42 can be used to encrypt data and the decryption key 45 can be used to decrypt data encrypted by the corresponding encryption key 42. Thus, when data is encrypted with the encryption key 42, it can only be decrypted using the corresponding decryption key 45.

A secret 50 can be provided to the backup device 10. In some embodiments, the backup device 10 can generate the secret 50. In some embodiments, the secret 50 can be a master private key that can be randomly generated by the backup device 10 (see FIGS. 5a and 5b).

In a step S1, as discussed, M shares 52 of the secret 50 can be generated. In the embodiment illustrated in FIG. 2b, the M shares 52 of the secret can be generated by the backup device 10, e.g. executing a data splitting routine. However, it will be understood that alternatively, instead of providing the secret 50, M shares 52 of the secret 50 can be provided to the backup device 10.

In a step S21, each of the M encryption keys 42 can be provided from the respective first data storage unit 30A to the backup device 10. Thus, the backup device 10 can receive M encryption keys 42, one from each of the M first data storage units 30A, as indicated by the multiple arrows S21. That is, a respective communication channel can be established between each of the first data storage units 30A and the backup device 10 for sending the encryption keys 42A. In some embodiments, M computing units (not shown), each accessing a respective first data storage unit 30A, may receive from the first data storage unit 30A it accesses the encryption key 42 stored therein and may send the encryption key 42 to the backup device 10. That is, the respective computing units may execute instructions for sending the encryption keys to the backup device 10.

Next, the backup device 10 in a step S2 can encrypt the shares 52 to obtain encrypted shares 55. That is, the backup device 10 can then comprise M encrypted shares 52 and M encryption keys 42, as depicted in FIG. 2b. The backup device 10 can map or assign each encryption key 42 with a share 52. Since there can be M encryption keys 42 and M shares 52, a one-to-one mapping between the shares 52 and the encryption keys 42 can be performed. Each of the M shares 52 can be encrypted with a corresponding encryption key 42. Thus, M encrypted shares 55 can be obtained.

In step S32, the backup device sends the encrypted shares 55 to the database 60. Thus, the encrypted shares 55 can be stored in the database 60. This is advantageous because even if the backup device 50 is lost or damaged, the secret 55 can still be restored.

FIG. 3c illustrates with a time diagram the process of determining the secret 50 according to one embodiment. FIG. 3c illustrated at least N of M third data storage units 30C (which may also be referred to as decryption data storage units), each storing a respective decryption key 45. In step S7, each of the at least N third data storage units 30C sends its respective decryption key 45 to the recovery device 20. Thus, the recovery device 20 can receive at least N decryption keys 45. It will be noted that each of the decrypted keys 45 corresponds to a respective encrypted share 55 of the secret 50. That is, each of the at least N decryption keys 45 received by the recovery device in step S7 can be used to decrypt a corresponding encrypted share 55 of the secret 50. This is due to the fact that each decryption key 45 corresponds to a respective encryption key used in step S2 to generate the encrypted shares 55 of the secret 50.

The recovery device 20 can be provided with encrypted shares 55 from the database 60 in step S42. Next, in step S5 the recovery device 20 can decrypt each of the at least N encrypted shares 55 using the at least N decryption keys 45 to obtain at least N shares 52 of the secret 50 in unencrypted states. In step S6, the secret 50 can be restored using the at least N shares 52.

Alternatively, in step S42 all the M encrypted shares 55 can be loaded from the database 60 to the recovery device 20. In such embodiments, as the recovery device 20 does not "know" which decryption key 45 corresponds to which encrypted share 55, the recovery device 20 may try to decrypt each encrypted share 55 with the available decryption keys 45. That is, the recovery device may execute step S5 a plurality of times for each encrypted share 55, until at least N encrypted shares of the secret 52 are decrypted.

Alternatively still, the recovery device may load the encrypted shares 55 in step S42 one by one and try to decrypt each encrypted share 55 before loading the next one from the database 60. The recovery device 20 may stop loading encrypted shares 55 when at least N encrypted shares 52 are obtained.

Figure 3D:
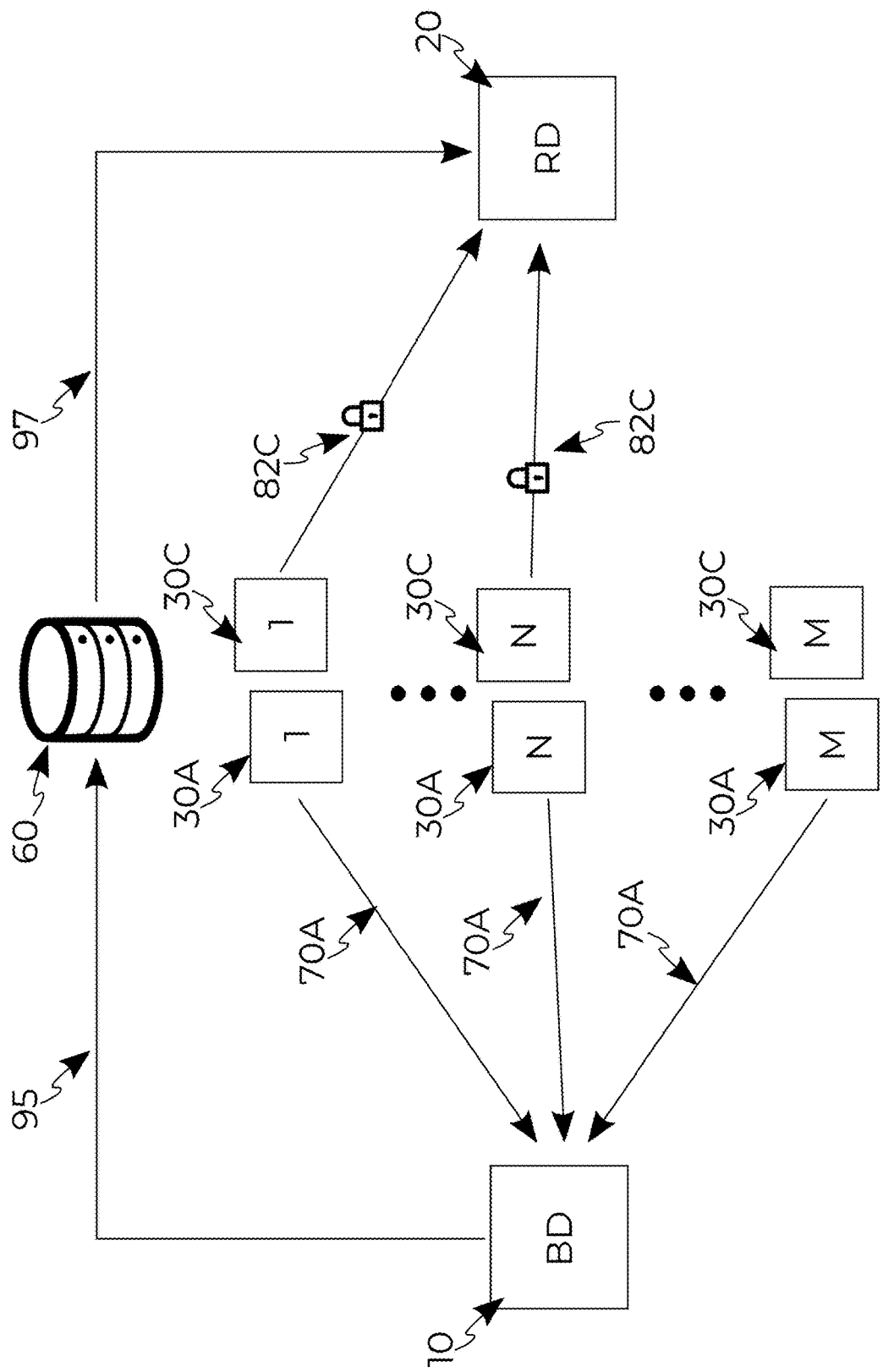
FIG. 3d schematically shows a system configured to perform the method for storing a data element according to the second embodiment and the corresponding method for determining the data element according to the second embodiment.

While with respect to FIGS. 3a to 3c, a method of storing and determining a secret is discussed, FIG. 3d illustrates a system configured to carry out the steps of the method.

Similar to the system discussed with reference to FIG. 2d, the system illustrated in FIG. 3d comprises a backup device 10, a recovery device 20, M first data storage units 30A and M third data storage units 30C. In addition, the system comprises a database 60 provided external to the backup device 10, the recovery device 20 and agents 30, which replaces the second data storage units 30B provided in the embodiment of FIG. 2d. However, it will be noted that in some embodiments both the database 60 and the M separate second data storage units 30B may be provided.

Similar to the embodiment of FIG. 2d, a respective communication channel 70A can be provided between the backup device 10 and each of the first data storage devices 30A. The communication channel 70A facilitates transmitting the encryption keys 42 from the M first data storage devices 30A to the backup device 10.

Again, similarly to the embodiment of FIG. 2d, a respective secure communication channel 82C between each of the at least N third data storage units 30C and the recovery device 20 can be provided. The secure communication channel 82C facilitates transmitting in a secure manner the decryption keys 45 from each of the third data storage units 30C to the recovery device 20.

In addition, in the system illustrated in FIG. 3d, a communication channel 95 can be provided between the backup device 10 and the database 60. Additionally still, a communication channel 97 can be provided between the database 60 and the recovery device 20. The communication channels 95 and 97 can be insecure channels (similar to communication channel 70A).

In the method embodiments illustrated with reference to FIGS. 2a to 3c, the method comprises the step of communicating the decryption key used to decrypt the encrypted shares of the secret from respective third data storage units to the recovery device (i.e. step S7). However, this may require a secure channel between each of the at least N third data storage units and the recovery device such that the decryption key can be securely communicated between the third data storage units and the recovery device. Otherwise, if a third party can intercept the communication of a decryption key in step S7, then it may be able to decrypt the corresponding encrypted shares and thus may recover the secret.

In some embodiments of the method of the present invention, the secret can be recovered without the need of communicating decryption keys to the recovery device (i.e. without step S7). One such embodiment is depicted in FIG. 4a.

Figure 4A:
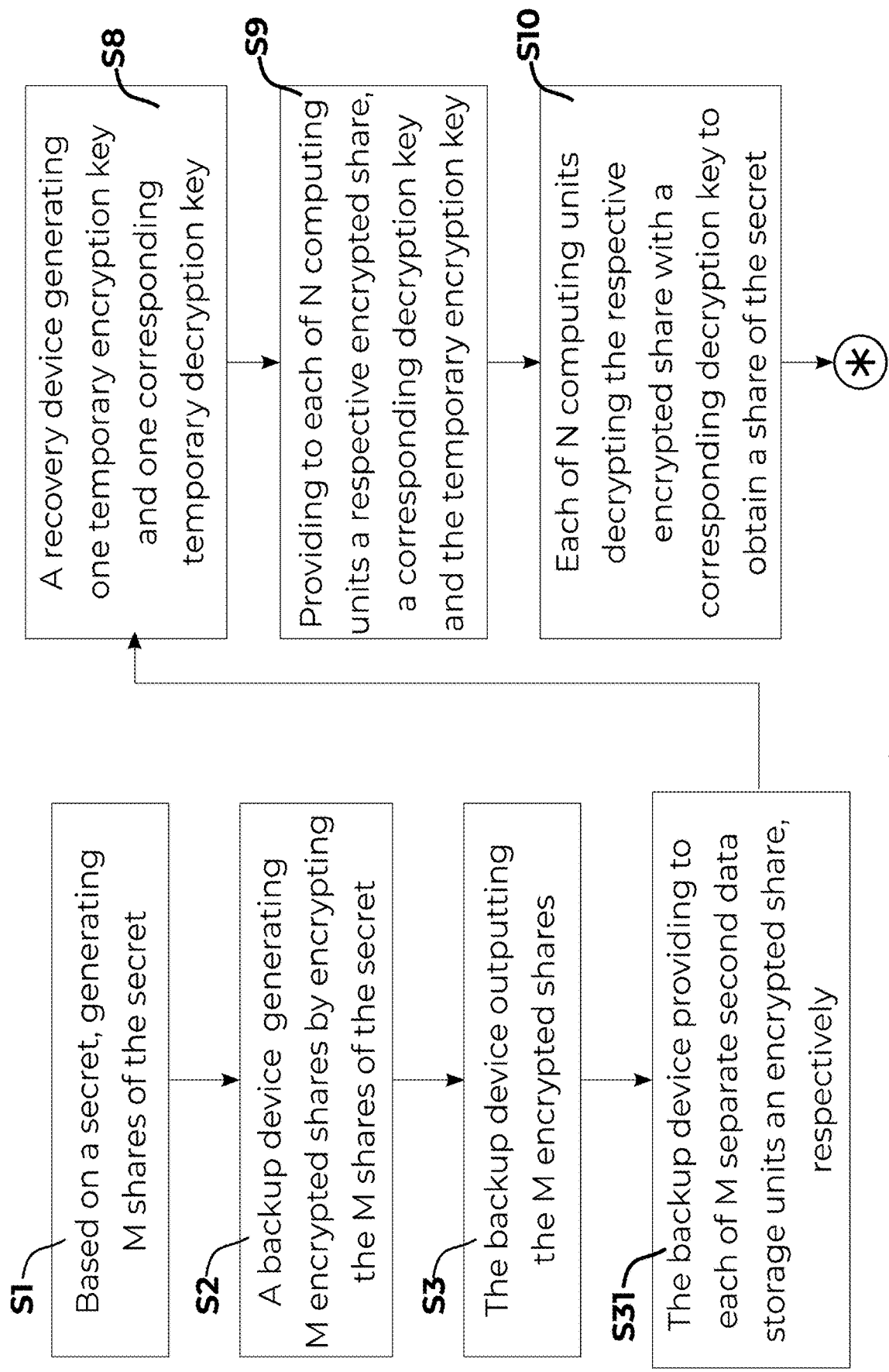
FIG. 4a depicts a third embodiment of the method for storing a data element and a corresponding third embodiment of the method for determining the data element.
Figure 4A:
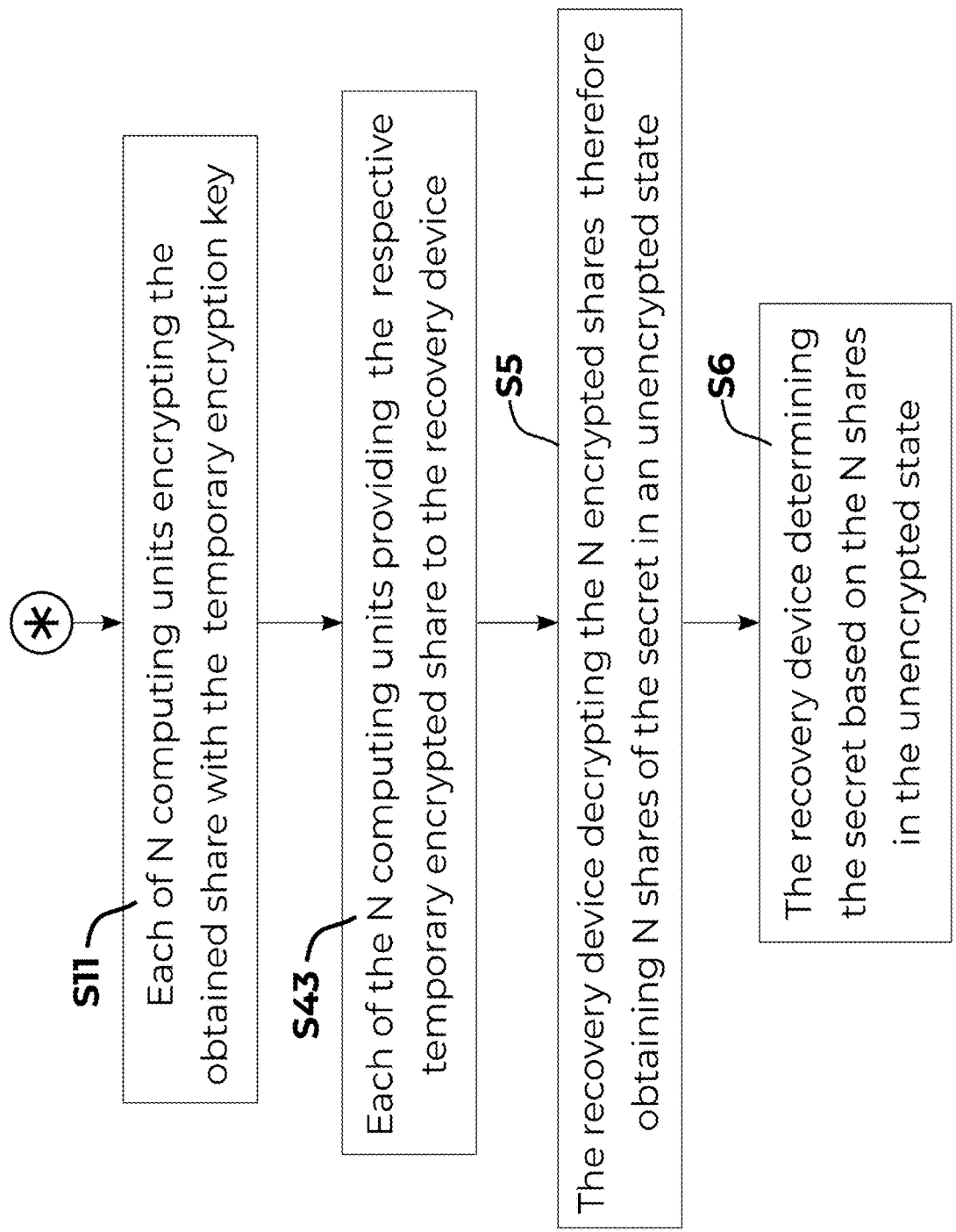

In the embodiment of FIG. 4a, the secret can be stored by performing steps S1 to S31 as discussed in FIG. 2a. For the sake of brevity, a detailed discussion of said steps is omitted. As depicted, the M shares of the secret are obtained in step S1, which are encrypted in step S2 and the encrypted shares distributed to M respective second data storage units in steps S3 and S31. Thus, in each second data storage unit a respective encrypted share can be stored.

As discussed, the embodiment of the method depicted in FIG. 4a does not require providing decryption keys to the recovery device. Thus, for determining the secret, the method may comprise step S8, wherein the recovery device (which may also be referred to as a recovery data processing unit) can generate one temporary encryption key and one corresponding temporary decryption key. Alternatively, in step S8 the recovery device can generate at least N pairs of temporary cryptographic keys, each pair comprising an encryption key and a corresponding decryption key. The temporary encryption key(s) can be temporary public key(s) and the temporary decryption key(s) can be temporary private key(s). Typically, the temporary encryption key(s) can be made public, while the temporary decryption key(s) can be securely stored. Furthermore, the temporary encryption key(s) can be used to encrypt data and the temporary decryption key(s) can be used to decrypt data encrypted by the corresponding temporary encryption key(s). Thus, when data is encrypted with a temporary encryption key, it can only be decrypted using the corresponding temporary decryption key.

In step S9, the method comprises providing to each of N computing units a respective encrypted share, a corresponding decryption key and the temporary encryption key.

That is, the method further comprises providing M computing units each configured to access a respective third data storage unit (also referred to as decryption key storage unit) wherein it can receive the decryption key stored therein. In addition, the computing unit can access a respective second data storage unit (also referred to as data share storage unit) wherein it can receive the encrypted share stored therein. Alternatively, the computing unit may receive from the database the encrypted share corresponding to the decryption key that the computing unit can receive from the third data storage unit it is configured to access. In step S10 the computing unit may decrypt the respective encrypted share with the respective decryption key to obtain a share of the secret in an unencrypted sate.

Then, in a step S11 each of the at least N computing units can encrypt the share of the secret in the unencrypted state with the temporary encryption key that the computing unit received in step S9.

In step S43, the method comprises providing the temporary encrypted share to the recovery device. That is, each of the at least N computing units provides temporary encrypted shares to the recovery device.

It will be noted that the corresponding temporary decryption key(s) for decrypting the temporary encrypted shares is/are stored in the recovery device (see step S8). In step S5, using the temporary decryption key(s) that the recovery device owns, the recovery device can decrypt the at least N temporary encrypted shares to obtain at least N corresponding shares of the secret in unencrypted states. In step S6, the recovery device can recover the secret.

Thus, in this embodiment there is no need to communicate decryption (i.e. private) keys to the recovery device.

The steps of the method discussed with reference to FIG. 4a are further illustrated in FIGS. 4b and 4c.

Figure 4B:
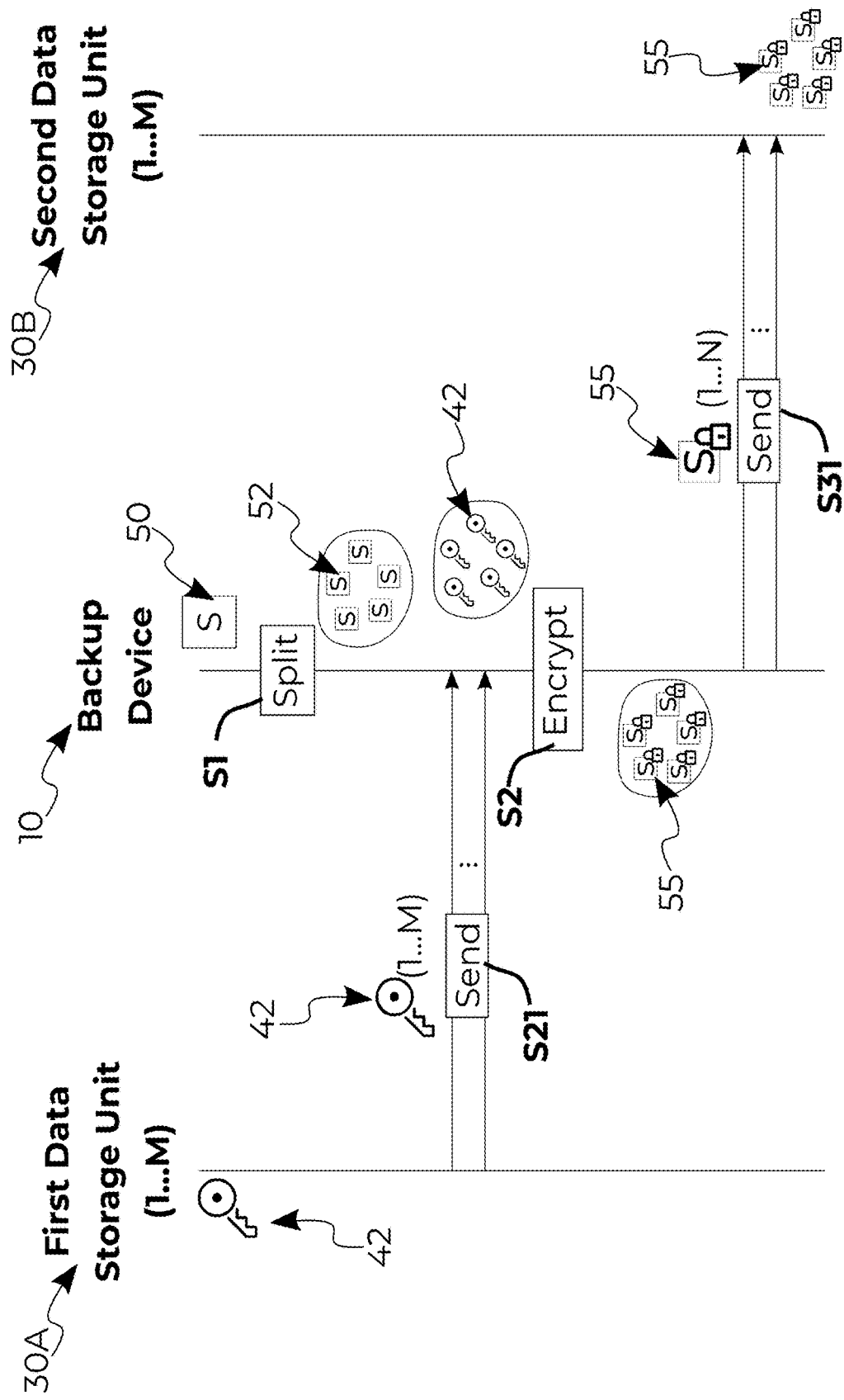
FIG. 4b illustrates with a time diagram the method for storing a data element according to the third embodiment.

The illustration of FIG. 4b, is similar to the one depicted in FIG. 2b. It will be noted, that alternatively or additionally, the encrypted shares 55 can be transmitted from the backup device 10 to the database 60 (not shown in this figure).

Figure 4C:
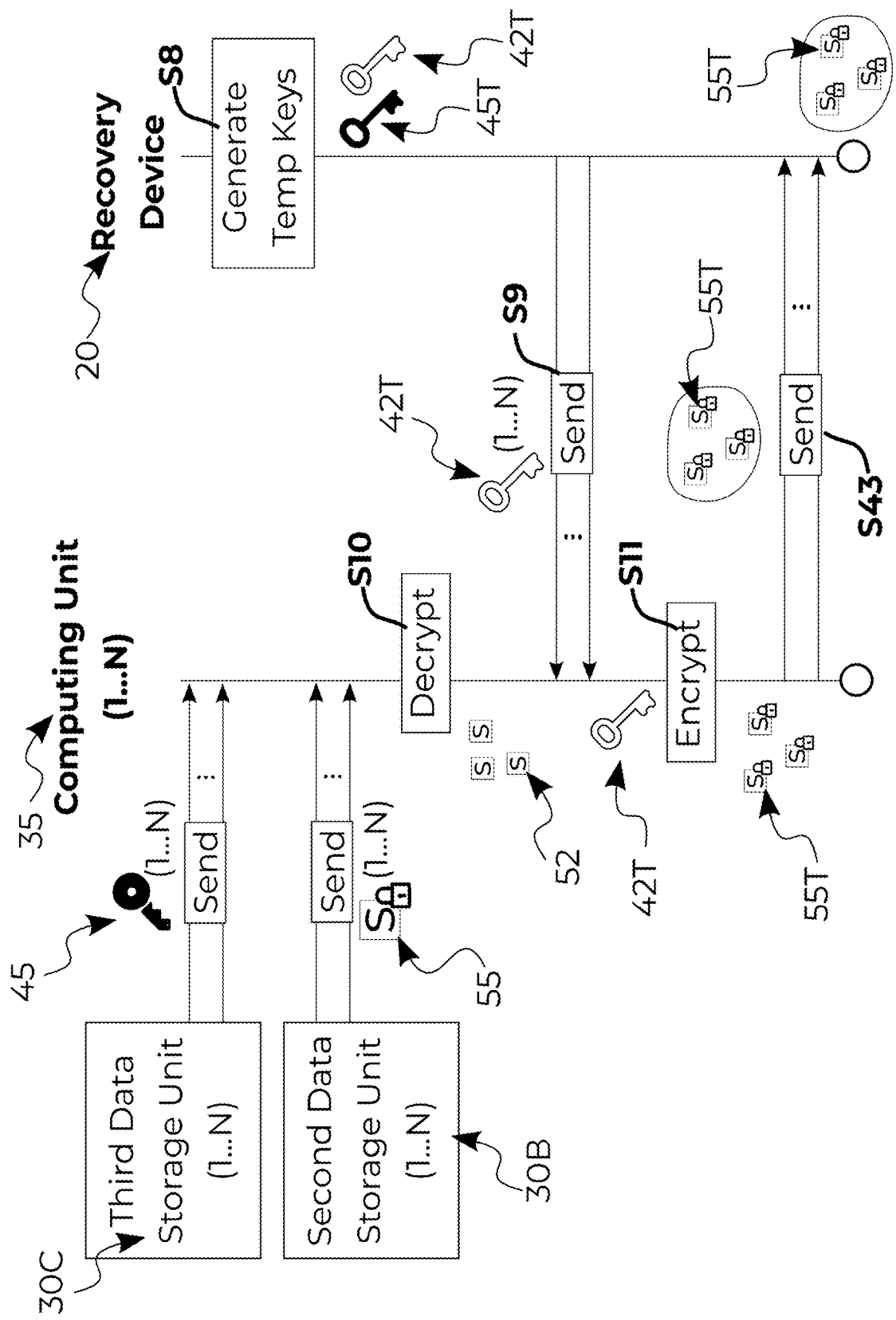
FIG. 4c illustrates with a time diagram the method for determining a data element according to the third embodiment.
Figure 4C:
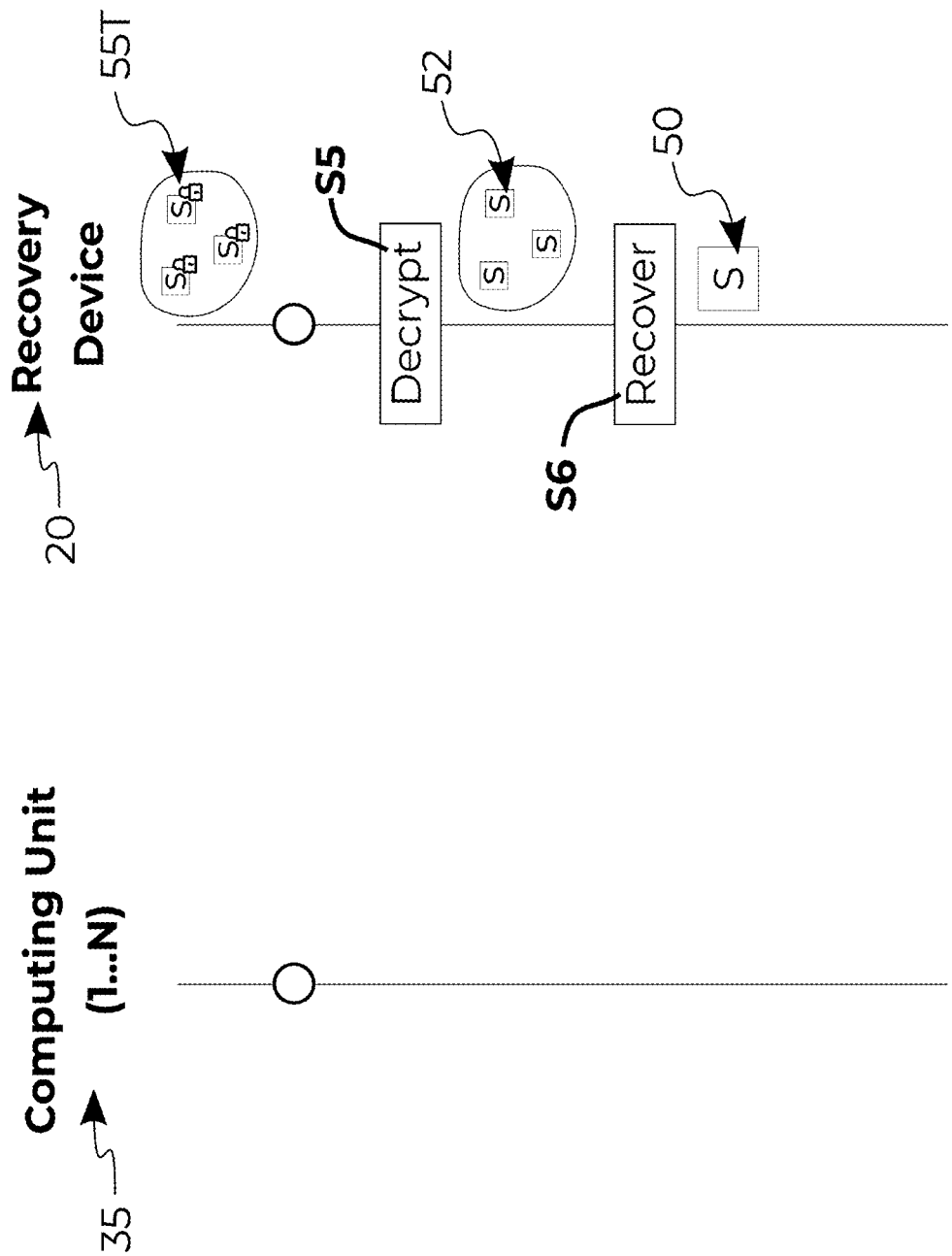

In FIG. 4c, the process of determining the secret 50 without the need of communicating the decryption keys to the recovery device is illustrated.

As depicted, at least N computing units 35 can be provided. Each of the N computing units 35 can access a respective third data storage unit 30C and a respective second data storage unit 30B. From the respective third data storage unit 30C, the computing unit 35 can receive a decryption key 45. The computing unit 35 and the respective third data storage unit 30C can be provided internally to a single device. From the respective second data storage unit 30B, the computing unit 35 can receive an encrypted share 55 corresponding to the decryption key 45 that the computing unit 35 can receive from the respective third data storage unit 30C. The computing unit 35 and the respective second data storage unit 30B can be provided internally to a single device. Alternatively, the computing unit 35 may receive the corresponding encrypted share from the database 60 (not shown).

In step S10, each computing unit 35 can use the decryption key 42 received from the respective third data storage unit 30C to decrypt the encrypted share 55 received from the respective second data storage unit 30B (or the database 60). Therefore, each computing unit 35 can obtain a share of the secret 52 in an unencrypted state.

The recovery device 20 can generate in step S8 temporary decryption key(s) 45T and temporary encryption key(s) 42T. As discussed, the temporary encryption key(s) 42T and temporary decryption key(s) 45T can be generated in pair(s), such that keys from the same pair can be used to reverse the action performed by the other key, said action being encryption or decryption.

In step S9, the recovery device 20 provides to each of the N computing units 35 one temporary encryption key 42T.

Steps S8 and S9 can be carried out in two ways. In some embodiments, the recovery device 20 can generate in step S8 only one pair of temporary cryptographic keys 45T, 42T. Then, the recovery device 20 can securely store the temporary decryption key 45T and share the temporary encryption key 42T to the computing units 35. Note that each computing unit 35 would then be provided with the same temporary encryption key 42T. Alternatively, in some embodiments, the recovery device 20 can generate N pairs of temporary cryptographic keys 45T, 42T in step S8. More particularly, for each of the at least N computing units 35 the recovery device 20 can generate a pair of temporary cryptographic keys 45T, 42T. In step S9, the recovery device 20 can send to each of the at least N computing units a respective temporary encryption key 42T. Thus, each computing unit 35 comprises a unique temporary encryption key 42T. The former embodiment is simpler and require less computations, because only one pair of keys need to be generated in step S8. The latter embodiment can offer improved security, because in order for a third party to recover the secret, N decryption keys 45T need to be "stolen" from the recovery device 20 (instead of only one).

Using the received temporary encryption key 42T, each of the at least N computing units 35 can encrypt the share 52 of the secret 50 in step S11 to obtain a corresponding temporary encrypted share 55T. It is noted that the temporary encrypted share 55T differs from encrypted share 55 because they are encrypted with different encryption keys. While the encrypted shares 55 are encrypted with the encryption keys 42, the temporary encrypted shares 55T are encrypted with the temporary encryption key(s) 42T generated by the recovery device 20. In other words, while the decryption keys 45 for decrypting the encrypted shares 55 are stored in the third data storage units 30C, respectively, the temporary decryption key(s) 45T for decrypting the temporary encrypted shares 55T is/are owned by and stored in the recovery device 20. Moreover, it is the backup device 10 which generates the encrypted shares 55 (in step S2) and it is the computing units 35 which generate the temporary encrypted shares 55T (in step S11).

In a further step S43, each computing unit 35 sends its temporary encrypted share 55T to the recovery device 20.

In step S5, the recovery device 20 can decrypt the at least N temporary encrypted shares 55T to obtain at least N shares 52 in unencrypted states. In embodiments wherein in step S8 only one pair of temporary cryptographic keys 45T, 42T is generated, the decryption of the temporary encrypted shares 55T can be performed using the one temporary decryption key 45T. That is, in such embodiments, all the temporary encrypted shares 55T are obtained using the same temporary encryption key 42T corresponding to the temporary decryption key 45T.

In embodiments wherein in step S8 a plurality of temporary cryptographic keys 45T, 42T are generated, then a matching between the temporary encrypted shares 55T and the temporary decryption keys 45T may be performed based on the temporary encryption keys 42T used to obtain the encrypted shares 55T. In some embodiments, the recovery device 20 may store in a memory the mapping between computing units 35 and temporary encryption keys 42T while sharing the temporary encryption keys 42T in step S9. This may facilitate matching the temporary encrypted shares 55T with the temporary decryption keys 45T. Alternatively, the recovery device 20 may use a brute-force algorithm for matching the temporary encrypted shares 55T with the temporary decryption keys 45T.

After obtaining the at least N shares of the secret 52, the recovery device may recover the secret 50 in step S6.

Figure 4D:
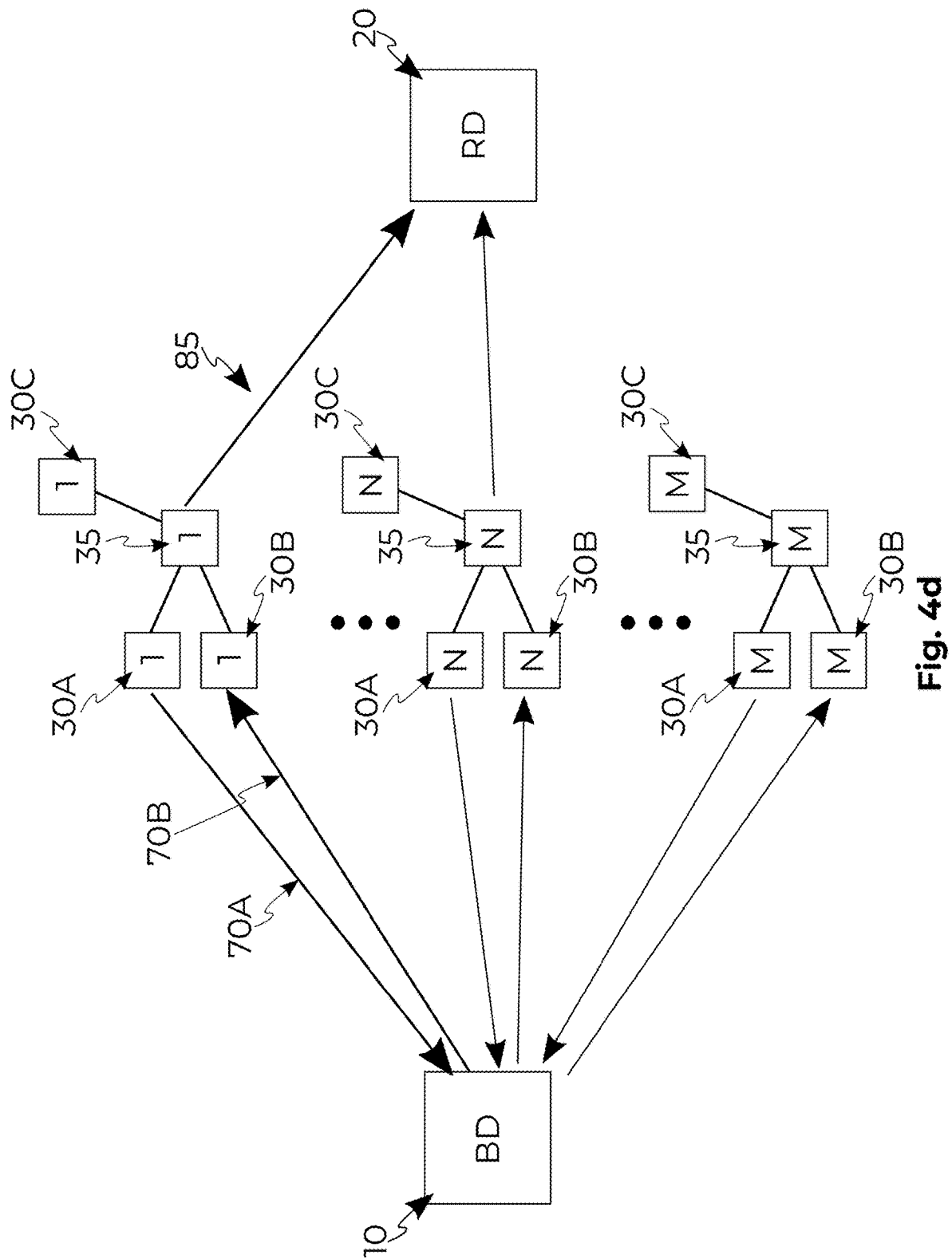
FIG. 4d schematically shows a system configured to perform the method for storing a data element according to the third embodiment and the corresponding method for determining the data element according to the third embodiment.

In FIG. 4d, a system for carrying out the method discussed with reference to FIGS. 4a to 4c is illustrated. The system is similar to the one discussed with reference to FIG. 2d. However, as can be noticed, due to the further features of the method illustrated in FIGS. 4a to 4c, the decryption keys are kept internal to the respective devices. Hence, no secure channel is required to communicate with the backup device 10 and the recovery device 20.

More particularly, the system comprises a backup device 10 and a recovery device 20. Further M first data storage units 30A storing encryption keys, respectively, and M second data storage units 30B storing encrypted shares, respectively, and M third data storage units 30C storing decryption keys, respectively, are provided. In addition, the system comprises M computing units 35, each configured to access a respective first data storage unit 30A and a respective second data storage unit 30B and a respective third data storage unit 30C. Preferably, the computing unit 35 and the third data storage unit 30C are provided internally to a single device. As such, the decryption key can be transferred internally between respective third data storage units 30C and computing units 35.

Each computing unit can communicate with the recovery device 20 through a respective communication channel 85.

As discussed, FIGS. 4a to 4d depict a method of recovering the secret without communicating decryption keys to the recovery device. This can be achieved by the use of temporary encryption keys and temporary decryption keys generated by the recovery device. In other embodiments, recovering the secret without communicating the decryption keys can be achieved using a factory shared secret. More particularly, there can be a factory shared secret among the recovery device 20 and the computing units 35. The factory shared secret can be provided to the recovery device 20 and to the computing units 35 (or to a device comprising the computing units 35, e.g., to the user device 100) during the manufacturing of the recovery device 20 and the computing units 35. In addition, the factory shared secret may be provided to the backup device 10. In general, the factory shared secret can be unique to a group of devices, comprising at least one of the backup device 10, the recovery device 20, the computing units 35 and the user devices 100. The factory shared secret can increase security of the communication between said devices. More particularly, the factory shared secret can be used to encrypt data communicated from one device to the other, e.g., from the recovery device 20 to the computing units 35 and vice versa. For example, a symmetric encryption scheme (e.g. AES) can be used.

Thus, no temporary encryption keys and temporary decryption keys (i.e., steps S8 and S9 in FIGS. 4a to 4d) may be communicated in this implementation of the present technology. Instead, in step S11 each of the N computing units may encrypt the respective share with the factory share secret using a symmetric encryption scheme. Then, in step S43, each of the N computing units may provide the respective encrypted share with the factory shared secret to the recovery device. The recovery device, which can already comprise the factory shared secret, can decrypt the encrypted share in step S5.

The factory shared secret can be provided inside a respective secure enclave that can be comprised by the backup device, recovery device, computing unit and/or the respective device comprising the computing unit. For example, the factory shared secret can be provided inside a self-encrypted memory and/or hardware-based key manager.

In some embodiments, the temporary encryption keys and the factory shared secret can be used on top of each other for enhanced security. That is, the shares can be encrypted using both the temporary encryption keys and the factory shared secret.

It will be noted that only the link between each computing unit 35 and its respective third data storage unit 30C need to be protected. This is ensured by typically providing the computing unit 35 and its respective third data storage unit 30C internal to a single device. All the other communication channels can be insecure channels.

FIGS. 5a, 5b and 6a, 6b illustrate an application of the methods and systems discussed above, particularly the ones discussed with reference to FIGS. 4a to 4d.

Figure 5A:
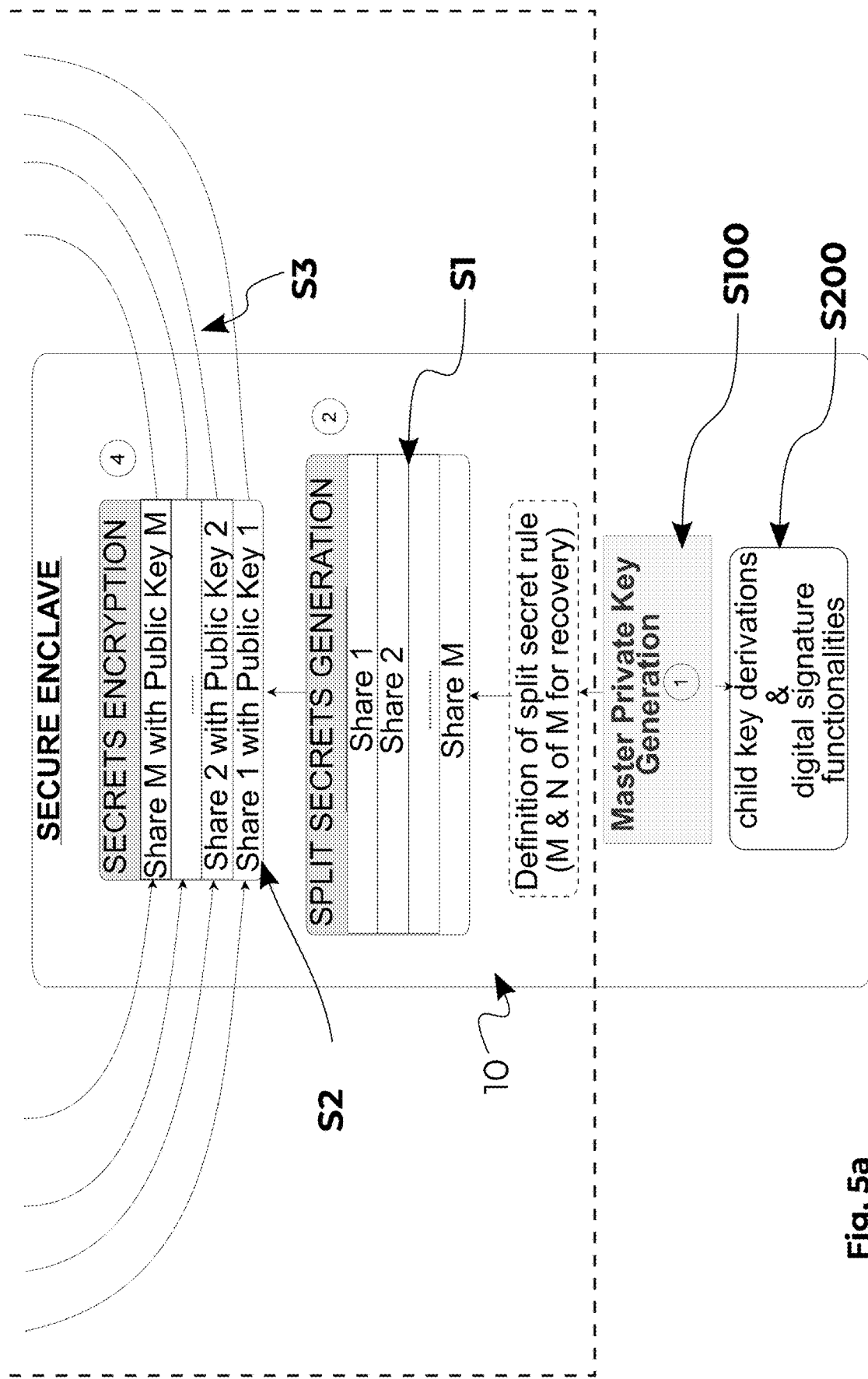
FIG. 5a provides a first part of a schematic of a secret backup process according to an aspect of the present invention.
Figure 5B:
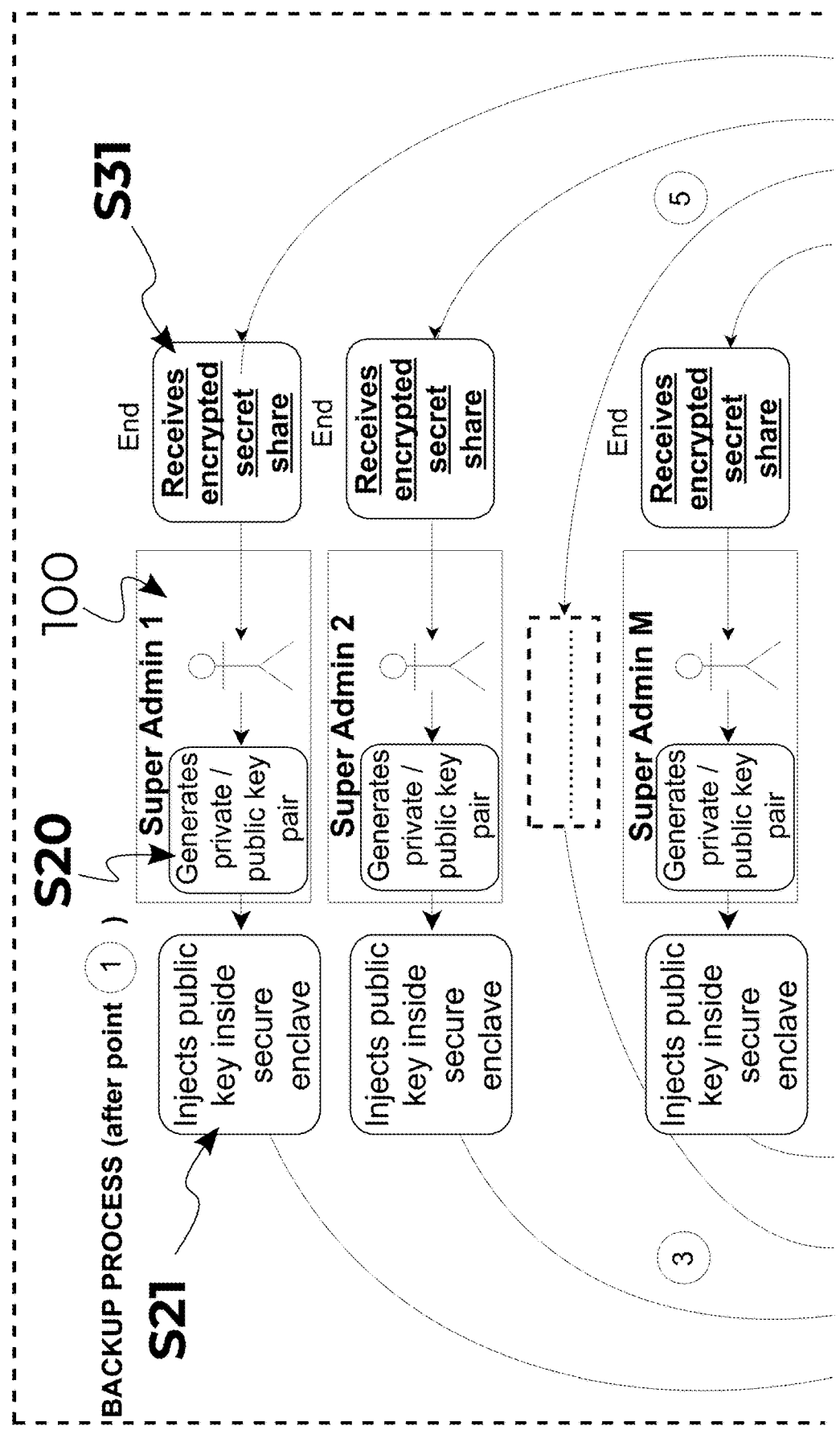
FIG. 5b provides the second part of the schematic of the secret backup process (it is noted that FIG. 5b is the upper part of the complete schematic and FIG. 5a is the lower part of the complete schematic)

FIGS. 5a and 5b illustrate a backup process for storing a secret in a distributed and encrypted manner among a plurality of user devices 100. Each user device 100 can be owned by a respective user, also referred to as a super admin. Each user device 100 can comprise embedded therein a first data storage unit 30A, a second data storage unit 30B, a third data storage unit 30C and a computing unit 35. In addition, each user device 100 can comprise one or more communication components for sending and receiving data to/from the backup device 10 and recovery device 20.

In some system embodiments, the user device 100 can be a smartphone, tablet, laptop, pocket computer, cellphone, smart card, contact card, contactless cars (e.g. NFC card) or the like. The mobile device can comprise a user interface. The user interface can be advantageous as it can allow the user to provide instructions to the user device. Further, the user device can comprise a user device identity. The user device identity can be advantageous for unambiguously identifying the user device and for facilitating the scalability of the system. That is, through the user device identity the backup device (and recovery device) can uniquely identify each of the M user devices. In addition, each user device can comprise a cryptographic identity, such as at least one cryptographic key, preferably a pair of cryptographic keys, such as public key and a private key. The public-private pair of keys can be advantageous for the use of an asymmetric encryption scheme. This can allow for a secure data communication between entities of the system.

The backup process illustrated in FIGS. 5a and 5b can comprise the steps S1, S2, S3, S31 as discussed with reference to the embodiment of the method discussed in FIGS. 2a, 2b, 4a and 4b. In addition, in FIGS. 5a and 5b the secret 50 can comprise a master private key 50 generation step S100. In step S100 the master private key 50 may be generated through a random process.

FIGS. 5a and 5b also depict step S200, wherein the master private key 50 can be used for child key derivations and digital signature functionalities. For example, the backup device may be provided with elliptic curve cryptographic digital signature algorithm (ECDSA) functionalities.

Furthermore, in many systems and applications, ownership of the master private key 50 may not only be provided to one user, but instead to a plurality of users. For example, this can be used for sharing responsibilities among different users. For example, in an entity two (or more) persons may be required to sign a document. Sharing the ownership of the master private key 50 can increase the security of storing the master private key 50. This is particularly the case if the backup process illustrated in FIGS. 5a and 5b is used, because even if one of the users is compromised, the master private key 50 is still non-recoverable as long as the number of compromised users 100 is less than N.

It will be noted that FIGS. 5a and 5b depicts composing parts of the same drawing. That is, the full schematic of the secret backup process can be obtained by aligning FIGS. 5a and 5b, where FIG. 5b is the top part and FIG. 5a is the bottom part.

Thus, in a step S100 a master private key 50 can be generated by a backup device 10. In a step S1, the backup device 10 may generate M shares of the secret based on a split secret rule (i.e. data splitting routine).

In a step S20, each user device 100 of each user may generate a respective encryption key (i.e. public key) and decryption key (i.e. private key). In step S21, each user can provide using the user device 100 its respective encryption key to the backup device 10. Thus, the backup device 10 can receive from each of the M user devices of the users 100 a respective encryption key. In step S2, the backup device 10 encrypts each share with a respective encryption key and sends the encrypted share to the respective user device 100 in step S31.

Thus, each user device stores a respective encrypted share (in a respective second data storage unit 30B embedded therein) and a respective decryption key (in a respective third data storage unit 30C embedded therein).

The master private key 50 as illustrated by step S200 can be used for deriving other encryption keys and/or for signing transactions digitally. However, to use the master private key 50 at least N users may be needed such that the master private key 50 can be recovered and used.

Figure 6A:
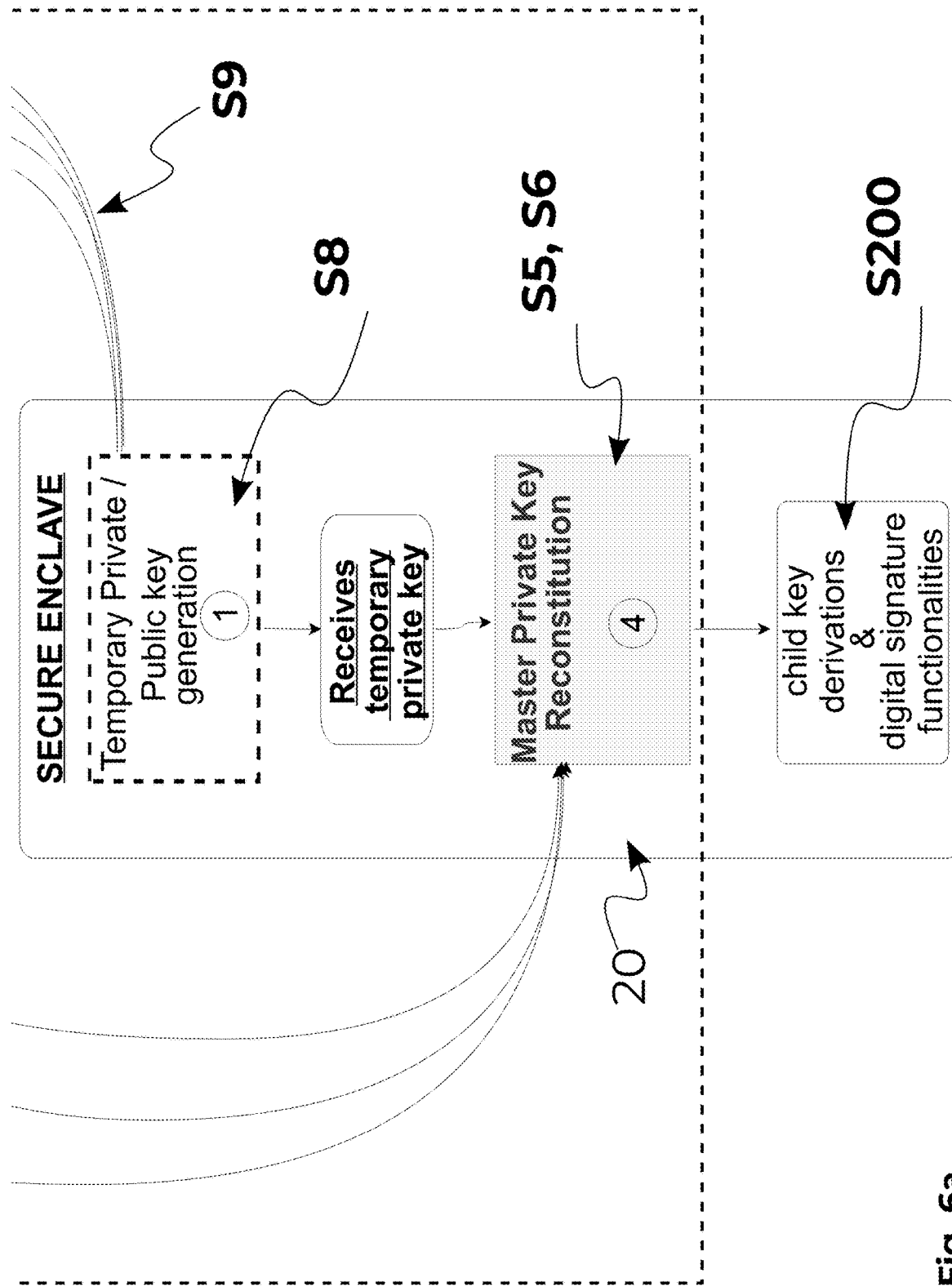
FIG. 6a provides a first part of a schematic of a secret recovery process according to an aspect of the present invention.
Figure 6B:
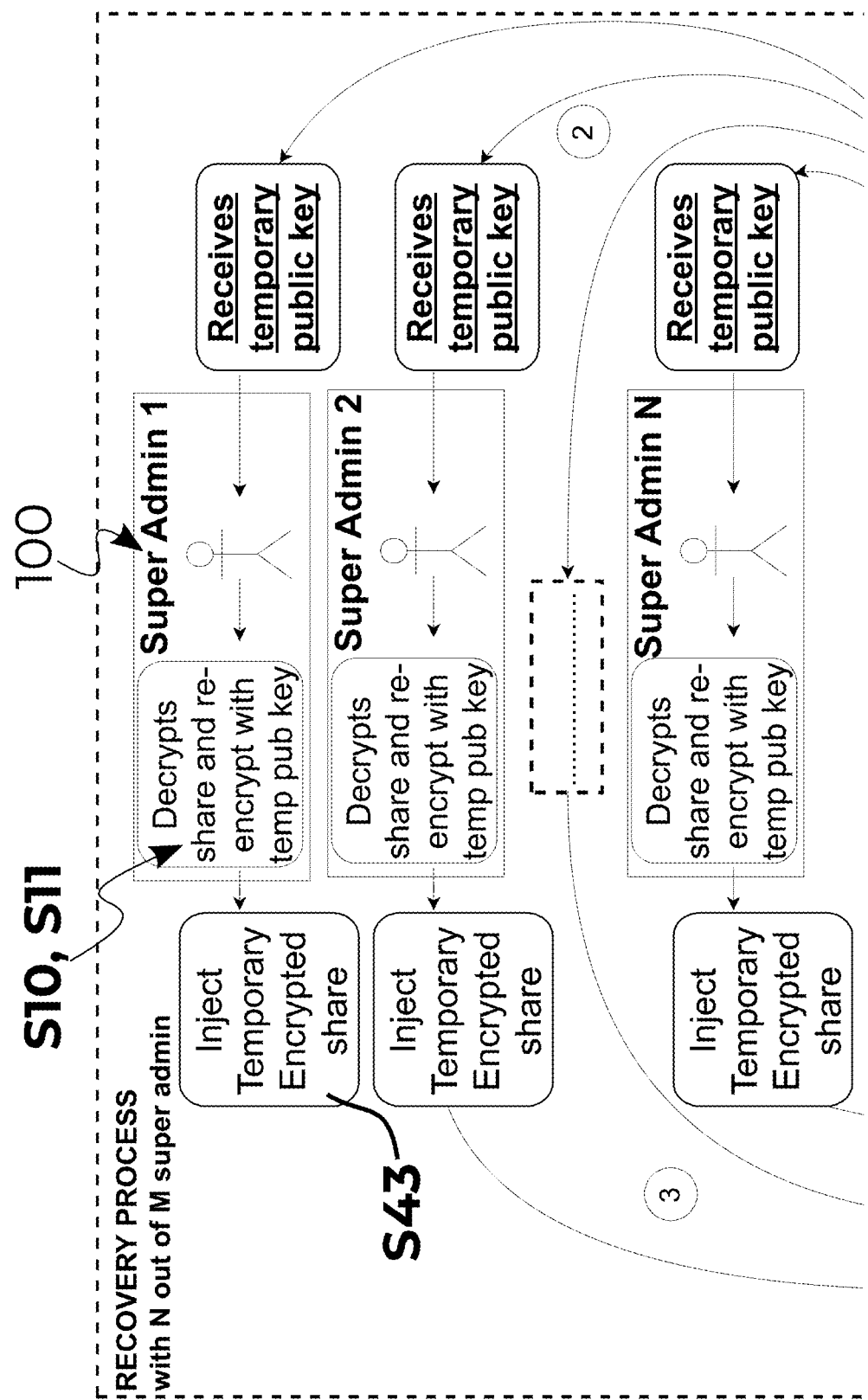
FIG. 6b provides the second part of the schematic of the secret recovery process (it is noted that FIG. 6b is the upper part of the complete schematic and FIG. 6a is the lower part of the complete schematic)

Similarly, in the embodiments illustrated in FIGS. 5a and 6b, the factory shared secret can be used as a variation of the temporary encryption/decryption keys. In some further embodiments, both the factory shared secret and the temporary encryption/decryption keys can be utilized for enhanced security.

FIGS. 6a and 6b illustrate a recovery process for determining a secret after it is stored in a distributed and encrypted manner among a plurality of user devices 100. The recovery process illustrated in FIGS. 6a and 6b can comprise the steps S8, S9, S10, S11, S4, S43, S5 and S6 as discussed with reference to the embodiment of the method discussed in FIGS. 4a and 4c.

It will be noted that FIGS. 6a and 6b depict composing parts of the same drawing. That is, the full schematic of the secret recovery process can be obtained by aligning FIGS. 6a and 6b, where FIG. 6b is the top part of the composite drawing and FIG. 6a is the bottom part.

FIG. 7 provides a schematic of a user device 100. The user device 100 may comprise a computing unit 35, a first data storage unit 30A, a second data storage unit 30B and a third data storage unit 30C. The computing unit 35 can access the first data storage unit 30A, the second data storage unit 30B and the third data storage unit 30C through the internal communication channel 160, which can comprise a bus connection 160.

The computing unit 30 may be single processor or a plurality of processors, and may be, but not limited to, a CPU (central processing unit), GPU (graphical processing unit), DSP (digital signal processor), APU (accelerator processing unit), ASIC (application-specific integrated circuit), ASIP (application-specific instruction-set processor) or FPGA (field programmable gate array). The first data storage unit 30A may be singular or plural, and may be, but not limited to, a volatile or non-volatile memory, such as a random access memory (RAM), Dynamic RAM (DRAM), Synchronous Dynamic RAM (SDRAM), static RAM (SRAM), Flash Memory, Magneto-resistive RAM (MRAM), Ferroelectric RAM (F-RAM), or Parameter RAM (P-RAM).

The second data storage unit 30B may be singular or plural, and may be, but not limited to, a volatile or non-volatile memory, such as a random access memory (RAM), Dynamic RAM (DRAM), Synchronous Dynamic RAM (SDRAM), static RAM (SRAM), Flash Memory, Magneto-resistive RAM (MRAM), Ferroelectric RAM (F-RAM), or Parameter RAM (P-RAM).

The third data storage unit 30C may be singular or plural, and may be, but not limited to, a volatile or non-volatile memory, such as a random access memory (RAM), Dynamic RAM (DRAM), Synchronous Dynamic RAM (SDRAM), static RAM (SRAM), Flash Memory, Magneto-resistive RAM (MRAM), Ferroelectric RAM (F-RAM), or Parameter RAM (P-RAM).

It should be understood that generally, the first data storage unit 30A (also referred to as encryption key storage unit 30A), the second data storage unit 30B (also referred to as data share storage unit 30B), and the third data storage unit 30C (also referred to as decryption key storage unit 30C) can also be part of the same memory. That is, only one general data storage unit 30 per device may be provided, which may be configured to store the respective encryption key (such that the section of the data storage unit 30 storing the encryption key may be the encryption key storage unit 30A), the respective data element share (such that the section of the data storage unit 30 storing the data element share may be the data share storage unit 30B), and the respective decryption key (such that the section of the data storage unit 30 storing the decryption key may be the decryption key storage unit 30A).

In some embodiments, the third data storage unit 30C can be a secure memory device 30C, such as, a self-encrypted memory, hardware-based full disk encryption memory and the like which can automatically encrypt all of the stored data. The data can be decrypted from the memory component only upon successful authentication of the party requiring to access the third data storage unit 30C, wherein the party can be a user, user device, processing unit and the like. In some embodiments, the third data storage unit 30C can only be connected to the computing unit 35 and the computing unit 35 can be configured to never output the data received from the third data storage unit 30C. This can ensure a secure storing and handling of the encryption key (i.e. private key) stored in the third data storage unit 30C.

In some embodiments, the second data storage unit 30B may not be provided but instead the user device 100 can be configured to receive a corresponding encrypted share from the database 60. In some embodiments, the user device 100 may comprise the second data storage unit 30B and can be configured to receive a corresponding encrypted share from the database 60.

The user device 100 may comprise a further memory component 140 which may be singular or plural, and may be, but not limited to, a volatile or non-volatile memory, such as a random access memory (RAM), Dynamic RAM (DRAM), Synchronous Dynamic RAM (SDRAM), static RAM (SRAM), Flash Memory, Magneto-resistive RAM (MRAM), Ferroelectric RAM (F-RAM), or Parameter RAM (P-RAM). The memory component 140 may also be connected with the other components of the user device 100 (such as the computing component 35) through the internal communication channel 160.

Further the user device 100 may comprise an external communication component 130. The external communication component 130 can be configured to facilitate sending and/or receiving data to/from an external device (e.g. backup device 10, recovery device 20, database 60). The external communication component 130 may comprise an antenna (e.g. WIFI antenna, NFC antenna, 2G/3G/4G/5G antenna and the like), USB port/plug, LAN port/plug, contact pads offering electrical connectivity and the like. The external communication component 130 can send and/or receive data based on a communication protocol which can comprise instructions for sending and/or receiving data. Said instructions can be stored in the memory component 140 and can be executed by the computing unit 35 and/or external communication component 130. The external communication component 130 can be connected to the internal communication component 160. Thus, data received by the external communication component 130 can be provided to the memory component 140, computing unit 35, first data storage unit 30A and/or second data storage unit 30B and/or third data storage unit 30C. Similarly, data stored on the memory component 140, first data storage unit 30A and/or second data storage unit 30B and/or third data storage unit 30C and/or data generated by the commuting unit 35 can be provided to the external communication component 130 for being transmitted to an external device.

In addition, the user device 100 may comprise an input user interface 110 which can allow the user of the user device 100 to provide at least one input (e.g. instruction) to the user device 100. For example, the input user interface 110 may comprise a button, keyboard, trackpad, mouse, touchscreen, joystick and the like.

Additionally still, the user device 100 may comprise an output user interface 120 which can allow the user device 100 to provide indications to the user. For example, the output user interface 110 may be aN LED, a display, a speaker and the like.

The output and the input user interface 100 may also be connected through the internal communication component 160 with the internal component of the device 100.

Figure 8:
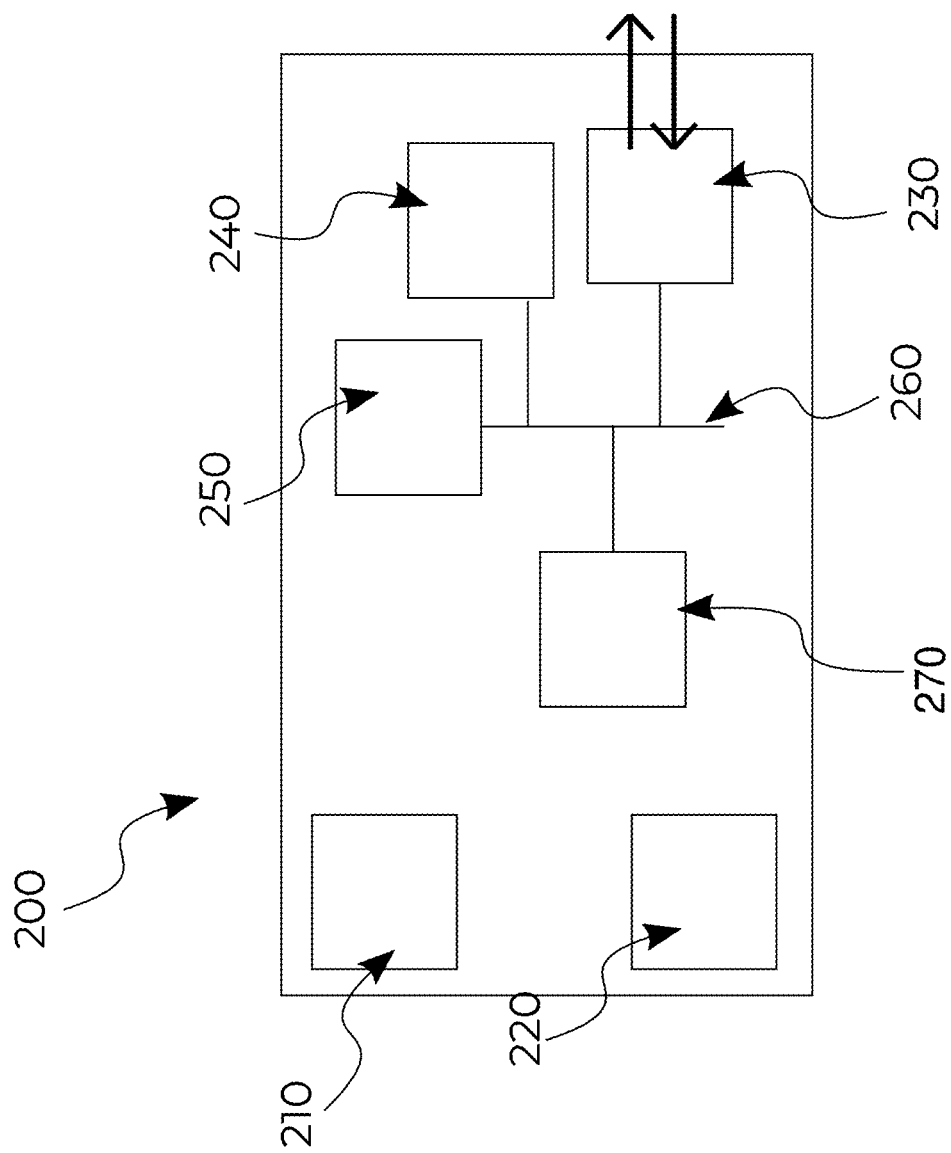
FIG. 8 illustrates a device that can be a backup device for facilitating the method for storing a data element or a recovery device for facilitating a corresponding method for determining the data element.

In FIG. 8 a particular embodiment of a device 200 is depicted. The device 200 can be configured to operate as a backup device 10 and/or as a recovery device 20. That is, in some embodiments, the backup device 10 and the recovery device 20 can comprise similar or even identical architectures. More particularly, the device 200 may be configured for executing all the functionalities of the backup device 10, as discussed, and all the functionalities of the recovery device 20. Depending on the case, the device 200 may be used as a backup device 10 or as a recovery device 20. Thus, any of the features discussed below with respect to FIG. 8 can also be comprised by the backup device and the recovery device discussed in the above embodiments.

The device 200 may comprise a processing unit 250 which may be singular or plural, and may be, but not limited to, a CPU (central processing unit), GPU (graphical processing unit), DSP (digital signal processor), APU (accelerator processing unit), ASIC (application-specific integrated circuit), ASIP (application-specific instruction-set processor) or FPGA (field programmable gate array). The processing unit 250 may comprise one or more microcontroller unit 250 such as one or more tamperproof (i.e. secure) micro-controller unit 250. As an example, a micro-controller of the NXP SmartMX secure microcontroller family, e.g. the NXP SmartMX3 P71D321, can be used as the processing unit 250.

Further the processing unit 250 may be provided with a true random number generator (TRNG) which can provide a high-quality source of randomness.

Further, the device 200 may comprise a memory component 240 which may be singular or plural, and may be, but is not limited to, a volatile or non-volatile memory, such as a random access memory (RAM), Dynamic RAM (DRAM), Synchronous Dynamic RAM (SDRAM), static RAM (SRAM), Flash Memory, Magneto-resistive RAM (MRAM), Ferroelectric RAM (F-RAM), or Parameter RAM (P-RAM). Furthermore, the memory component 240 can be a secure memory device 240, such as, a self-encrypted memory, hardware-based full disk encryption memory and the like which can automatically encrypt all of the stored data. The data can be decrypted from the memory component only upon successful authentication of the party requiring to access the memory component 240, wherein the said party can be a user, user device, processing unit and the like.

The device 200 may further comprise one or hardware accelerators 270, NXP P60, NXP P71 (in the SecID version) and the like. More particularly, the device 200 may comprise hardware accelerators 270 for facilitating any of the following algorithms: asymmetric public/private key algorithm such as, and not limited to, RSA, ECC P256k1, ECC P256r1, X25519, Shamir's secret sharing algorithm, Elliptic Curve Cryptographic Digital Signature Algorithm (ECDSA), key derivation algorithm (e.g. adapted KDF-BIP 32), SHA 1, SHA 256, and the like.

Further the device 200 may comprise an external communication component 230. The external communication component 230 can be configured to facilitate sending and/or receiving data to/from an external device (e.g. user device 100, first data storage units 30A, second data storage units 30B, third data storage unit 30C, database 60). The external communication component 230 may comprise an antenna (e.g. WIFI antenna, NFC antenna, 2G/3G/4G/5G antenna and the like), USB port/plug, LAN port/plug, contact pads offering electrical connectivity, smart card reader and the like. The external communication component 230 can send and/or receive data based on a communication protocol which can comprise instructions for sending and/or receiving data. Said instructions can be stored in the memory component 240 and can be executed by the processing unit 250 and/or external communication component 230. The external communication component 230 can be connected to the internal communication component 260. Thus, data received by the external communication component 230 can be provided to the memory component 240, processing unit 250 and/or accelerators 270. Similarly, data stored on the memory component 240, and/or data generated by the processing unit 250 and/or accelerators 270 can be provided to the external communication component 230 for being transmitted to an external device.

Further, the device 200 may comprise an internal communication component 260 configured to allow the internal components 240, 250, 270, 230, of the device 200 to communicate with each other. The internal commutation component can, for example, comprise a bus connection 260.

In addition, the user device 200 may comprise an input user interface 210 which can allow a user of the device 200 to provide at least one input (e.g. instruction) to the device 200. For example, the input user interface 210 may comprise a button, keyboard, trackpad, mouse, touchscreen, joystick and the like.

Additionally still, the device 200 may comprise an output user interface 220 which can allow the user device 100 to provide indications to the user. For example, the output user interface 210 may be a led, a display, a speaker and the like.

The output and the input user interface 200 may also be connected through the internal communication component 260 with the internal component of the device 200.

Thus, for the backup method, M users can be selected to hold the shared and encrypted partial secrets (i.e. the encrypted shares of the secret). Each of the M users using the user device can generate a private key (i.e. decryption key) and public key (i.e. encryption key) pair separately. The keys can for example be generated such that they can be used for RSA 4096. The private key must be hidden, that is, stored in a secure manner.

For the backup process, an initializing device 200 (i.e. backup device 30) can be used. All M users can provide to the initializing device 200, during the initialization phase (i.e. secret backup phase), only their respective public keys.

Thus, all the M public keys can be injected (i.e. provided) inside the initializing device 200. The Shamir based N of M rule can be simultaneously defined and also injected into the user device 100. That is, also the user device 100 is provided with the parameters of the secret sharing scheme (e.g. the value of M and N). The initializing device 200 can perform all the following operations inside its secure enclave: random master key generation (i.e. secret), generation of M Shamir shares (i.e. secret shares), encryption of all M Shamir secrets with the M public keys respectively. That is, step S1 and S2 discussed above, can be performed in a secure enclave of the initializing device 200.

The secure enclave of the device 200 can be a hardware-based key manager that is isolated from the main processor to provide an extra layer of security. When a private key is stored in the secure enclave, it is only handled inside the secure enclave. That is, the secure enclave can create the key, securely store it, and perform operations with it. Only the output of these operations, such as encrypted data or a cryptographic signature is provided outside the secure enclave. For example, the secure enclave of the device 200 may comprise the processing unit 250, secure memory component 240 and accelerators 270 (see FIG. 8). Thus, the master private key can be generated by the processing unit 250 (see step 100) and can be used by the processing unit 250 and/or accelerators 270 for deriving other keys and/or for digital signature functionalities (see step 200). That is, the master private key is only present inside the secure enclave.

Outside the secure enclave the device 200 can publish all encrypted Shamir secret together with corresponding public key used for encryption. Each of the M users can be provided with the encrypted Shamir secret share that corresponds to their public key.

Thus, not even the M together present at the initialization can recover the master private key. For recovery, N out of M must be present and have access to their private keys. However, as discussed above during the initialization phase (i.e. secret backup) each user provides only its public key.

For the recovery of the master key a new non-initialized device 200 (i.e. recovery device 20) can be provided. N secret holders can inject their encrypted Shamir shares together with their private key to the non-initialized device 200. The non-initialized device 200 can decrypt the Shamir shares and determine the master key instead of generating a new random one. The initializing device 200 is thus cloned into the non-initialized device 200.

In some embodiments, the device 200 can store a factory shared secret. Preferably, in embodiments wherein the device 200 comprises a secure enclave, the factory shared secret can be stored within the secure enclave. Moreover, each device 200 can comprise the same factory shared secret with at least one other device 200. In other words, a unique factory shared secret can be provided to at least two devices 200. Moreover, the factory shared secret can be provided to the at least two devices 200 in a secure environment, e.g., during manufacturing of the devices 200.

In some embodiments, the device 200 can be configured to carry out a method according to any of the embodiments illustrated in FIGS. 1 to 11. In some embodiments, the device 200 can be configured to carry out a method according to the embodiment illustrated in FIG. 12. It will be understood that the device 200 can also carry out both a method according to any of the embodiments illustrated in FIGS. 1 to 11 and a method according to the embodiment illustrated in FIG. 12.

Figure 9A:
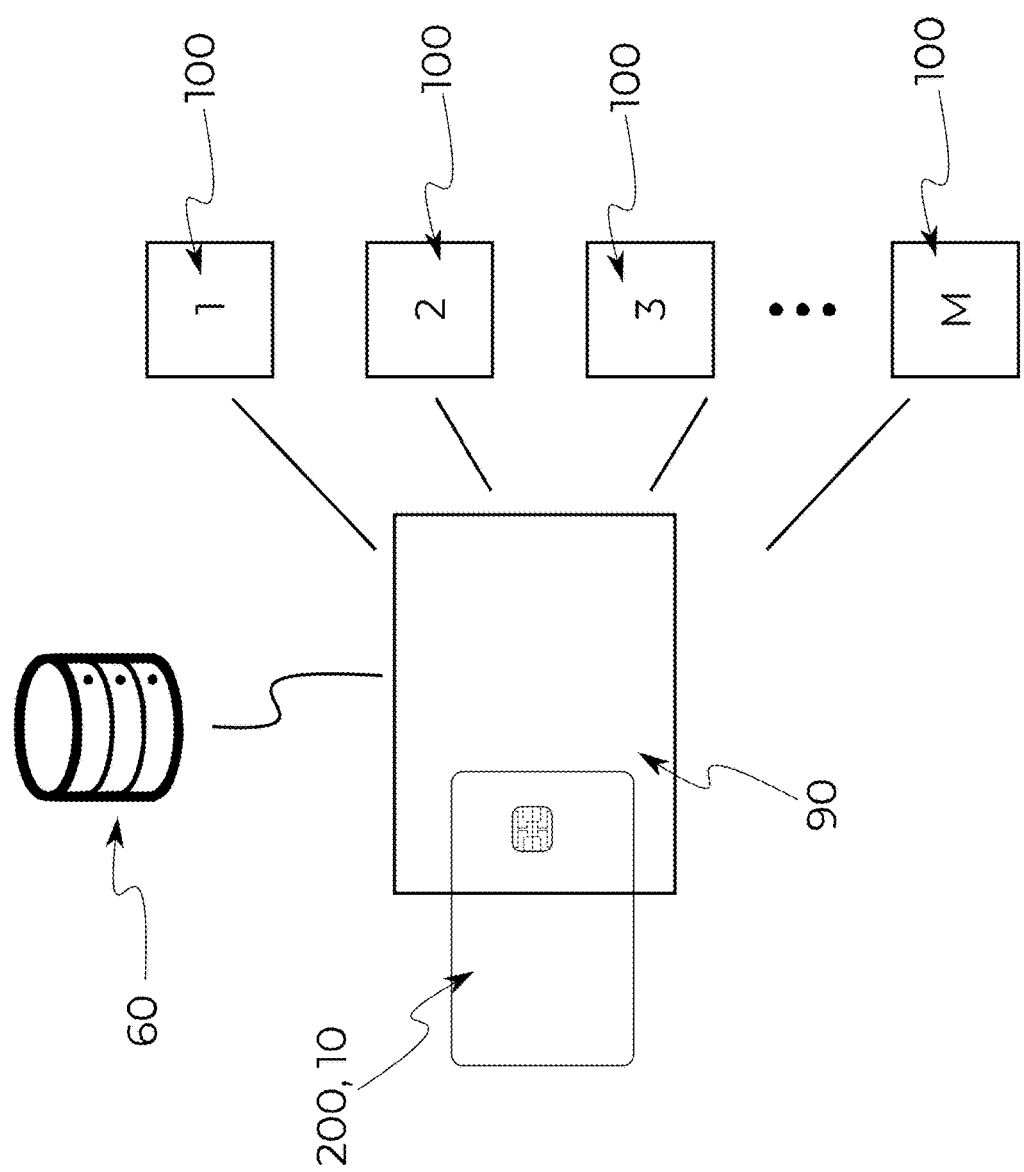
FIG. 9a illustrates a system configured to store a data element.

FIG. 9a schematically illustrates a system configured to store or backup a data element (i.e. secret). The system as illustrated in FIG. 9a can be configured to carry out the method for storing a data element as discussed with respect to the previous figures.

The system can comprise the device 200, which can preferably be a tamperproof device 200 or a tamper resistant device 200. The device 200 can be the backup device 10. Further, the system can comprise a general computing device 90. The general computing device 90 can comprise a general central processing unit, volatile and/or non-volatile memories, interfaces for interconnecting internal components of the general computing device 90 and/or for interfacing the general computing device 90 with external devices (e.g. network card, USB port, smart card reader, etc.). For example, the general computing device 90 can be a system-on-chip, computer-on-chip, computer, laptop, server, workstation or a smart card terminal. The general computing device 90 can comprise an interface (not shown) configured to facilitate a connection for data transmission between the backup device 10 and the general computing device 90. For example, the general computing device 90 can comprise a smart card reader and the backup device 10 can be a smart card 10. This is illustrated in FIG. 9a, wherein the backup device 10, realized as a smart card 10, is depicted "inserted" in the smart card reader of the general computing device 90, thus establishing a connection for data transmission between the backup device 10 and the general computing device 90.

Further, the system can comprise M user devices 100 and optionally a database 60. A detailed discussion of the user device 100 is provided with respect to FIG. 7. The general computing device 90 can be configured to carry out auxiliary tasks, such as, establishing communication channels with the M user devices 100 and/or the database 60. On the other hand, the backup device 10, which in the provided example is realized as a smart card 10, can be configured to carry out security sensitive tasks, such as, secure crypto-processing, encryption key management, data element (e.g. master key) generation and data element share generation. The backup device 10 can preferably be a tamperproof device 10. The system can be configured, such that, secret data such as the data element (i.e. the secret), private keys and the unencrypted data element shares can only be handled within a secured environment provided by the tamperproof backup device 10. Outside the secured (i.e. tamperproof) environment of the backup device 10 (e.g., on the general computing device 90 and/or user devices 100 and/or database 60) non-secret data, such as, public keys and encrypted data element shares can be handled.

Put simply, the backup device 10 can comprise hardware and software security wherein unencrypted secret, unencrypted secret shares and/or private keys can be processed. That is, instead of processing or storing unencrypted secret, unencrypted secret shares and/or private keys in the general computing device 90, the system comprises a backup device 10 which can be configured to be tamperproof or at least tamper resistant and thus to securely process and/or store unencrypted secret data (e.g. data element, unencrypted secret share) and/or private keys.

The backup device 10 can comprise a secure crypto-processor or secure microcontroller, such as the NXP SmartMX secure microcontroller family, e.g. the NXP SmartMX3 P71D321. In general, the backup device 10 can comprise dedicated and secure processors or microcontrollers (e.g. secure crypto-processor or secure microcontroller) which can be configured for securely carrying out cryptographic operations and can be embedded in a packaging with one or more physical security measures. This can increase the tamper resistance of the backup device 10. Furthermore, the processing means of the backup device 10 (e.g. secure crypto-processor or secure microcontroller) can be configured to not allow the output of decrypted data or decrypted software instructions in an environment wherein security cannot always be maintained, such as, outside the backup device 10 (or outside a secure portion of the backup device 10), e.g. the general computing device 90.

Alternatively, in some embodiments, the general computing device 90 can be integrated in the backup device 10.

The system as illustrated in FIG. 9a, can perform any of the secret backup method embodiments discussed above. Thus, each of the M encrypted secret shares can be provided to and stored in a respective one of the M user devices 100. Alternatively or additionally, the M encrypted secret shares can be provided to and stored in the database 60.

Furthermore, in some embodiments, the secret (i.e. data element) can be maintained (i.e. stored) in the backup device 10. As discussed, the backup device 10 can be a tamperproof device 10 which facilitates securely storing the secret therein. Alternatively, the secret can be deleted from the backup device 10 after the encrypted secret shares are provided to the M user devices 100 and/or database 60.

Figure 9B:
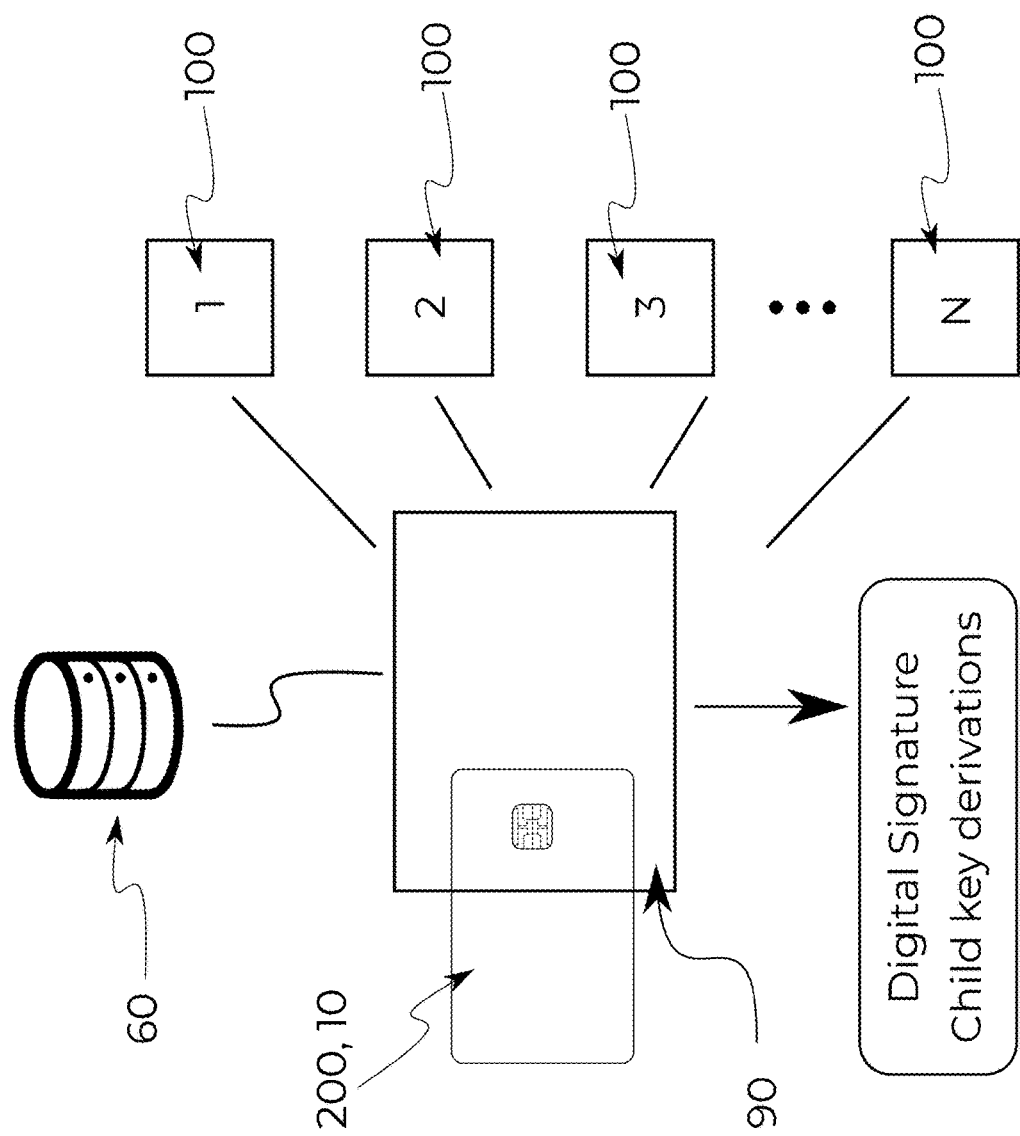
FIG. 9b illustrates the system of FIG. 9a configured to perform digital signature functionalities and child key derivations.

FIG. 9b depicts the system of FIG. 9a, further configured for digital signature functionalities and/or child key derivations. This is particularly advantageous if the secret (i.e. data element) stored using the system as discussed in FIG. 9a, is a master key which can be used to generate digital signatures and/or derive further cryptographic keys.

As illustrated in FIG. 9b, for digital signature functionalities and/or child key derivations at least N user devices 100 can be required.

In some embodiments, and particularly if the secret is maintained in the backup device 10 after the backup process (illustrated in FIG. 9a), the N user devices 100 can forego an authentication protocol such that they can be authenticated by the backup device 10. Upon successful authentication of the N user devices 100, the backup device 10 can perform digital signature functionalities and/or child key derivations using the secret stored in the backup device 10.

Alternatively, and particularly if the secret is not maintained in the backup device 10 before performing digital signature functionalities and/or child key derivations, the secret is first recovered based on at least N encrypted secret shares corresponding to the at least N user devices 100, respectively. To determine the secret, the recovery method, previously discussed, can be used.

Figure 9C:
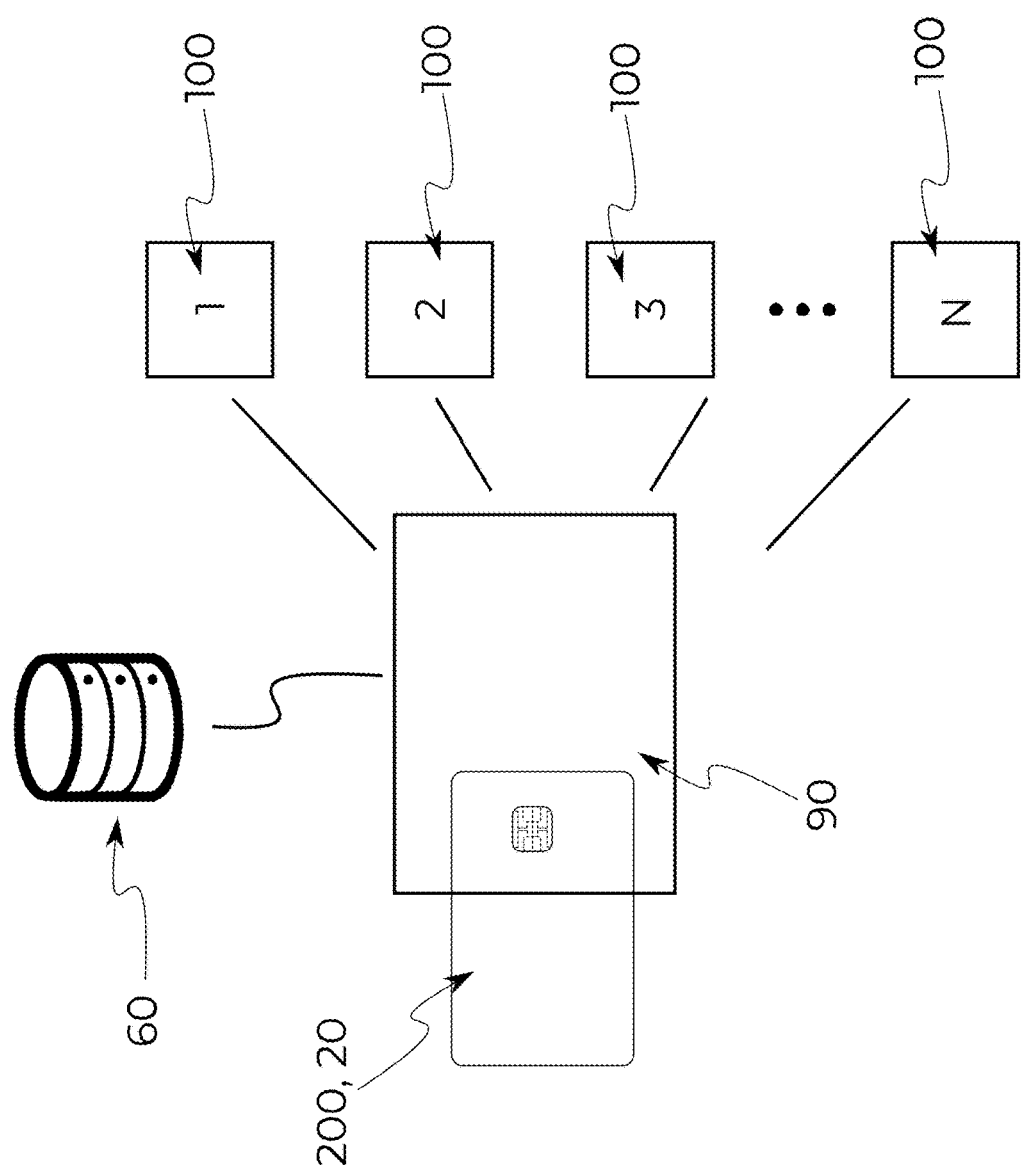
FIG. 9c illustrates a system configured to determine a data element.

FIG. 9c, illustrates a determining system configured to determine a secret, particularly the secret stored by the system of FIG. 9a. The determining system depicted in FIG. 9c can be particularly advantageous as it provides means to recover the secret if the backup device 10 (see, e.g., FIG. 9a) becomes unusable or lost.

As illustrated, the determining system can comprise a device 200, which can preferably be a tamperproof device 200 or at least a tamper resistance device 200. The device 200 can be a recovery device 20. Again, the recovery device 20 and the backup device 10 can comprise similar or even identical architectures. Thus, the recovery device 20 can comprise any of the features, particularly the security features, of the backup device 10.

Further, the determining system can comprise a general computing device 90, which can comprise all the features of the general computing device 90 discussed in connection with FIGS. 9a and 9b. In some embodiments, the general computing device 90 of the determining system can be the same general computing device 90 of the system illustrated in FIGS. 9a and 9b.

Further still, the determining system can comprise at least N user devices 100. The at least N user device 100 can be a subset of the M user devices 100 of the system in FIG. 9a.

Optionally and particularly if at least one of the N user devices 100 does not store the respective encrypted secret share, the database 60 can be provided. In such embodiments, at least one of the N encrypted secret shares can be provided to the recovery device 20 and/or to the respective user device 100 from the database 60.

The determining system can be configured to recover (i.e. determine) the secret by carrying out the determining method as previously discussed. In some embodiments, the general computing device 90 can be integrated in the recovery device 20.

Figure 9D:
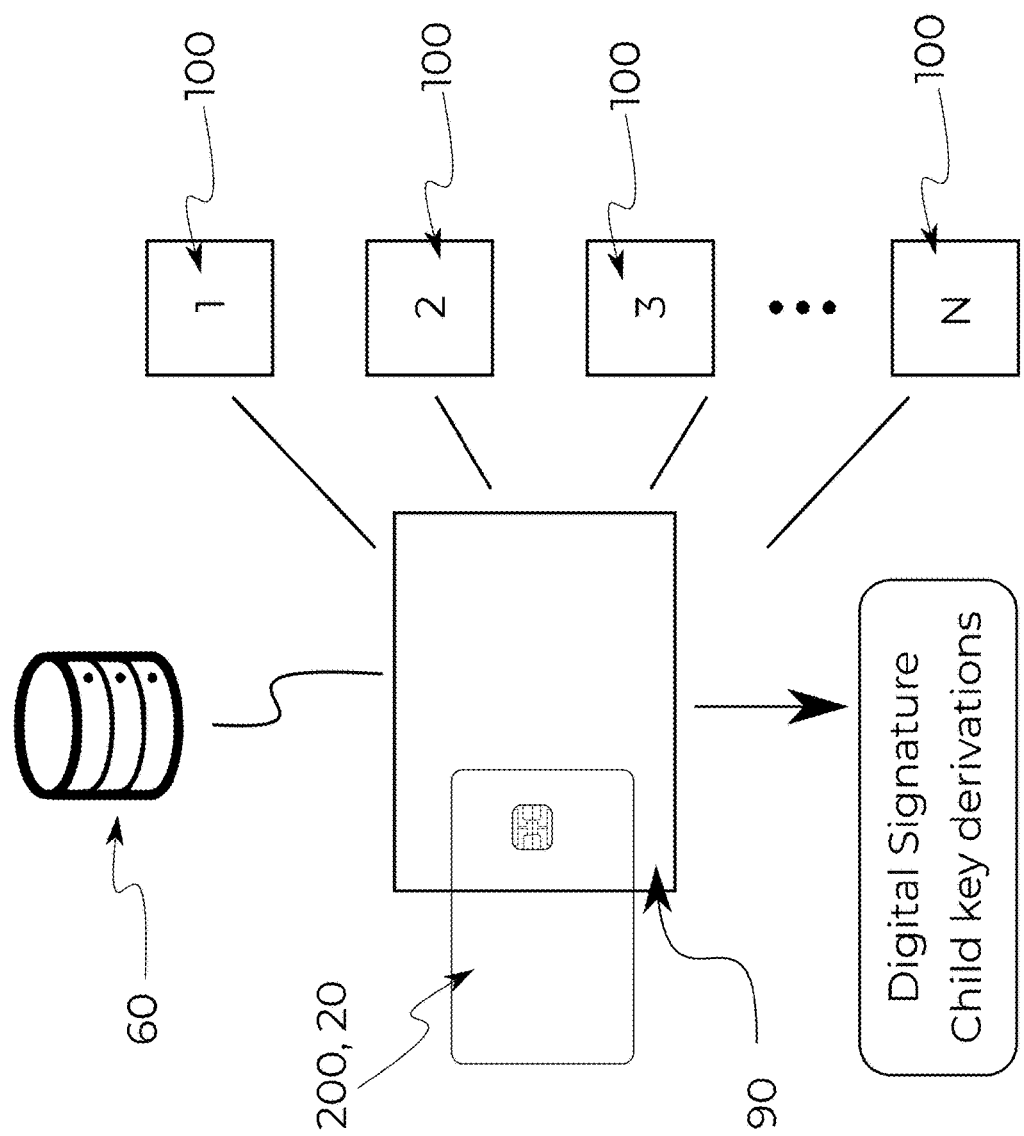
FIG. 9d illustrates the system of FIG. 9c configured to perform digital signature functionalities and child key derivations.

FIG. 9d depicts the determining system of FIG. 9c, further configured for digital signature functionalities and/or child key derivations, similar to the system depicted in FIG. 9b.

In the embodiments discussed with respect to the preceding figures, each secret share corresponds to a respective device which is external to the backup device 10. For example, each secret share can correspond to a data share storage unit 30B, data storage unit 30 and/or user device 100.

Figure 10:
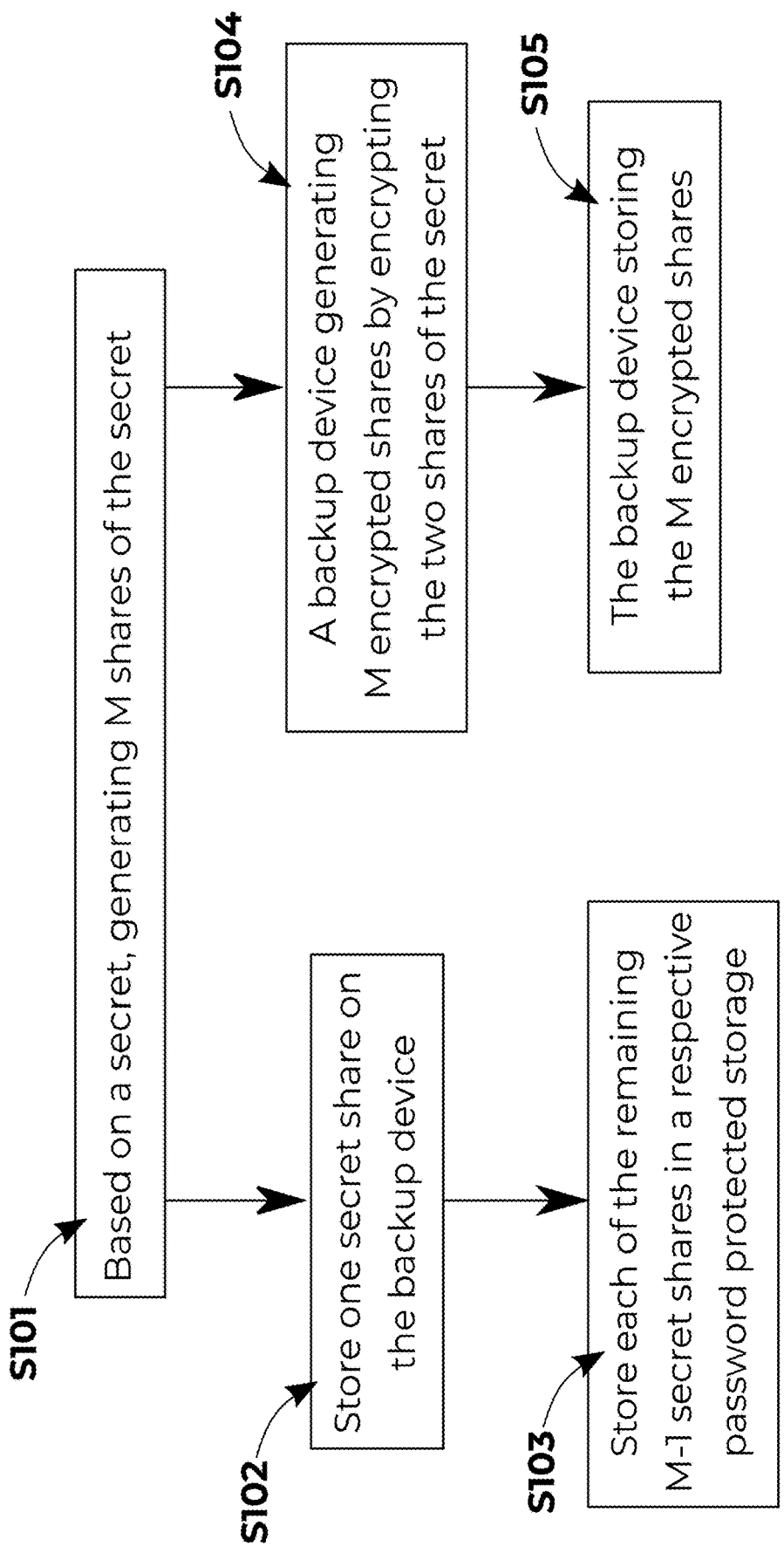
FIG. 10 illustrates a method configured to store a secret particularly for providing a seamless end user experience for digital signature functionalities.

FIG. 10, illustrates a method wherein one of the secret shares corresponds to the backup device 10, i.e., is stored on the backup device 10.

In a first step S101, the method comprises generating M shares of a secret based on the secret. Step S101 can be performed according to step S1 (see FIG. 1). Furthermore, the secret shares can be generated such that at least two secret shares are required for determining the secret (i.e. N is equal to 2). Step S101 can be based on a data splitting routine, such as, a (2, M) threshold secret sharing routine.

In a further step S104, the method comprises a backup device generating M encrypted shares of the secret by encrypting the M shares of the secret. Step S104 can be performed similarly to step S2 (see FIG. 1). Step S102 can be based on a data encryption routine.

Further, the method can comprise step S105, wherein the M encrypted shares are stored for backup in the backup device 10. Note that step S105 differentiates with the backup method illustrated in FIG. 1, wherein the backup device 10 outputs the M encrypted shares (see step S3). Instead, in step S105 the M encrypted shares are stored in the backup device 10. It will be noted that the method illustrated in FIG. 10 can in addition comprise step S3 illustrated in FIG. 1, wherein the backup device outputs the M encrypted shares. The later can increase the robustness against not being able to recover the secret.

In addition, the method can comprise step S102, wherein one of the M shares can be stored on the backup device 10. More particularly, the secret share corresponding to the backup device 10 can be stored in the backup device 10. The secret share can be stored on the backup device 10 unencrypted.

Further, in step S103, the remaining secret shares can be stored in respective password protected storage. Each of the M−1 password protected storages can be configured to securely store the data stored therein using a corresponding password and allowing access to the data stored therein only if the corresponding password is provided.

The password can be a user defined password. Thus, a user using a user device 100 can access the secret share stored in a respective password protected storage by providing the correct password. Alternatively, the password can be a computer program specific password, e.g., an application specific password, typically referred to as an app-specific password. In such embodiments, a computer program being executed on the user device 100 can access the password protected storage using the computer program specific password.

For example, the password protected storage can be part of a remote database or of a cloud-based storage space, such as, Google Drive developed by Google LLC. In step S103, one of the secret shares can be stored on Google Drive. The app-specific password can correspond to an application (or software) miming on the user device 100 and can allow said application to access the content of the cloud-based storage space, preferably the password protected storage comprised therein. An example of an application that can be used is Apple Wallet developed by Apple Inc.

The above method, wherein the secret can be a private key, can be used for digital signature functionalities. The user device 100 can retrieve from the password protected storage the secret share stored therein. For example, an application running on the user device 100 can comprise (or have access to or be provided with) the app-specific password and/or can provide the app-specific password to the password protected storage which can allow the user device to receive the secret share from the password protected storage (if the correct password is comprised and/or provided). Next, from the user device 100 the secret share can be provided to the backup device 10. The backup device 10 can recover the secret based on the secret share it stores and the other secret share it receives, e.g., by executing a data recovery routine (see step S6 in FIG. 1). Further, the backup device 10 can perform a digital signature functionality using the secret.

Figure 11:
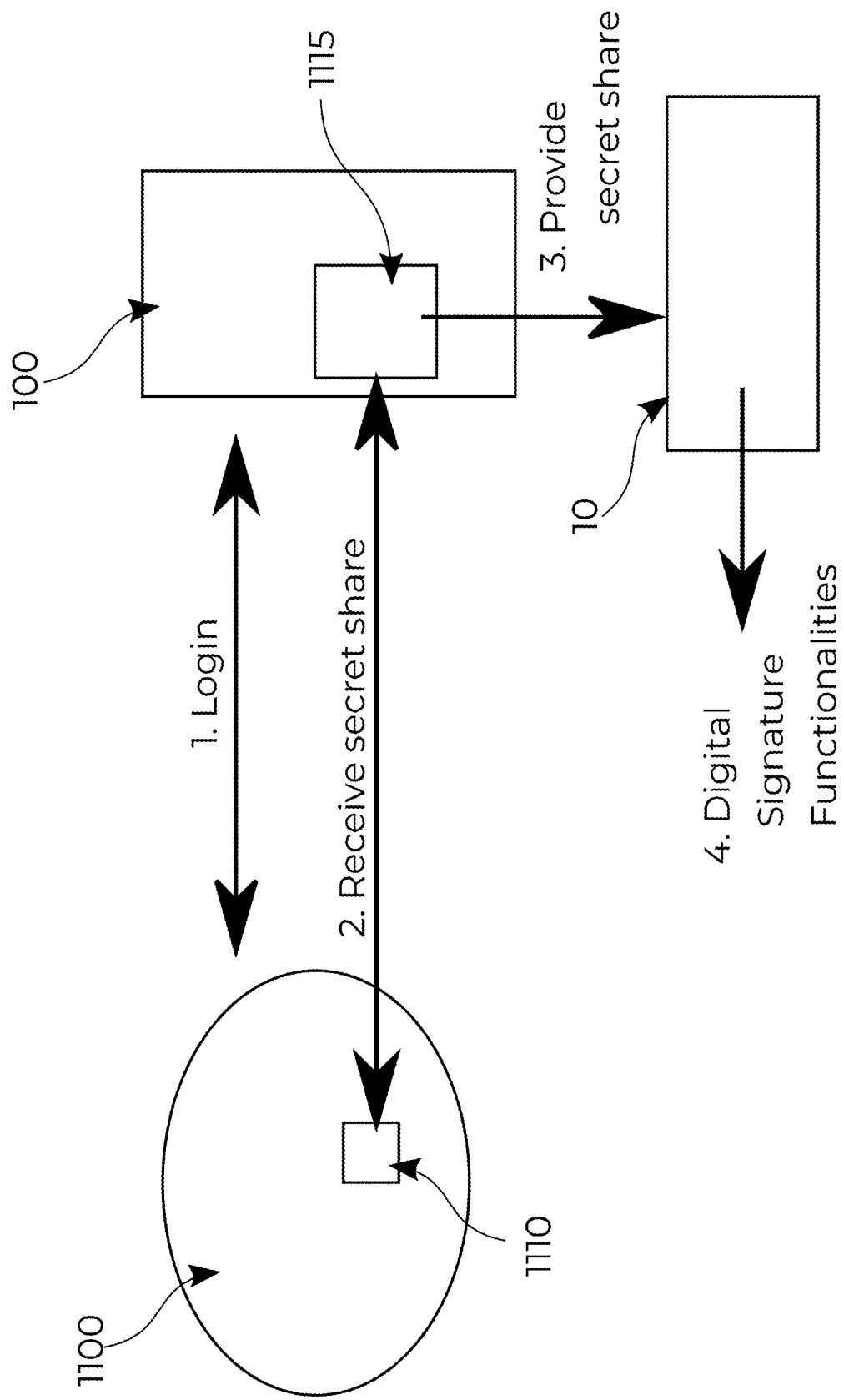
FIG. 11 illustrates a system configured to carry out the method of FIG. 10.

FIG. 11 illustrates a system configured to perform a digital signature functionality according to the method of FIG. 10. In FIG. 11, a password protected storage 1110 is illustrated as provided within a cloud-based storage 1100, such as, Google Drive. Further a computer program 1115, e.g., an application 1115, is illustrated running on a user device 100.

In general, the system can comprise a backup device 10, M−1 password protected storages 1110 (wherein each can be provided in a respective one of M−1 cloud-based storages 1100) and M−1 user devices 100 (wherein each can execute a respective one of M−1 computer programs 1115). Further optionally the general computing device 90, as illustrated in FIG. 9a, can be provided. FIG. 11 illustrates an example wherein M equals 2.

In a first step, a user (not shown) with a user device 100 may provide credential data to the cloud-based storage 1100 to login and gain access to the cloud-based storage 1100. After a successful login, the cloud-based storage 1100 can be accessed. Further, the user may provide with the user device 100 to the cloud-based storage 1100 a request (and optionally required permissions) to generate a computer program specific password for the computer program 1115. The cloud-based storage 1100 may generate for the computer program 1115 a computer program specific password. The generated computer program specific password may be used by the computer program 1115 to access the password protected storage 1110.

Further, in a next step, the computer program 1115 can comprise instructions for receiving the secret share stored in the password protected storage 1110 using a respective computer program specific password. Said instructions can be executed by the user device 100 and the secret share can be received by the user device 100. After receiving the secret share, the computer program 1115 can comprise instructions for sending the secret share to the backup device 10. Said instruction can be executed by the user device 100 and the secret share can be sent to the backup device 10. If provided, the general computing device 90 (see FIG. 9a) can facilitate the step of transferring data from the user device 100 to the backup device 10. The backup device 10 can determine the secret based on the received secret share and the one it stores and can perform digital signature functionalities.

The method and system of FIGS. 10 and 11 respectively, can be advantageous as they can provide a seamless end user experience for performing digital signature functionalities, particularly when a computer software specific password is used. For example, the user can maintain the logged in status on the cloud-based storage (e.g. Google Drive storage) wherein the secret share is stored. In this scenario, a digital signature can be performed seamlessly without the user entering the password protecting the password protected storage or even being aware of the underlying digital signature process.

At the same time, the method can provide a high security of the secret. As an initial matter, the backup device 10 can be configured to provide physical and software security, as discussed. Thus, the backup device 10 can be a tamperproof device or at least a tamper resistance device allowing for a secure processing and/or storage of the secret and/or secret share corresponding the backup device 10. Secondly, the remaining secret shares can be securely stored on a respective password protected storage. The password protected storage can be protected with an app-specific password and/or user password (e.g. user account login credentials). Moreover, for the secret to be determined not only one but both the secret shares need to be received by a third party, particularly if a (2, M) threshold secret sharing scheme is used.

Furthermore, the method can allow for the secret to be recovered even if the secret shares are lost, e.g., even if the password stored in the password protected storage is lost. This is particularly advantageous, as the password protected storage can be in a remote database (e.g. Google Drive) and can be protected with user passwords and/or computer program specific passwords. As such, in case user credentials are forgotten by the user and/or the computer program specific password is lost, the secret share stored in the password protected storage is also lost. In such scenarios, the secret can be recovered based on at least two of the M encrypted shares stored on the backup device in step S104. For the recovery of the secret, the decryption key(s) corresponding to the encryption key(s) used in step S104 can be provided to the backup device 10, which can allow the backup device 10 to decrypt at least two encrypted shares to obtain at least two shares of the secret in the unencrypted state and then determine the secret based on the at least two shares of the secret in the unencrypted state.

In the embodiments illustrated in FIGS. 10 and 11, M can be equal to 2. In such embodiments, the method and the system illustrated in FIGS. 10 and 11 respectively, can be used by a single user.

Figure 12:
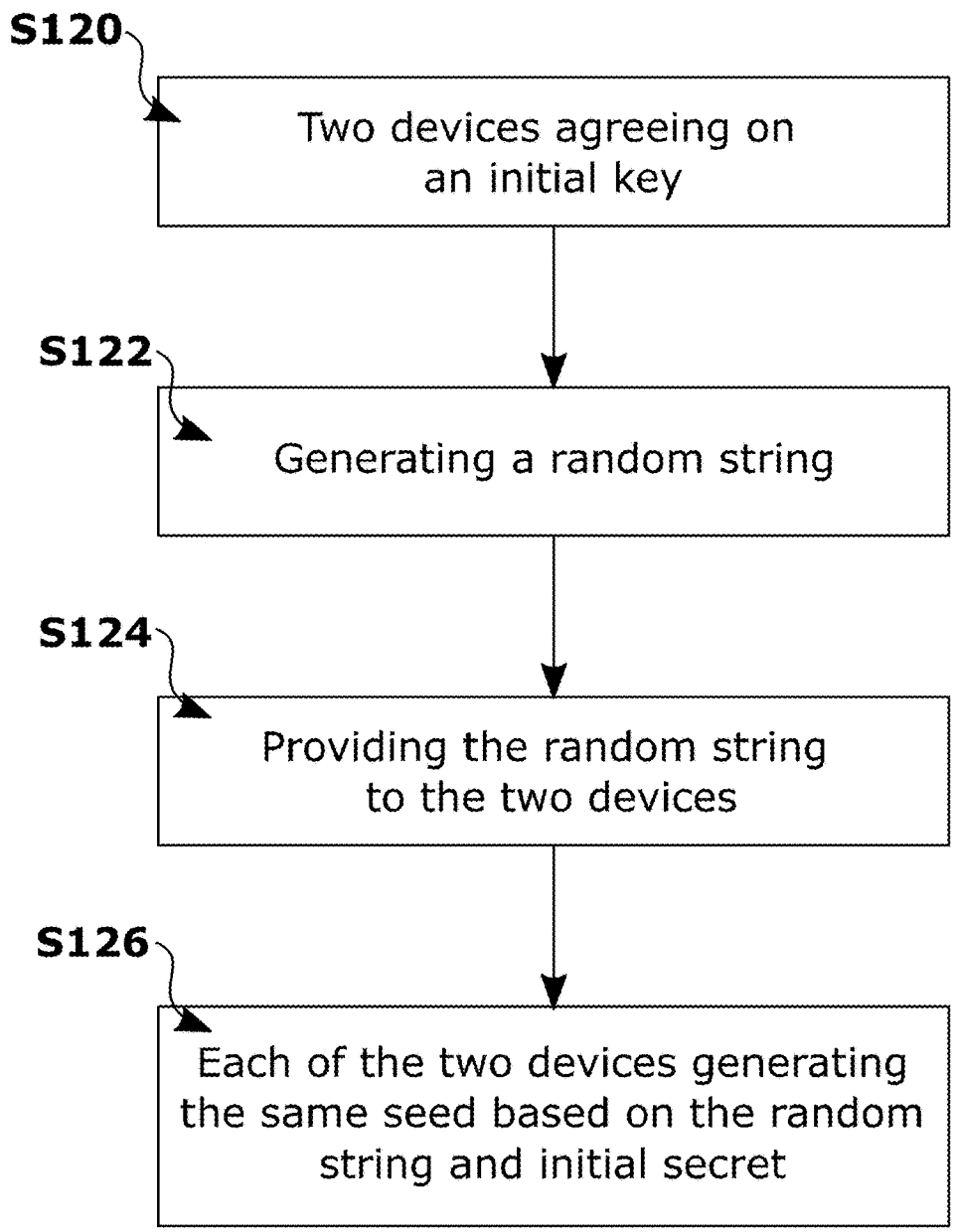
FIG. 12 depicts a further method of storing a data element such that it can be recovered.

FIG. 12 depicts a further method of storing a data element such that it can be recovered.

In a first step S120, the method can comprise two devices agreeing on an initial key. Preferably, the two devices can agree on the initial key based on a key agreement protocol. Preferably, in step S210 a secure key agreement protocol can be utilized that can allow the two devices to securely exchange the initial key over an unsecure communication link. For example, the two devices can exchange the initial key using the Diffie-Hellman key exchange and/or a variant of the Diffie-Hellman key exchange. Preferably, the Elliptic Curve Diffie-Hellman (ECDH) can be utilized for exchanging the initial key between the two devices.

It will be understood that in step S120, agreeing on the initial key can be performed by establishing the initial key between the two devices without actually communicating the initial key over the communication link between the two devices. For example, the devices can exchange parameters over the communication link that can allow them to generate the same initial key based on the exchanged parameters. For example, this technique is utilized by the Diffie-Hellman key agreement protocol. In other words, the initial key can be generated and/or stored only within the two devices. As such, even if the communication link between the two devices is intercepted by a third party, it can be computationally unfeasible for the third party to determine the initial key.

Furthermore, it can be advantageous for the two devices to comprise a secure portion (i.e., a secure enclave). In such embodiments, the generation and/or the storing of the initial key can be performed inside the secure portion of the device.

In a preferred embodiment, the two devices can be configured according to the device 200 illustrated in FIG. 8. As discussed with respect to FIG. 8, the device 20 can comprise a secure enclave. The secure enclave of the device 200 can be a hardware-based key manager that is isolated from the rest of the device 200 to provide an extra layer of security. When data (e.g. the initial key) is stored in the secure enclave, it is only handled inside the secure enclave. That is, the secure enclave can create the key, securely store it, and perform operations with it. Only the output of these operations, such as encrypted data or a cryptographic signature is provided outside the secure enclave.

In a step S122, the method can comprise generating a random string. The random string can be generated outside the secure enclave of the devices. For example, the random string can be generated by a random number generator that can be comprised by one of the two devices or that can be comprised by an external device.

In a step S124, the method can comprise providing the random string to the two devices. In preferred embodiments, wherein the two devices comprise a secure enclave, respectively, and wherein the initial key is only present inside the secure enclave, step S124 can comprise providing the random string inside the respective secure enclave of the two devices.

In a step S126, the method can comprise each of the two devices generating the same seed based on the random string and the initial key. More particularly, each of the two devices can respectively perform computations on the random string and on the initial secret to generate the same seed. The two devices can perform the same computations during step S126. The computations can comprise hashing, concatenating and/or encrypting.

In preferred embodiments, step S126 can comprise each of the two devices respectively performing at least two different computations to generate the seed. That is, step S126 can comprise each of the two devices respectively executing at least two different functions to generate the seed. A first function can generate an output based on the random string and the initial key. The first function can be configured to combine the random string and the initial key to generate the output of the first function. For example, the first function can comprise concatenating the random string with the initial key. A second function can operate over the output (i.e., results) of the first function to generate the seed. In some embodiments, the second function can comprise a hashing function operated on the output of the first function (e.g., the random string concatenated with the exchanged secret) to generate the seed. Using a hashing function can be advantageous as it can allow generating a seed with a fixed number of characters. Alternatively or additionally, the second function can comprise an encryption function (i.e. encryption routine) for encrypting the results of the first function and/or of the hashing function.

The seed generated in step S126 can be the data element 50. That is, the method illustrated in FIG. 12 can facilitate generating and storing the data element 50 in two different devices 200.

In preferred embodiments, wherein the two devices comprise a secure enclave, respectively, step S126 can be preformed within the secure enclave. Thus, both seeds can be created inside the secure enclave.

Moreover, the seeds can never be extracted outside the secure enclaves of the two devices. In other words, with the present method both secure enclaves can generate the same seed, without extracting the seed from one to the other. This is particularly advantageous as it ensures that a third party cannot obtain the seed.

Moreover, having the seed on two devices can be particularly advantageous for enabling the seed to be determined even if one of the devices gets lost, damaged or corrupted. For example, one of the two devices can be used to utilize the seed as an encryption key for encrypting and/or signing data and/or as a master key for generating other encryption keys. The other device can be used for recovery of the seed. That is, the other device can be used, e.g., in case the first device gets lost, corrupted, damaged and/or unusable.

Further still, in some embodiments, the two devices can comprise a factory shared secret which can be specific only to the two devices. The factory shared secret can be provided to the devices during their production. For example, the factory shared secret can be provided in a read-only-memory (ROM) inside the two devices (preferably, inside the secure enclave of the devices) during production of the devices. Preferably, the factory shared secret can be provided in a self-encrypted memory of the two devices. The factory shared secret can add further security to the method. For example, the factory shared secret can be used to encrypt communications between the two devices. That is, data that is communicated between the two devices can be encrypted using the factory shared secret as an encryption key and/or using an encryption key derived from the factory shared secret. Preferably, a symmetric encryption scheme can be used. Thus, data encrypted with the factory shared secret (or with a key derived based on it) can be decrypted only by using the same factory shared secret. In other words, only devices that comprise the same factory shared secret can decrypt the data. It can be particularly advantageous to use the factory shared secret to encrypt the data exchanged between the devices during the exchange of the initial key in step S120.

The use of the factory shared secret can be advantageous because multiple devices can store the same secret and moreover this shared secret was provided to them in a secure environment (during production). Preferably, the factory shared secret can be provided inside the secure enclave of the devices, hence, making it further infeasible for a third party to access the factory shared secret.

In addition, it will be understood that while the method of FIG. 12 is described with reference to two devices, this was done for sake of brevity and clarity. In general, more than two devices can be used. This can be advantageous as it can increase redundancy of storing the seed, thus making it less likely for the seed to be lost.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

The invention claimed is:

1. A method, comprising:
(a) generating M data element shares; based on a data element; wherein M is an integer greater than 1;
(b) providing M encryption keys to a first data processing unit;
(c) encrypting each of the M data element shares with a respective encryption key of the M encryption keys to generate M encrypted data element shares using the first data processing unit, wherein each of the encryption keys corresponds to a respective decryption key of M decryption keys;
(d) wherein the first data processing unit comprises a secure microcontroller configured to generate, based on the data element, M data element shares and encrypt the data element shares;
(e) wherein the method further comprises at least one of:
(e1) providing, using the first data processing unit, each of the M encrypted data element shares to a respective one of separate data share storage units and storing each of the M encrypted data element shares on the respective separate data share storage unit, or
(e2) providing, using the first data processing unit, each of the M encrypted data element shares to a database and storing each of the M encrypted data element shares on the database;
(f) wherein each of the M decryption keys is stored on a respective one of separate decryption key storage units;
(g) wherein the method comprises determining the data element which comprises providing a device and at least N computing units, wherein N is an integer greater than or equal to 1, and smaller than or equal to M,
(h) wherein each of the at least N computing units is configured to access a respective one of the separate decryption key storage units, and
(i) wherein each of the at least N computing units is further configured to access at least one of:
(i1) a respective one of the separate data share storage units that stores the encrypted data element share, the decryption key of which is stored in the decryption key storage unit that the computing unit is configured to access, or
(i2) the database;
(j) wherein determining the data element further comprises:
(j1) generating, using the device, at least one temporary encryption key and at least one corresponding temporary decryption key;
(j2) each of the at least N computing units receiving from the decryption key storage unit, that the respective computing unit is configured to access, the decryption key stored therein; or
(j3) Each of the at least N computing units receiving from the data share storage unit, that the respective computing unit is configured to access, the encrypted data element share stored therein or receiving from the database an encrypted data element share of the M encrypted data element shares stored in the database, the encrypted data element share corresponding to the decryption key received in (j2);
(j4) each of the at least N computing units decrypting the encrypted data element share, received in (j3), using the decryption key, received in (j2), to obtain a data element share in an unencrypted state;
(j5) each of the at least N computing units receiving one of the at least one temporary encryption key generated in (j1); and
(j6) Each of the at least N computing units encrypting the data element share in the unencrypted state, obtained in (j4), using the temporary encryption key, received in (j5), to generate a respective temporary encrypted data element share,
(j7) Each of the at least N computing units providing the respective temporary encrypted data element share generated in (j6) to the device;
(j8) decrypting, using the device, each of the at least N temporary encrypted data element shares, provided in (j7), to obtain at least N data element shares in an unencrypted state;
(j9) determining, using the device, the data element based on the at least N data element shares in the unencrypted state;
(k) wherein the device comprises a secure microcontroller configured to generate the data element based on the at least N data element shares.

2. The method according to claim 1,
wherein generating M data element shares, based on a data element; in (a), is based on a threshold secret sharing scheme with a total number of shares equal to M and threshold equal to N
wherein N is equal to 2,
wherein the method further comprises:
storing one of the M data element shares in the first data processing unit, and
storing each of the remaining M−1 data element shares in a respective password protected storage;
wherein the device is the first data processing unit and
wherein the method comprises
providing a data element share from a respective password protected storage to the first data processing unit.

3. The method according to claim 1, wherein the step of based on a data element, generating M data element shares is based on a threshold secret sharing scheme with a total number of shares equal to M and threshold equal to N.

4. The method according to claim 1, wherein generating M data element shares, based on a data element, in (a), is carried out by the first data processing unit.

5. The method according to claim 1, wherein the method comprises
storing each of the M encryption keys on a respective one of separate encryption key storage units and
providing M data storage units, wherein each of the M data storage units comprises
one respective encryption key storage unit of the separate encryption key storage units and one respective data share storage unit of the separate data share storage units,
wherein the encryption key stored in the encryption key storage unit of the respective data storage unit is used to generate the encrypted data element share stored in the respective data share storage unit of the respective data storage unit.

6. The method according to claim 1, wherein N is equal to 2
the method further comprising
storing one of the M data element shares in the first data processing unit, and
storing each of the remaining M−1 data element shares in a respective password protected storage.

7. The method according to claim 1, wherein the method comprises providing at least N encrypted data element shares to the device, providing at least N of the M decryption keys to the device, wherein each of the at least N decryption keys corresponds to a respective encryption key used to generate the at least N encrypted data element shares that are provided to the device.

8. A system comprising:
(a) a first data processing Unit configured to generate M data element shares based on a data element, wherein M is an integer greater than 1;
(b) wherein the first data processing unit is configured to receive M encryption keys;
(c) wherein the first data processing unit is configured to encrypt each of the M data element shares with a respective encryption key of M encryption keys to generate M encrypted data element shares, wherein each of the encryption keys corresponds to a respective decryption key of M decryption keys;
(d) wherein the first data processing unit comprises a secure microcontroller configured to generate, based on the data element, data element shares and encrypt the data element shares;
(e) wherein first data processing unit is configured to provide each of the M data element shares for storage therein to at least one of:
(e1) a respective one of separate data share storage units, or
(e2) a database;
(f) wherein each of the M decryption keys is stored on a respective one of separate decryption key storage units;
(g) wherein the system comprises a device and at least N computing units, wherein N is an integer greater than or equal to 1, and smaller than or equal to M,
(h) wherein each of the at least N computing units is configured to access a respective one of the separate decryption key storage units, and
(i) wherein each of the at least N computing units is further configured to access at least one of:
(i1) a respective one of the separate data share storage units that stores the encrypted data element share, the decryption key of which is stored in the decryption key storage unit that the computing unit is configured to access, or
(i2) the database;
(j) wherein:
(j1) The device is configured to generate at least one temporary encryption key and at least one corresponding temporary decryption key;
(j2) each of the at least N computing units is configured to receive from the decryption key storage unit, that the respective computing unit is configured to access; the decryption key stored therein;
(j3) each of the at least N computing units is configured to
receive from the data share storage unit; that the respective computing unit is configured to access, the encrypted data element share stored therein or
receive from the database an encrypted data element share, of the M encrypted data element shares stored in the database, the encrypted data element share corresponding to the received decryption key received according to (j2);
(j4) each of the at least N computing units is configured to decrypt the encrypted data element share, received according to (j3), using the decryption key, received according to (j2), to obtain a data element share in an unencrypted state;
(j5) each of the at least N computing units is configured to receive one of the at least one temporary encryption key generated according to (j1); and
(j6) Each of the at least N computing units is configured to encrypt the data element share in the unencrypted state, obtained according to (j4), using the temporary encryption key, received according to (j5), to generate a respective temporary encrypted data element share,
(j7) Each of the at least N computing units is configured to provide the respective temporary encrypted data element share to the device;
(j8) the device is configured to unencrypt each of the at least N temporary encrypted data element shares, provided according to (j7), to obtain at least N data element shares in an unencrypted state;
(j9) the device is configured to determine the data element based on the at least N data element shares in the unencrypted state;
(k) wherein the device comprises a secure microcontroller configured to generate the data element based on the at least N data element shares.

* * * * *